(12) United States Patent
Sasaki et al.

(10) Patent No.: US 11,201,354 B2
(45) Date of Patent: Dec. 14, 2021

(54) ELECTROLYTIC SOLUTION AND LITHIUM ION SECONDARY BATTERY

(71) Applicant: KABUSHIKI KAISHA TOYOTA JIDOSHOKKI, Aichi (JP)

(72) Inventors: Hiroyuki Sasaki, Kariya (JP); Tomoyuki Kawai, Kariya (JP); Yoshihiro Nakagaki, Kariya (JP); Ryota Okamoto, Kariya (JP); Kensuke Yotsumoto, Kariya (JP); Atsushi Minagata, Kariya (JP); Yuki Sugimoto, Kariya (JP); Yuuhi Sato, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 193 days.

(21) Appl. No.: 16/093,353

(22) PCT Filed: Apr. 14, 2017

(86) PCT No.: PCT/JP2017/015218
§ 371 (c)(1),
(2) Date: Oct. 12, 2018

(87) PCT Pub. No.: WO2017/179682
PCT Pub. Date: Oct. 19, 2017

(65) Prior Publication Data
US 2019/0131658 A1 May 2, 2019

(30) Foreign Application Priority Data

Apr. 15, 2016 (JP) .............................. JP2016-081917
Apr. 15, 2016 (JP) .............................. JP2016-081924

(51) Int. Cl.
*H01M 10/0568* (2010.01)
*H01G 11/60* (2013.01)
(Continued)

(52) U.S. Cl.
CPC ........ *H01M 10/0568* (2013.01); *H01G 11/06* (2013.01); *H01G 11/32* (2013.01);
(Continued)

(58) Field of Classification Search
CPC .......................... H01M 10/0568; H01G 11/32
(Continued)

(56) References Cited

U.S. PATENT DOCUMENTS 10,069,165 B2  9/2018 Doelle et al.
2007/0037063 A1  2/2007 Choi et al.
(Continued)

FOREIGN PATENT DOCUMENTS

CN  102544584 A  7/2012
CN  105264692 A  1/2016
(Continued)

OTHER PUBLICATIONS

Written Opinion of the International Searching Authority of PCT/JP2017/015218 dated Jul. 18, 2017.
(Continued)

*Primary Examiner* — Suchin Parihar
(74) *Attorney, Agent, or Firm* — Sughrue Mion, PLLC

(57) ABSTRACT

An electrolytic solution contains: an electrolyte including a lithium salt represented by general formula (1) below; an organic solvent including a linear carbonate represented by general formula (2) below; and an unsaturated cyclic carbonate, wherein
the linear carbonate is contained at a mole ratio of 3 to 6 relative to the lithium salt, and/or
the lithium salt is contained at a concentration of 1.1 to 3.8 mol/L.

$(R^1X^1)(R^2SO_2)NLi$            general formula (1)

$R^{20}OCOOR^{21}$            general formula (2)

34 Claims, 7 Drawing Sheets

(51) Int. Cl.
| | |
|---|---|
| *H01G 11/62* | (2013.01) |
| *H01G 11/64* | (2013.01) |
| *H01M 10/0567* | (2010.01) |
| *H01M 10/0569* | (2010.01) |
| *H01M 10/0585* | (2010.01) |
| *H01M 10/058* | (2010.01) |
| *H01M 4/13* | (2010.01) |
| *H01M 10/052* | (2010.01) |
| *H01G 11/06* | (2013.01) |
| *H01G 11/32* | (2013.01) |
| *H01G 11/50* | (2013.01) |
| *H01M 10/0525* | (2010.01) |
| *H01M 10/44* | (2006.01) |

(52) U.S. Cl.
CPC ............ *H01G 11/50* (2013.01); *H01G 11/60* (2013.01); *H01G 11/62* (2013.01); *H01G 11/64* (2013.01); *H01M 4/13* (2013.01); *H01M 10/052* (2013.01); *H01M 10/058* (2013.01); *H01M 10/0525* (2013.01); *H01M 10/0567* (2013.01); *H01M 10/0569* (2013.01); *H01M 10/0585* (2013.01); *H01M 10/44* (2013.01); *H01M 2300/0028* (2013.01); *Y02E 60/10* (2013.01); *Y02T 10/70* (2013.01)

(58) Field of Classification Search
USPC .......................................................... 320/106
See application file for complete search history.

(56) References Cited

U.S. PATENT DOCUMENTS

| | | | | |
|---|---|---|---|---|
| 2008/0138704 | A1* | 6/2008 | Mizuta | ............... H01G 9/035 429/203 |
| 2009/0142663 | A1* | 6/2009 | Takeuchi | .......... H01M 10/0567 429/188 |
| 2009/0325065 | A1* | 12/2009 | Fujii | ...................... H01M 4/58 429/199 |
| 2016/0087311 | A1 | 3/2016 | Doelle et al. | |
| 2016/0218394 | A1 | 7/2016 | Yamada et al. | |
| 2017/0033402 | A1 | 2/2017 | Kubtoa et al. | |
| 2017/0117582 | A1* | 4/2017 | Mizuno | ............. H01M 10/0525 |
| 2018/0152039 | A1* | 5/2018 | Horiuchi | ........... H02J 7/007184 |

FOREIGN PATENT DOCUMENTS

| | | | |
|---|---|---|---|
| JP | 2002-270233 | A | 9/2002 |
| JP | 2007-019027 | A | 1/2007 |
| JP | 2013-137873 | A | 7/2013 |
| JP | 2013-145724 | A | 7/2013 |
| JP | 2013-149477 | A | 8/2013 |
| WO | 2015/045389 | A1 | 4/2015 |
| WO | 2015/163139 | A1 | 10/2015 |

OTHER PUBLICATIONS

Written Opinion of the International Preliminary Examining Authority of PCT/JP2017/015218 dated May 15, 2018.
International Search Report of PCT/JP2017/015218 dated Jul. 18, 2017.
Communication dated Jan. 5, 2021, from the State Intellectual Property Office of the P.R.C in application No. 201780023880.6.

* cited by examiner

ELECTROLYTIC SOLUTION AND LITHIUM ION SECONDARY BATTERY

CROSS REFERENCE TO RELATED APPLICATIONS

This application is a National Stage of International Application No. PCT/JP2017/015218 filed Apr. 14, 2017, claiming priority based on Japanese Patent Application No. 2016-081917 filed Apr. 15, 2016 and Japanese Patent Application No. 2016-081924 filed Apr. 15, 2016.

TECHNICAL FIELD

The present invention relates to an electrolytic solution and a lithium ion secondary battery.

BACKGROUND ART

Generally, a power storage device such as a secondary battery includes, as main components, a positive electrode, a negative electrode, and an electrolytic solution. In the electrolytic solution, an appropriate electrolyte is added at an appropriate concentration range. For example, in an electrolytic solution of a lithium ion secondary battery, a lithium salt such as $LiClO_4$, $LiAsF_6$, $LiPF_6$, $LiBF_4$, $CF_3SO_3Li$, and $(CF_3SO_2)_2NLi$ is commonly added as an electrolyte, and the concentration of the lithium salt in the electrolytic solution is generally set at approximately 1 mol/L.

In an organic solvent to be used in an electrolytic solution, acyclic carbonate such as ethylene carbonate or propylene carbonate is generally mixed by approximately 30 vol % or greater, in order to suitably dissolve an electrolyte.

Actually, Patent Literature 1 discloses a lithium ion secondary battery using an electrolytic solution that uses a mixed organic solvent containing ethylene carbonate by 33 vol % and that contains $LiPF_6$ at a concentration of 1 mol/L.

Patent Literature 2 describes an electrolytic solution that uses a mixed organic solvent containing ethylene carbonate by 30 vol % and that contains $LiPF_6$ at a concentration of 1 mol/L. Patent Literature 2 also discloses a lithium ion secondary battery using this electrolytic solution.

Patent Literature 3 also describes an electrolytic solution that uses a mixed organic solvent containing ethylene carbonate by 30 vol % and that contains $LiPF_6$ at a concentration of 1 mol/L, and discloses a lithium ion secondary battery using this electrolytic solution.

As described in Patent Literature 1 to 3, conventionally, in an electrolytic solution to be used in a lithium ion secondary battery, using a mixed organic solvent containing a cyclic carbonate such as ethylene carbonate or propylene carbonate by approximately 30 vol % and containing a lithium salt at a concentration of approximately 1 mol/L were common technical knowledge.

Unlike the focus of a person skilled in the art hitherto, the applicant has focused on and studied for an electrolytic solution that contains a metal salt at a high concentration and in which the metal salt and an organic solvent exist in a new state, and has reported the results in Patent Literature 4.

In addition, generally, a coating is known to form on the surfaces of the negative electrode and the positive electrode in a secondary battery. This coating is also called SEI (solid electrolyte interphase), and is formed from reductive degradation products, etc., of an electrolytic solution. For example, Patent Literature 5 describes an SEI coating.

The SEI coatings on the surfaces of the negative electrode and the positive electrode allow a charge carrier such as lithium ions to pass therethrough. Moreover, the SEI coating on the surface of the negative electrode is considered to exist between the surface of the negative electrode and the electrolytic solution and to suppress further reductive degradation of the electrolytic solution. The existence of the SEI coating is considered to be essential particularly for a low potential negative electrode using a graphite or Si-based negative electrode active material.

If continuous degradation of the electrolytic solution is suppressed due to the existence of the SEI coating, the discharge characteristics of the secondary battery after a charging and discharging cycle is considered to be improved. However, on the other hand, in a conventional secondary battery, the SEI coatings on the surfaces of the negative electrode and the positive electrode have not necessarily been considered to contribute to improvement in battery characteristics.

CITATION LIST

Patent Literature

Patent Literature 1: JP2013-149477 (A)
Patent Literature 2: JP2013-145724 (A)
Patent Literature 3: JP2013-137873 (A)
Patent Literature 4: WO2015/045389
Patent Literature 5: JP2007-19027 (A)

SUMMARY OF INVENTION

Technical Problem

Lithium ion secondary batteries having long life and lithium ion secondary batteries having high capacities have been required from the industry. To provide a lithium ion secondary battery having a high capacity, increasing the density of an electrode or the weight per area of the electrode (the weight of an active material per unit area of the electrode) is effective. However, when the density or the weight per area of the electrode is merely increased, the capacity of the lithium ion secondary battery is not efficiently increased in some cases.

The present invention has been made in view of these circumstances, and an object of the present invention is to provide a suitable electrolytic solution that allows a lithium ion secondary battery having long life to be provided, and a lithium ion secondary battery that has an excellent capacity and is capable of efficiently increasing the capacity thereof.

Solution to Problem

The present inventors have conducted investigation regarding the electrolytic solution described in Patent Literature 4. Then, as a result of trials and errors, the present inventors have found that the capacity of a lithium ion secondary battery is suitably maintained by using an electrolytic solution that contains a specific lithium salt in a specific concentration range, contains a specific organic solvent, and contains an unsaturated cyclic carbonate. Furthermore, the present inventors have found that a lithium ion secondary battery including an electrolytic solution that contains a specific lithium salt and a specific organic solvent at a specific mole ratio and contains an unsaturated cyclic carbonate exhibits a suitable capacity. As a result of further investigation, the present inventors have found that a suitable amount of an unsaturated cyclic carbonate is related to the surface area of a negative electrode. On the basis of these findings, the present inventors have completed the present invention.

An electrolytic solution of the present invention is an electrolytic solution containing: an electrolyte including a lithium salt represented by general formula (1) below; an organic solvent including a linear carbonate represented by general formula (2) below; and an unsaturated cyclic carbonate, wherein the linear carbonate is contained at a mole ratio of 3 to 6 relative to the lithium salt, and/or the lithium salt is contained at a concentration of 1.1 to 3.8 mol/L.

$(R^1X^1)(R^2SO_2)NLi$                general formula (1)

($R^1$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN.

$R^2$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN.

$R^1$ and $R^2$ optionally bind with each other to form a ring.

$X^1$ is selected from $SO_2$, C=O, C=S, $R^aP$=O, $R^bP$=S, S=O, or Si=O.

$R^a$ and $R^b$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN.

$R^a$ and $R^b$ each optionally bind with $R^1$ or $R^2$ to form a ring)

$R^{20}OCOOR^{21}$                general formula (2)

($R^{20}$ and $R^{21}$ are each independently selected from $C_nH_aF_bCl_cBr_dI_e$ that is a linear alkyl, or $C_mH_fF_gCl_hBr_iI_j$ that includes a cyclic alkyl in the chemical structure thereof. "n" is an integer not smaller than 1, "m" is an integer not smaller than 3, and "a", "b", "c", "d", "e", "f", "g", "h", "i", and "j" are each independently an integer not smaller than 0, and satisfy $2n+1=a+b+c+d+e$ and $2m-1=f+g+h+i+j$).

In addition, a lithium ion secondary battery of the present invention is a lithium ion secondary battery including the electrolytic solution of the present invention, a positive electrode, and a negative electrode.

Advantageous Effects of Invention

The electrolytic solution of the present invention is suitable as an electrolytic solution for power storage devices such as lithium ion secondary batteries. The lithium ion secondary battery of the present invention exhibits a suitable capacity and is capable of efficiently increasing the capacity thereof.

DESCRIPTION OF EMBODIMENTS

Figure 1:
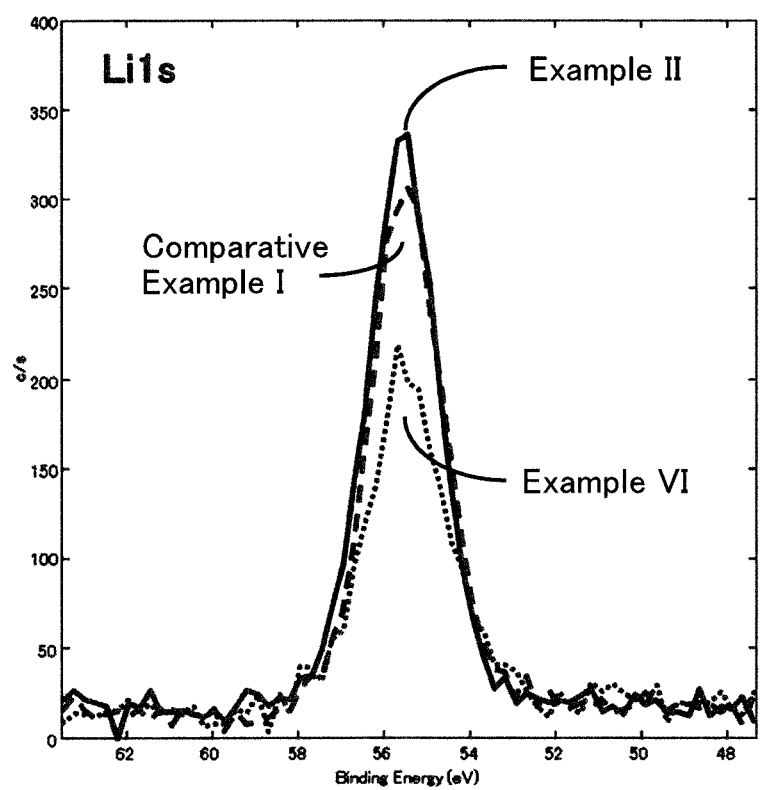
FIG. 1 is an X-ray photoelectron spectroscopy analysis chart regarding Li in lithium ion secondary batteries of Example II, Example VI, and Comparative Example I.

The following describes embodiments of the present invention. Unless mentioned otherwise in particular, a numerical value range of "a to b (or, a-b)" described in the present specification includes, in the range thereof, a lower limit "a" and an upper limit "b". A numerical value range is formed by arbitrarily combining such upper limit values, lower limit values, and numerical values described in Examples. In addition, numerical values arbitrarily selected within a numerical value range may be used as upper limit and lower limit numerical values.

The electrolytic solution of the present invention is an electrolytic solution containing: an electrolyte including a lithium salt represented by the above general formula (1); an organic solvent including a linear carbonate represented by the above general formula (2); and an unsaturated cyclic carbonate, wherein the linear carbonate is contained at a mole ratio of 3 to 6 relative to the lithium salt, and/or the lithium salt is contained at a concentration of 1.1 to 3.8 mol/L.

The wording of "optionally substituted with a substituent group" in the chemical structures represented by the above described general formula (1) is to be described. For example, "an alkyl group optionally substituted with a substituent group" refers to an alkyl group in which one or more hydrogen atoms of the alkyl group is substituted with a substituent group, or an alkyl group not including any particular substituent groups.

Examples of the substituent group in the wording of "optionally substituted with a substituent group" include alkyl groups, alkenyl groups, alkynyl groups, cycloalkyl groups, unsaturated cycloalkyl groups, aromatic groups, heterocyclic groups, halogens, OH, SH, CN, SCN, OCN, nitro group, alkoxy groups, unsaturated alkoxy groups, amino group, alkylamino groups, dialkylamino groups, aryloxy groups, acyl groups, alkoxycarbonyl groups, acyloxy groups, aryloxycarbonyl groups, acylamino groups, alkoxycarbonylamino groups, aryloxycarbonylamino groups, sulfonylamino groups, sulfamoyl groups, carbamoyl group, alkylthio groups, arylthio groups, sulfonyl group, sulfinyl group, ureido groups, phosphoric acid amide groups, sulfo group, carboxyl group, hydroxamic acid groups, sulfino group, hydrazino group, imino group, and silyl group, etc. These substituent groups may be further substituted. In addition, when two or more substituent groups are present, the substituent groups may be identical or different from each other.

The lithium salt represented by general formula (1) is preferably a lithium salt represented by general formula (1-1) below.

$(R^3X^2)(R^4SO_2)NLi$      general formula (1-1)

($R^3$ and $R^4$ are each independently $C_nH_aF_bCl_cBr_dI_e(CN)_f(SCN)_g(OCN)_h$.

"n", "a", "b", "c", "d", "e", "f", "g", and "h" are each independently an integer not smaller than 0, and satisfy $2n+1=a+b+c+d+e+f+g+h$.

$R^3$ and $R^4$ optionally bind with each other to form a ring, and, in that case, satisfy $2n=a+b+c+d+e+f+g+h$.

$X^2$ is selected from $SO_2$, $C=O$, $C=S$, $R^cP=O$, $R^dP=S$, $S=O$, or $Si=O$.

$R^c$ and $R^d$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN.

$R^c$ and $R^d$ each optionally bind with $R^3$ or $R^4$ to form a ring.)

In the chemical structure represented by the general formula (1-1), the meaning of the wording of "optionally substituted with a substituent group" is synonymous with that described for the general formula (1).

In the chemical structure represented by the general formula (1-1), "n" is preferably an integer from 0 to 6, more preferably an integer from 0 to 4, and particularly preferably an integer from 0 to 2. In the chemical structure represented by the general formula (1-1), when $R^3$ and $R^4$ each optionally bind with each other to form a ring, "n" is preferably an integer from 1 to 8, more preferably an integer from 1 to 7, and particularly preferably an integer from 1 to 3.

The lithium salt represented by general formula (1) is further preferably a lithium salt represented by general formula (1-2) below.

$(R^5SO_2)(R^6SO_2)NLi$      general formula (1-2)

($R^5$ and $R^6$ are each independently $C_nH_aF_bCl_cBr_dI_e$.

"n", "a", "b", "c", "d", and "e" are each independently an integer not smaller than 0, and satisfy $2n+1=a+b+c+d+e$.

$R^5$ and $R^6$ optionally bind with each other to form a ring, and, in that case, satisfy $2n=a+b+c+d+e$.)

In the chemical structure represented by the general formula (1-2), "n" is preferably an integer from 0 to 6, more preferably an integer from 0 to 4, and particularly preferably an integer from 0 to 2. In the chemical structure represented by the general formula (1-2), when $R^5$ and $R^6$ each optionally bind with each other to form a ring, "n" is preferably an integer from 1 to 8, more preferably an integer from 1 to 7, and particularly preferably an integer from 1 to 3.

In addition, in the chemical structure represented by the general formula (1-2), those in which "a," "c," "d," and "e" are 0 are preferable.

The lithium salt represented by general formula (1) is particularly preferably $(CF_3SO_2)_2NLi$ (hereinafter, sometimes referred to as "LiTFSA"), $(FSO_2)_2NLi$ (hereinafter, sometimes referred to as "LiFSA") $(C_2F_5SO_2)_2NLi$ $FSO_2(CF_3SO_2)NLi$, $(SO_2CF_2CF_2SO_2)NLi$, $(SO_2CF_2CF_2CF_2SO_2)NLi$, $FSO_2(CH_3SO_2)NLi$, $FSO_2(C_2F_5SO_2)NLi$, or $FSO_2(C_2H_5SO_2)NLi$.

As for the lithium salt represented by general formula (1) in the electrolytic solution of the present invention, a single type may be used, or a combination of two or more types may be used.

The electrolyte in the electrolytic solution of the present invention may include another electrolyte usable in an electrolytic solution for lithium ion secondary batteries and the like, other than the lithium salt represented by general formula (1).

Examples of the other electrolyte include $LiXO_4$, $LiAsX_6$, $LiPX_6$, $LiBX_4$, $LiB(C_2O_4)_2$, $LiB(OCOCO_2)F_2$ and $LiP(OCOCO_2)_2F_2$ (each X independently means F, Cl, Br, I, or CN). Suitable examples of $LiXO_4$, $LiAsX_6$, $LiPX_6$, and $LiBX_4$ respectively include $LiClO_4$, $LiAsF_6$, $LiPF_6$, $LiBF_4$, and $LiBF_y(CN)_z$ (y is an integer from 0 to 3, z is an integer from 1 to 4, and y and z satisfy $y+z=4$).

In the electrolytic solution of the present invention, the lithium salt represented by general formula (1) is contained by preferably not less than 70 mass or 70 mole %, more preferably not less than 80 mass % or 80 mole %, further preferably not less than 90 mass or 90 mole %, and particularly preferably not less than 95 mass % or 95 mole %, relative to the entire electrolyte contained in the electrolytic solution of the present invention. The entire electrolyte contained in the electrolytic solution of the present invention may be the lithium salt represented by general formula (1).

The chemical structure of the lithium salt represented by general formula (1) includes $SO_2$. The lithium salt represented by general formula (1) is partially degraded through charging and discharging of the lithium ion secondary battery of the present invention, thereby forming an S- and O-containing coating on the surface of the positive electrode and/or the negative electrode of the secondary battery. The S- and O-containing coating is inferred to have an S=O structure. Since deterioration of the electrodes and the electrolytic solution is suppressed by the electrodes being coated with the coating, the durability of the lithium ion secondary battery of the present invention is considered to be improved. The electrolytic solution of the present invention contains the unsaturated cyclic carbonate, and a carbon-containing coating derived from degradation of the unsaturated cyclic carbonate is formed on the surface of the negative electrode during charging of the lithium ion secondary battery of the present invention. The unsaturated cyclic carbonate is described later.

In the electrolytic solution of the present invention, a cation and an anion of the lithium salt are considered to exist closer to each other when compared to a conventional electrolytic solution, and thus the anion is considered to be more likely to be reduced and degraded by being under strong electrostatic influence from the cation when compared to a conventional electrolytic solution. In a conventional secondary battery using a conventional electrolytic solution, an SEI (solid electrolyte interphase) coating is formed from a degradation product generated by reductive degradation of a cyclic carbonate such as ethylene carbonate contained in the electrolytic solution. However, as described above, in the electrolytic solution of the present invention contained in the lithium ion secondary battery of the present invention, the anion is easily reduced and degraded, and in addition, the lithium salt is contained at a higher concentration than in a conventional electrolytic solution, and thus, the anion concentration in the electrolytic solution is high. Thus, the SEI coating, i.e., the S- and O-containing coating, in the lithium ion secondary battery of the present invention is considered to contain much degradation product derived from the anion. In addition, in the lithium ion secondary battery of the present invention, the SEI coating is formed without using a cyclic carbonate such as ethylene carbonate.

The S- and O-containing coating may be formed only on the surface of the negative electrode or may be formed only on the surface of the positive electrode. The S- and O-containing coating is preferably formed on both the surface of the negative electrode and the surface of the positive electrode.

The lithium ion secondary battery of the present invention has the S- and O-containing coating on the electrode thereof, and the S- and O-containing coating is considered to have an S=O structure and include many lithium ions. The lithium ions included in the S- and O-containing coating are considered to be preferentially supplied to the electrode. Thus, since the lithium ion secondary battery of the present invention has an abundant lithium ion source near the electrode, a transportation rate of lithium ions is considered to be also improved. Accordingly, the lithium ion secondary battery of the present invention is considered to exhibit excellent battery characteristics because of cooperation between the electrolytic solution of the present invention and the S- and O-containing coating on the electrode.

The electrolytic solution of the present invention contains an organic solvent including a linear carbonate represented by general formula (2).

$$R^{20}OCOOR^{21} \quad \text{general formula (2)}$$

($R^{20}$ and $R^{21}$ are each independently selected from $C_nH_aF_bCl_cBr_dI_e$ that is a linear alkyl, or $C_mH_fF_gCl_hBr_iI_j$ that includes a cyclic alkyl in the chemical structure thereof. "n" is an integer not smaller than 1, "m" is an integer not smaller than 3, and "a", "b", "c", "d", "e", "f", "g", "h", "i", and "j" are each independently an integer not smaller than 0, and satisfy $2n+1=a+b+c+d+e$ and $2m-1=f+g+h+i+j$).

In the linear carbonates represented by the above general formula (2), "n" is preferably an integer from 1 to 6, more preferably an integer from 1 to 4, and particularly preferably an integer from 1 to 2. "m" is preferably an integer from 3 to 8, more preferably an integer from 4 to 7, and particularly preferably an integer from 5 to 6.

Among the linear carbonates represented by the above general formula (2), those represented by general formula (2-1) below are particularly preferable.

$$R^{22}OCOOR^{23} \quad \text{general formula (2-1)}$$

($R^{22}$ and $R^{23}$ are each independently selected from $C_nH_aF_b$ that is a linear alkyl, or $C_mH_fF_g$ that includes a cyclic alkyl in the chemical structure thereof. "n" is an integer not smaller than 1, "m" is an integer not smaller than 3, and "a", "b", "f", and "g" are each independently an integer not smaller than 0, and satisfy $2n+1=a+b$ and $2m-1=f+g$.)

In the linear carbonates represented by general formula (2-1), "n" is preferably an integer from 1 to 6, more preferably an integer from 1 to 4, and particularly preferably an integer from 1 to 2. "m" is preferably an integer from 3 to 8, more preferably an integer from 4 to 7, and particularly preferably an integer from 5 to 6.

Among the linear carbonates represented by the above general formula (2-1), dimethyl carbonate (hereinafter, sometimes referred to as "DMC"), diethyl carbonate (hereinafter, sometimes referred to as "DEC"), ethyl methyl carbonate (hereinafter, sometimes referred to as "EMC"), fluoromethyl methyl carbonate, difluoromethyl methyl carbonate, trifluoromethyl methyl carbonate, bis(fluoromethyl) carbonate, bis(difluoromethyl)carbonate, bis(trifluoromethyl)carbonate, fluoromethyl difluoromethyl carbonate, 2,2,2-trifluoroethyl methyl carbonate, pentafluoroethyl methyl carbonate, ethyl trifluoromethyl carbonate, and bis(2,2,2-trifluoroethyl)carbonate are particularly preferable.

As for the linear carbonate described above, one type may be used in the electrolytic solution, or a plurality of types may be used in combination in the electrolytic solution. When a plurality of linear carbonates are used in combination, low-temperature fluidity, lithium ion transport at a low temperature, and the like of the electrolytic solution are suitably ensured.

The electrolytic solution of the present invention may contain another organic solvent usable in electrolytic solutions for lithium ion secondary batteries and the like (hereinafter, sometimes referred to merely as "another organic solvent"), in addition to the linear carbonate.

In the electrolytic solution of the present invention, the linear carbonate is contained, relative to the entire organic solvent contained in the electrolytic solution of the present invention, by preferably not less than 70 mass % or 70 mole %, more preferably not less than 80 mass or 80 mole %, further preferably not less than 90 mass % or 90 mole %, and particularly preferably not less than 95 mass % or 95 mole %. The entire organic solvent contained in the electrolytic solution of the present invention may be the linear carbonate.

In some cases, the electrolytic solution of the present invention containing another organic solvent in addition to the linear carbonate has an increased viscosity or a reduced ionic conductivity compared to the electrolytic solution of the present invention not containing another organic solvent. Furthermore, in some cases, a secondary battery using the electrolytic solution of the present invention containing another organic solvent in addition to the linear carbonate has an increased reaction resistance.

Specific examples of the other organic solvent include: nitriles such as acetonitrile, propionitrile, acrylonitrile, and malononitrile; ethers such as 1,2-dimethoxyethane, 1,2-diethoxyethane, tetrahydrofuran, 1,2-dioxane, 1,3-dioxane, 1,4-dioxane, 2,2-dimethyl-1,3-dioxolane, 2-methyltetrahydropyran, 2-methyltetrahydrofuran, and crown ethers; cyclic carbonates such as ethylene carbonate and propylene carbonate; amides such as formamide, N,N-dimethylformamide, N,N-dimethylacetamide, and N-methylpyrrolidone; isocyanates such as isopropyl isocyanate, n-propylisocyanate, and chloromethyl isocyanate; esters such as methyl acetate, ethyl acetate, propyl acetate, butyl acetate, methyl propionate, methyl formate, ethyl formate, vinyl acetate, methyl acrylate, and methyl methacrylate; epoxies such as glycidyl methyl ether, epoxy butane, and 2-ethyloxirane; oxazoles such as oxazole, 2-ethyloxazole, oxazoline, and 2-methyl-2-oxazoline; ketones such as acetone, methyl ethyl ketone, and methyl isobutyl ketone; acid anhydrides such as acetic anhydride and propionic anhydride, sulfones such as dimethyl sulfone and sulfolane; sulfoxides such as dimethyl sulfoxide, nitros such as 1-nitropropane and 2-nitropropane, furans such as furan and furfural; cyclic esters such as γ-butyrolactone, γ-valerolactone, and δ-valerolactone; aromatic heterocycles such as thiophene and pyridine, heterocycles such as tetrahydro-4-pyrone, 1-methylpyrrolidine, and N-methylmorpholine; and phosphoric acid esters such as trimethyl phosphate and triethyl phosphate.

Compared to a cyclic carbonate such as ethylene carbonate which has been used in a conventional electrolytic solution, the linear carbonate represented by general formula (2) has a low polarity. Therefore, the affinity between the linear carbonate and metal ions is considered to be inferior compared to the affinity between the cyclic carbonate and metal ions. Then, when the electrolytic solution of the present invention is used as the electrolytic solution for a secondary battery, aluminum or a transition metal forming an electrode of the secondary battery is considered less likely to be dissolved as ions into the electrolytic solution of the present invention.

Here, regarding a secondary battery using a conventional general electrolytic solution, a possible case is known in which: aluminum or a transition metal forming the positive electrode enters a high oxidation state particularly in a high-voltage charging environment, and dissolves (anode elution) in the form of metal ions, which are positive ions, into the electrolytic solution; and then, the metal ions eluted in the electrolytic solution are attracted to the electron-rich negative electrode by electrostatic attraction, to bind with electrons on the negative electrode, thereby to be reduced and deposited in the form of metal. If such a reaction occurs, the performance of the battery is known to be reduced due to possible occurrence of decrease in the capacity of the positive electrode, degradation of the electrolytic solution on the negative electrode, and the like. However, the electrolytic solution of the present invention has the features described in the former paragraphs, and thus, in a secondary battery using the electrolytic solution of the present invention, metal ion elution from the positive electrode and metal deposition on the negative electrode are suppressed.

In one mode of the electrolytic solution of the present invention, the linear carbonate represented by general formula (2) is contained at a mole ratio of 3 to 6 relative to the lithium salt represented by general formula (1). The ionic conductivity of the electrolytic solution of the present invention is suitable if the mole ratio is in the above range. The mole ratio in the present specification means the value obtained by dividing the former by the latter, i.e., (the number of moles of the linear carbonate represented by general formula (2) contained in the electrolytic solution of the present invention)/(the number of moles of the lithium salt represented by general formula (1) contained in the electrolytic solution of the present invention) (hereinafter, sometimes abbreviated merely as "mole ratio of linear carbonate/lithium salt"). More preferable ranges of the mole ratio in the electrolytic solution of the present invention include a range of 3 to 5, a range of 4 to 5.5, a range of 3.2 to 4.8, and a range of 3.5 to 4.5. In conventional electrolytic solutions, the mole ratio of the organic solvent to the electrolyte is approximately 10.

In one mode of the electrolytic solution of the present invention, the lithium salt is contained at a concentration of 1.1 to 3.8 mol/L. The concentration of the lithium salt is preferably in a range of 1.5 to 3.5 mol/L, more preferably in a range of 1.5 to 3.0 mol/L, and further preferably in a range of 2.0 to 3.0 mol/L. When the concentration of the lithium salt is excessively low or excessively high, the capacity retention rate of the lithium ion secondary battery decreases in some cases. In addition, from the viewpoint of satisfying both ionic conductivity and low-temperature stability in good balance, the above range for the concentration of the lithium salt in the electrolytic solution of the present invention is appropriate.

In one suitable mode of the electrolytic solution of the present invention, $(FSO_2)_2NLi$ is contained at a concentration of 1.1 to 3.8 mol/L. The concentration of $(FSO_2)_2NLi$ is preferably in a range of 1.5 to 3.5 mol/L, more preferably in a range of 1.5 to 3.0 mol/L, and further preferably in a range of 2.0 to 3.0 mol/L. When the concentration of $(FSO_2)_2NLi$ is excessively low or excessively high, the capacity retention rate of the lithium ion secondary battery decreases in some cases. In addition, from the viewpoint of satisfying both ionic conductivity and low-temperature stability in good balance, the above range for the concentration of $(FSO_2)_2NLi$ in the electrolytic solution of the present invention is appropriate.

In the electrolytic solution of the present invention, the concentration of the lithium salt is high compared to that in conventional electrolytic solutions. Furthermore, the electrolytic solution of the present invention has an advantage that variation in the ionic conductivity is small when some variation occurs in the lithium salt concentration, that is, an advantage of having good fastness. Moreover, the linear carbonate represented by the above general formula (2) is excellent in stability against oxidation and reduction. Furthermore, the linear carbonate represented by the above general formula (2) has a flexible chemical structure in which many bindings capable of free rotation exist. Thus, even when the electrolytic solution of the present invention using the linear carbonate contains a high concentration of a lithium salt, significant increase in the viscosity thereof is suppressed, and high ionic conductivity is obtained.

Additionally, in the electrolytic solution of the present invention, the environment in which the lithium salt and the organic solvent exist is considered to be different from that in conventional electrolytic solutions. Therefore, in a lithium ion secondary battery including the electrolytic solution of the present invention, improvement in lithium ion transportation rate in the electrolytic solution, improvement in reaction rate at the interface between an electrode and the electrolytic solution, mitigation of uneven distribution of lithium salt concentration of the electrolytic solution caused when the secondary battery undergoes high-rate charging and discharging, improvement in liquid retaining property of the electrolytic solution at an electrode interface, suppression of a so-called liquid run-out state of lacking the electrolytic solution at an electrode interface, and the like are expected. Furthermore, in the electrolytic solution of the present invention, the vapor pressure of the organic solvent contained in the electrolytic solution becomes low. As a result, volatilization of the organic solvent from the electrolytic solution of the present invention is reduced.

The distance between adjacent lithium ions is extremely small within the electrolytic solution of the present invention. When a lithium ion moves between the positive electrode and the negative electrode during charging and discharging of the secondary battery, a lithium ion located closest to an electrode that is a movement destination is firstly supplied to the electrode. Then, another lithium ion adjacent to the lithium ion moves to the place where the supplied lithium ion had been located. Thus, in the electrolytic solution of the present invention, a domino toppling-like phenomenon is predicted to be occurring in which adjacent lithium ions sequentially change their positions one by one toward an electrode that is a supply target. Because of that, the distance for which a lithium ion moves during charging and discharging is considered to be short, so that the movement speed of the lithium ion is considered to be high. For this reason, the secondary battery having the electrolytic solution of the present invention is considered to have a high reaction rate.

The unsaturated cyclic carbonate refers to a cyclic carbonate having a carbon-carbon double bond in the molecule thereof. Because of the existence of the unsaturated cyclic carbonate, the capacity retention rate of a lithium ion secondary battery including the electrolytic solution of the present invention improves. Specific examples of the unsaturated cyclic carbonate include compounds represented by general formula (A) below.

general formula (A)

[Chem. 1]

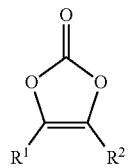

($R^1$ and $R^2$ are each independently hydrogen, an alkyl group, a halogen-substituted alkyl group, or a halogen)

Examples of specific compound names of the unsaturated cyclic carbonates represented by general formula (A) include vinylene carbonate, fluorovinylene carbonate, methylvinylene carbonate, fluoromethylvinylene carbonate, ethylvinylene carbonate, propylvinylene carbonate, butylvinylene carbonate, dimethylvinylene carbonate, diethylvinylene carbonate, dipropylvinylene carbonate, and trifluoromethylvinylene carbonate. Among those described above, vinylene carbonate is preferable.

Another specific example of the unsaturated cyclic carbonate is a compound in which the carbon-carbon double bond in general formula (A) is outside the ring, and an example of a specific compound name thereof is vinyl ethylene carbonate.

The unsaturated cyclic carbonate is speculated to be degraded earlier than the lithium salt represented by general formula (1), during charging and/or discharging of the lithium ion secondary battery, thereby forming a carbon-containing coating on the negative electrode active material and/or the positive electrode active material. Because of the existence of the carbon-containing coating, excessive degradation of the electrolytic solution, which is one of the causes for the irreversible capacity of the lithium ion secondary battery, is considered to be suppressed. In addition, because of the existence of the carbon-containing coating, excessive degradation of the electrolytic solution is considered to be suppressed, resulting in extension of the life of the lithium ion secondary battery.

An electrolytic solution not containing the unsaturated cyclic carbonate is mainly degraded at a potential of approximately 0.5 V based on metal lithium in the presence of a graphite. The lithium salt represented by general formula (1), such as $(FSO_2)_2NLi$, is considered to be mainly degraded at this potential.

On the other hand, the electrolytic solution of the present invention containing the unsaturated cyclic carbonate is mainly degraded, for example, at a potential of 0.6 V or higher based on metal lithium, more specifically, at a potential of 0.8±0.1 V based on metal lithium, in the presence of a graphite. The unsaturated cyclic carbonate is considered to be mainly degraded at this voltage. The electrolytic solution of the present invention is considered to be more easily degraded under lithium ion secondary battery charging conditions, than the electrolytic solution not containing the unsaturated cyclic carbonate. Then, great degradation of the electrolytic solution of the present invention is not observed at a potential of approximately 0.5 V based on metal lithium. From the above matters, the unsaturated cyclic carbonate contained in the electrolytic solution of the present invention is inferred to be degraded during charging of the lithium ion secondary battery including the electrolytic solution of the present invention, thereby forming a coating derived from the unsaturated cyclic carbonate, on the surface of the negative electrode active material, and degradation of the lithium salt represented by general formula (1), such as $(FSO_2)_2NLi$, contained in the electrolytic solution of the present invention is inferred to be suppressed to a certain degree because of the existence of this coating.

The ease of degradation of the electrolytic solution of the present invention is confirmed by subjecting the electrolytic solution of the present invention to analysis such as cyclic voltammetry. For example, as for cyclic voltammetry, the degradation potential of the electrolytic solution of the present invention is confirmed by applying the electrolytic solution of the present invention to a device having a graphite-containing electrode as a working electrode, linearly sweeping the electrode potential, and measuring a value of response current with respect to each potential, or calculating an amount of change in response current with respect to an amount of change in potential. In addition, the ease of degradation of the electrolytic solution of the present invention is also confirmed by measuring change in current while a lithium ion secondary battery including the electrolytic solution of the present invention and including a graphite as a negative electrode active material is actually charged. Furthermore, the ease of degradation of the electrolytic solution of the present invention is also confirmed by measuring change in current while charging by inserting lithium ions into a graphite is performed on a half-cell including the electrolytic solution of the present invention, a graphite-containing electrode, and a lithium metal-containing electrode.

The unsaturated cyclic carbonate is preferably contained by greater than 0 and not greater than 6.5 mass % relative to the entire electrolytic solution. From the technical viewpoint of reducing the resistance of the lithium ion secondary battery, the unsaturated cyclic carbonate is contained by preferably greater than 0 and less than 2.5 mass % and more preferably 0.1 to 1.5 mass % relative to the entire electrolytic solution. From the technical viewpoint of improving the discharge capacity or output of the lithium ion secondary battery, the unsaturated cyclic carbonate is contained by preferably 0.5 to 5 mass % and more preferably 1 to 4 mass % relative to the entire electrolytic solution.

A density d (g/cm$^3$) of the electrolytic solution of the present invention is described. In the present specification, the density means the density at 20° C. The density d (g/cm$^3$) of the electrolytic solution of the present invention is preferably 1.0≤d and more preferably 1.1≤d.

For reference, the densities (g/cm$^3$) of representative organic solvents are listed in Table 1.

TABLE 1

| Organic solvent | Density (g/cm$^3$) |
|---|---|
| 1,2-dimethoxyethane | 0.869 |
| Diethyl ether | 0.714 |
| Diisopropyl ether | 0.724 |
| Ethyl acetate | 0.901 |
| Acetic anhydride | 1.083 |
| Tetrahydrofuran | 0.889 |
| 1,4-dioxane | 1.034 |
| Acetone | 0.790 |
| Methyl ethyl ketone | 0.805 |
| Carbon tetrachloride | 1.594 |
| Chloroform | 1.489 |
| Dichloromethane | 1.326 |
| 1,2-dichloroethane | 1.252 |
| Acetonitrile | 0.782 |
| Nitromethane | 1.138 |
| Dimethylformamide | 0.949 |
| Hexamethylphosphoric triamide | 1.027 |
| Triethylamine | 0.728 |
| Pyridine | 0.983 |
| Dimethyl sulfoxide | 1.100 |
| Carbon disulfide | 1.263 |
| Ethylene carbonate | 1.321 |
| Dimethyl carbonate | 1.07 |
| Ethyl methyl carbonate | 1.015 |
| Diethyl carbonate | 0.976 |
| Sulfolane | 1.261 |

Regarding a viscosity η (mPa·s) of the electrolytic solution of the present invention, the range of 3<θ<50 is preferable, the range of 4<θ<40 is more preferable, and the range of 5<θ<30 is further preferable.

Ions move easier in an electrolytic solution when an ionic conductivity σ (mS/cm) of the electrolytic solution is higher. Thus, such an electrolytic solution is an excellent electrolytic solution for batteries. The ionic conductivity σ (mS/cm) of the electrolytic solution of the present invention preferably satisfies 1≤σ. Regarding the ionic conductivity σ (mS/cm) of the electrolytic solution of the present invention, if a suitable range including an upper limit is to be shown, the range of 2≤σ<100 is preferable, the range of 3≤σ<50 is more preferably, and the range of 4≤σ<30 is further preferable.

The electrolytic solution of the present invention may contain an organic solvent formed from a hydrocarbon. The electrolytic solution of the present invention containing the organic solvent formed from the hydrocarbon is expected to have an effect that the viscosity thereof is reduced.

Specific examples of the organic solvent formed from the above hydrocarbon include benzene, toluene, ethyl benzene, o-xylene, m-xylene, p-xylene, 1-methylnaphthalene, hexane, heptane, and cyclohexane.

In addition, a fire-resistant solvent may be added to the electrolytic solution of the present invention. By adding the fire-resistant solvent to the electrolytic solution of the present invention, safety of the electrolytic solution of the present invention is further enhanced. Examples of the fire-resistant solvent include halogen based solvents such as carbon tetrachloride, tetrachloroethane, and hydrofluoroether, and phosphoric acid derivatives such as trimethyl phosphate and triethyl phosphate.

When the electrolytic solution of the present invention is mixed with a polymer or an inorganic filler to form a mixture, the mixture enables containment of the electrolytic solution to provide a pseudo solid electrolyte. By using the pseudo solid electrolyte as an electrolytic solution of a battery, leakage of the electrolytic solution in the battery is suppressed.

As the polymer, a polymer used in batteries such as lithium ion secondary batteries and a general chemically cross-linked polymer are used. In particular, a polymer capable of turning into a gel by absorbing an electrolytic solution, such as polyvinylidene fluoride and polyhexafluoropropylene, and one obtained by introducing an ion conductive group to a polymer such as polyethylene oxide are suitable.

Specific examples of the polymer include polymethyl acrylate, polymethyl methacrylate, polyethylene oxide, polypropylene oxide, polyacrylonitrile, polyvinylidene fluoride, polyethylene glycol dimethacrylate, polyethylene glycol acrylate, polyglycidol, polytetrafluoroethylene, polyhexafluoropropylene, polysiloxane, polyvinyl acetate, polyvinyl alcohol, polyacrylic acid, polymethacrylic acid, polyitaconic acid, polyfumaric acid, polycrotonic acid, polyangelic acid, polycarboxylic acid such as carboxymethyl cellulose, styrene-butadiene rubbers, nitrile-butadiene rubbers, polystyrene, polycarbonate, unsaturated polyester obtained through copolymerization of maleic anhydride and glycols, polyethylene oxide derivatives having a substituent group, and a copolymer of vinylidene fluoride and hexafluoropropylene. In addition, as the polymer, a copolymer obtained through copolymerization of two or more types of monomers forming the above described specific polymers may be selected.

Polysaccharides are also suitable as the polymer. Specific examples of the polysaccharides include glycogen, cellulose, chitin, agarose, carrageenan, heparin, hyaluronic acid, pectin, amylopectin, xyloglucan, and amylose. In addition, materials containing these polysaccharides may be used as the polymer, and examples of the materials include agar containing polysaccharides such as agarose.

As the inorganic filler, inorganic ceramics such as oxides and nitrides are preferable.

Inorganic ceramics have hydrophilic and hydrophobic functional groups on their surfaces. Thus, a conductive passage may form within the inorganic ceramics when the functional groups attract the electrolytic solution. Furthermore, the inorganic ceramics dispersed in the electrolytic solution form a network among the inorganic ceramics themselves due to the functional groups, and may serve as containment of the electrolytic solution. With such a function by the inorganic ceramics, leakage of the electrolytic solution in the battery is further suitably suppressed. In order to have the inorganic ceramics suitably exert the function described above, the inorganic ceramics having a particle shape are preferable, and those whose particle sizes are nm order are particularly preferable.

Examples of the types of the inorganic ceramics include common alumina, silica, titania, zirconia, and lithium phosphate. In addition, inorganic ceramics that have lithium conductivity themselves are preferable, and specific examples thereof include $Li_3N$, $LiI$, $LiI—Li_3N—LiOH$, $LiI—Li_2S—P_2O_5$, $LiI—Li_2S—P_2S_5$, $LiI—Li_2S—B_2S_3$, $Li_2O—B_2S_3$, $Li_2O—V_2O_3—SiO_2$, $Li_2O—B_2O_3—P_2O_5$, $Li_2O—B_2O_3—ZnO$, $Li_2—Al_2O_3—TiO_2—SiO_2—P_2O_5$, $LiTi_2(PO_4)_3$, $Li—\beta Al_2O_3$, and $LiTaO_3$.

Glass ceramics may be used as the inorganic filler. Since glass ceramics enables containment of ionic liquids, the same effect is expected for the electrolytic solution of the present invention. Examples of the glass ceramics include compounds represented by $xLi_2S—(1-x)P_2S_5$ ($0<x<1$), and those in which one portion of S in the compound is substituted with another element and those in which one portion of P in the compound is substituted with germanium.

In addition, without departing from the gist of the present invention, a known additive may be added to the electrolytic solution of the present invention. Examples of such a known additive include: carbonate compounds represented by fluoro ethylene carbonate, trifluoro propylene carbonate, phenylethylene carbonate, and erythritane carbonate; carboxylic anhydrides represented by succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride, and phenyl succinic anhydride; lactones represented by γ-butyrolactone, γ-valerolactone, γ-caprolactone, δ-valerolactone, δ-caprolactone, and ε-caprolactone; cyclic ethers represented by 1,4-dioxane; sulfur-containing compounds represented by ethylene sulfite, 1,3-propanesultone, 1,4-butanesultone, methyl methanesulfonate, busulfan, sulfolane, sulfolene, dimethyl sulfone, and tetramethylthiuram monosulfide; nitrogen-containing compounds represented by 1-methyl-2-pyrrolidinone, 1-methyl-2-piperidone, 3-methyl-2-oxazolidinone, 1,3-dimethyl-2-imidazolidinone, and N-methylsuccinimide; phosphates represented by monofluorophosphate and difluorophosphate; saturated hydrocarbon compounds represented by heptane, octane, and cycloheptane; and unsaturated hydrocarbon compounds represented by biphenyl, alkyl biphenyl, terphenyl, partially hydrogenated terphenyl, cyclohexylbenzene, t-butylbenzene, t-amyl benzene, diphenyl ether, and dibenzofuran.

The electrolytic solution of the present invention described above exhibits excellent ionic conductivity, and thus is suitably used as an electrolytic solution for power storage devices such as batteries and capacitors. In particular, the electrolytic solution of the present invention is preferably used as an electrolytic solution for lithium ion secondary batteries. In the following, a lithium ion secondary battery including the electrolytic solution of the present invention is described.

As described above, the unsaturated cyclic carbonate is speculated to be degraded during charging and discharging of the lithium ion secondary battery, thereby forming a carbon-containing coating on the negative electrode active material and/or on the positive electrode active material. Thus, a coating containing S, O, and C is considered to be formed on the surface of the negative electrode active material and/or the positive electrode active material in the lithium ion secondary battery of the present invention after charging and/or after discharging. This coating is inferred to also contain Li, N, and F.

As described above, as one mode of the lithium ion secondary battery of the present invention, a lithium ion secondary battery including the electrolytic solution of the present invention, a negative electrode, a positive electrode, and a coating containing S, O, and C (hereinafter, sometimes referred to as coating of the present invention) on the surface of the negative electrode and/or the positive electrode, is understood.

Among the lithium ion secondary batteries of the present invention, a lithium ion secondary battery including the coating of the present invention on the surface of the negative electrode is particularly important. The reason is that, because of the existence of the coating of the present invention on the surface of the negative electrode, excessive reductive degradation of the electrolytic solution during charging is suppressed.

From the viewpoint of the previous paragraph, a suitable existence amount of the unsaturated cyclic carbonate in the lithium ion secondary battery of the present invention before charging and discharging is calculated also on the basis of a relationship with the surface area of the negative electrode. In the lithium ion secondary battery of the present invention, the value of (mass (mg) of unsaturated cyclic carbonate/ surface area ($m^2$) of negative electrode) is preferably in a range of greater than 0 and not greater than 300 and more preferably in a range of greater than 0 and not greater than 60. In addition, examples of suitable ranges of the value of (mass (mg) of unsaturated cyclic carbonate/surface area ($m^2$) of negative electrode) include 2.5 to 300, 2.6 to 60, 2.6 to 30, 5 to 30, greater than 0 and not greater than 12, 1 to 12, 1.5 to 12, 1 to 10, 1.5 to 10, 2.5 to 12, 2.6 to 10, 2.1 to 8, and 6 to 9. The "surface area of the negative electrode" refers to a value obtained by multiplying a specific surface area ($m^2/g$) of a negative electrode active material layer excluding a negative electrode current collector by the total mass (g) of the negative electrode active material in the lithium ion secondary battery, the specific surface area ($m^2/g$) being measured by the BET method.

When the unsaturated cyclic carbonate exists in an amount that is in a suitable range, the capacity of the lithium ion secondary battery of the present invention is made suitable. If the amount of the unsaturated cyclic carbonate is small, formation of a carbon-containing coating derived from the unsaturated cyclic carbonate becomes insufficient in some cases. In addition, if the amount of the unsaturated cyclic carbonate is excessively large, a carbon-containing coating derived from the unsaturated cyclic carbonate is excessively formed, resulting in difficulty for the lithium ion secondary battery to exhibit a sufficient capacity, in some cases.

According to the technical idea of the present invention, in increasing the capacity of the lithium ion secondary battery by a means such as increasing the density or the weight per area of an electrode, a suitable amount of the unsaturated cyclic carbonate to be added to the electrolytic solution is determined in accordance with the surface area of a negative electrode to be used.

In some cases, the state of the coating of the present invention in the lithium ion secondary battery of the present invention changes associated with charging and discharging. For example, in some cases, the thickness of the coating of the present invention and the proportion of elements in the coating reversibly change depending on the state of charging and discharging. Thus, a portion that is derived from the degradation product of the anion as described above and is fixed in the coating, and a portion that reversibly increases and decreases associated with charging and discharging, are considered to exist in the coating of the present invention in the lithium ion secondary battery of the present invention.

Since the coating of the present invention is considered to be derived from the degradation product of the electrolytic solution, a large portion or the entirety of the coating of the present invention is considered to be produced during and after the first charging and discharging of the secondary battery. Components of the coating of the present invention are considered to be different in some cases, depending on the composition of the electrode, the components contained in the electrolytic solution, or the like.

The lithium ion secondary battery of the present invention has the coating of the present invention on the electrode, and the coating of the present invention is considered to have an S=O structure and contain a large amount of Li. In addition, Li contained in the coating of the present invention is considered to be preferentially supplied to the electrode. Thus, since the lithium ion secondary battery of the present invention has an abundant Li source near the electrode, a transportation rate of Li is considered to be also improved. Accordingly, the lithium ion secondary battery of the present invention is considered to exhibit excellent battery characteristics because of cooperation between the electrolytic solution of the present invention and the coating of the present invention on the electrode.

The coating of the present invention is preferably observed to have at least one of the following peaks when the binding energy of elements contained in the coating is measured by using X-ray photoelectron spectroscopy.

S: Peak having the peak top at 169±2 eV (hereafter, sometimes abbreviated as "169 eV peak")

O: Peak having the peak top at 532±2 eV (hereinafter, sometimes abbreviated as "532 eV peak")

C: Peak having the peak top at 290±2 eV (hereinafter, sometimes abbreviated as "290 eV peak")

C: Peak having the peak top at 285±1 eV (hereinafter, sometimes abbreviated as "285 eV peak")

The peak regarding the binding energy described above is inferred to be attributed to at least one of the following bonds.

S: 169 eV peak→S—Ox bond (x is an integer from 1 to 4), S=O bond

C: 290 eV peak→$CO_3$ bond

C: 285 eV peak→C—H bond, C—C bond, C=C bond

Attributions of the above peaks are also supported through quantum chemistry calculation. Actually, with respect to the attribution of carbon, when the molecular structure was optimized by using density functional theory and the level of 1s orbital of carbon was calculated, validity of attributions of the peaks described above was supported. As the quantum chemistry calculation program, Gaussian09 (registered trademark, Gaussian, Inc.) was used, the density functional was B3LYP, and the basis function was 6-311++G(d, p) in which a polarization function and a dispersion function were added.

From the above attributions, one mode of the coating of the present invention is considered to have S—Ox bond, S=O bond, $CO_3$ bond, C—H bond, C—C bond, and/or C=C bond.

From the above attribution, the 290 eV peak is considered to be derived from the linear carbonate and the unsaturated cyclic carbonate. In addition, from Evaluation Example 3 described later, a peak derived from carbon was found to be observed at a location of an eV value obtained by subtracting 2.3 eV from the eV value of the peak top in the 290 eV peak, from an electrolytic solution containing a large amount of the unsaturated cyclic carbonate. The peak derived from carbon (hereinafter, referred to as "−2.3 eV peak") is considered to be derived from the unsaturated cyclic carbonate.

From the results of Evaluation Example 2 described later, a lithium ion secondary battery including an electrolytic solution containing a large amount of the unsaturated cyclic carbonate was found to have an increased resistance. From the results of Evaluation Example 2 and Evaluation Example 3 described later, a lower signal value of the "−2.3 eV peak" is considered to be preferable for the coating of the present invention. Regarding the relationship between the −2.3 eV peak and the 290 eV peak, the value of ((signal value of 290 eV peak)/(signal value of −2.3 eV peak)) is considered to be preferably not less than 0.7, more preferably not less than 0.8 and not greater than 2.0, and further preferably not less than 1.3 and not greater than 1.8.

Examples of the ranges of the percentages of elements such as Li, C, N, O, F, and S in the surface of the negative electrode of the lithium ion secondary battery of the present invention are shown below. The percentages of the elements are values calculated from analysis results obtained through X-ray photoelectron spectroscopy.

Li: 10 to 30 atm %, C: 20 to 60 atm %, N: 0.5 to 5 atm %, O: 20 to 50 atm %, F: 0.5 to 5 atm %, S: 0.5 to 5 atm %

Examples of suitable ranges of the percentages of the elements in the surface of the negative electrode of the lithium ion secondary battery of the present invention are shown below.

Li: 15 to 20 atm %, C: 35 to 50 atm %, N: 1 to 3 atm %, O: 29 to 33 atm %, F: 1 to 4.5 atm %, S: 1 to 3.5 atm %

An example of a more suitable range of the percentage of carbon in the surface of the negative electrode of the lithium ion secondary battery of the present invention is 40.2 to 49.1 atm %.

The sum of the percentages of N, F, and S, derived from the anion of $(FSO_2)_2NLi$, in the surface of the negative electrode of the lithium ion secondary battery of the present invention is preferably 5.1 to 10.4 atm % and more preferably 6 to 8 atm %.

When the coating of the present invention is observed using a scanning electron microscope, white materials having a long diameter of 30 nm or greater are confirmed in some cases. An example of one mode of the lithium ion secondary battery of the present invention is a lithium ion secondary battery in which the number of materials having a long diameter of 30 nm or greater on the surface of the negative electrode active material is less than 80 counts/$\mu m^2$, 0.5 to 30 counts/$\mu m^2$, or 0.5 to 20 counts/$\mu m^2$.

As a result of investigation, the present inventors have found that the white materials have a higher F content than a portion of the coating of the present invention other than the materials. The white materials are considered to be a part of degradation products derived from $(FSO_2)_2NLi$. As one mode of the coating of the present invention, a coating that includes materials having a long diameter of 30 nm or greater and in which a value of (concentration of F in the material)/(concentration of F in the coating of the present invention other than the material) exceeds 1 is understood.

As a result of thorough investigation, the present inventors have found a plurality of effective methods for forming the coating of the present invention in the lithium ion secondary battery of the present invention. These methods are understandable as a suitable method for producing the lithium ion secondary battery of the present invention, and are also understandable as an adjustment method or an activation method for the lithium ion secondary battery of the present invention. Hereinafter, these methods are sometimes comprehensively referred to as "activation method for the lithium ion secondary battery of the present invention".

The activation method for the lithium ion secondary battery of the present invention is characterized by performing, on the lithium ion secondary battery of the present invention, an activation process including step (a), step (b), and step (c) described below, or step (a) and step (d) described below. Without departing from the gist of the present invention, a current pause time or a voltage keeping time may be provided in each step or between steps.

(a) Step of performing charging to a second voltage $V_2$ in step (a-1) or step (a-2) described below.

(a-1) Step of performing charging at a first rate $C_1$ to a first voltage $V_1$ and then performing charging at a second rate $C_2$ to the second voltage $V_2$ ($V_1 < V_2$, $C_1 < C_2$).

(a-2) Step of performing charging at a constant charging rate $C_{a-2}$ of 0.05 C or higher to the second voltage $V_2$.

(b) Step of discharging the lithium ion secondary battery having been subjected to step (a), at a third rate $C_3$ to a third voltage $V_3$ or lower.

(c) Step of performing charging and discharging at a fourth rate $C_4$ between the third voltage $V_3$ and the second voltage $V_2$.

(d) Step of keeping the temperature of the lithium ion secondary battery in a range of 40 to 120° C.

In step (a), either step (a-1) or step (a-2) is selected to charge the lithium ion secondary battery to the second voltage $V_2$. Step (a) may be performed at an ordinary temperature (25° C.), or under a cooling condition or a heating condition. Step (a) is preferably performed under a constant temperature condition. The range of the second voltage $V_2$ is 3.5 to 6 V, preferably 3.6 to 5.5 V, more preferably 3.7 to 5 V, and further preferably 3.8 to 4.5 V, for example.

Step (a-1) is a step of performing charging at the first rate $C_1$ to the first voltage $V_1$, and then performing charging at the second rate $C_2$ to the second voltage $V_2$ ($V_1 < V_2$, $C_1 < C_2$). As the first voltage $V_1$, a voltage satisfying $0.5 \times V_2 < V_1 < V_2$ is preferable, a voltage satisfying $0.6 \times V_2 < V_1 < 0.95 \times V_2$ is more preferable, and a voltage satisfying $0.7 \times V_2 < V_1 < 0.9 \times V_2$ is further preferable.

The relationship between the first rate $C_1$ and the second rate $C_2$ is $C_1 < C_2$, and is preferably $C_1 < 0.7 \times C_2$, more preferably $C_1 < 0.5 \times C_2$, and further preferably $C_1 < 0.3 \times C_2$. Specific examples of the first rate $C_1$ include 0.05 C, 0.1 C, and 0.2 C. Specific examples of the second rate $C_2$ include 0.5 C, 0.8 C, and 1 C. 1 C means a current value required for fully charging or discharging the secondary battery in 1 hour with a constant current. 2 C means a current value required for fully charging or discharging the secondary battery in 0.5 hours with a constant current.

Step (a-2) is a step of performing charging at a constant charging rate $C_{a-2}$ of 0.05 C or greater to a second voltage $V_2$. The charging rate $C_{a-2}$ is preferably 0.5 C or greater and more preferably 1 C or greater. Examples of the range of the charging rate $C_{a-2}$ include $0.5 \leq C_{a-2} \leq 15$ C, $1 \leq C_{a-2} \leq 13$ C, and $2 \leq C_{a-2} \leq 11$ C.

In each of step (a-1) and step (a-2), after charging to the second voltage $V_2$ has been performed, charging for keeping the voltage is preferably performed. Examples of the second voltage $V_2$ keeping period include 0.5 to 5 hours and 1 to 3 hours.

In the activation method for the lithiumion secondary battery of the present invention, a charging and discharging step including step (b) and step (c) described below, or a process including step (d) described below is performed on the lithium ion secondary battery having been subjected to step (a) described above.

(b) a step of performing discharging the lithium ion secondary battery having been subjected to step (a), at the third rate $C_3$ to the third voltage $V_3$ or lower.

(c) a step of performing charging and discharging at the fourth rate $C_4$ between the third voltage $V_3$ and the second voltage $V_2$.

(d) a step of keeping the temperature of the lithium ion secondary battery in a range of 40 to 120° C.

First, the charging and discharging step including step (b) and step (c) is described.

The discharge voltage in step (b) may be any voltage not greater than the third voltage $V_3$ in step (c), and examples of the range thereof include $0.8 \times V_3$ to $V_3$.

Examples of the range of the third rate $C_3$ include $0.5 \leq C_3 \leq 10$ C, $0.5 \leq C_3 \leq 6$ C, $1 \leq C_3 \leq 6$ C, $0.5 \leq C_3 \leq 3$ C, and $1 \leq C_3 \leq 3$ C.

Step (b) may be performed at an ordinary temperature (25° C.), or under a cooling condition or a heating condition. Step (b) is preferably performed under a constant temperature condition. After discharging in step (b) has been ended, charging for keeping the voltage is preferably performed. Examples of the keeping period include 0.5 to 5 hours and 1 to 3 hours.

As the third voltage $V_3$ in step (c), a voltage satisfying $0.5 \times V_2 < V_3 < V_2$ is preferable, a voltage satisfying $0.6 \times V_2 < V_3 < 0.9 \times V_2$ is more preferable, and a voltage satisfying $0.7 \times V_2 < V_3 < 0.90 \times V_2$ is further preferable.

Examples of the range of the fourth rate $C_4$ in step (c) include $0.5 \leq C_4 \leq 10$ C, $1 \leq C_4 \leq 6$ C, and $1 \leq C_4 \leq 3$ C. $C_3 < C_4$ is preferable. When step (a) is step (a-1), the relationship among the first rate $C_1$, the second rate $C_2$, the third rate $C_3$, and the fourth rate $C_4$ preferably satisfies $C_1 < C_2 < C_3 < C_4$.

The temperature in step (c) is preferably in a range of 40 to 120° C., and more preferably in a range of 50 to 100° C. Step (c) is preferably performed under a constant temperature condition. In addition, step (c) is preferably repeated. Examples of the number of times of the repetition include 5 to 50 times, and 20 to 40 times. After each charging and discharging in step (c), charging for keeping the voltage may be performed. Examples of the keeping period include 0.1 to 2 hours, and 0.2 to 1 hours.

Next, step (d) is described. In step (d), the temperature of the lithium ion secondary battery may be kept in a range of 40 to 120° C. while keeping constant the voltage of the charged lithium ion secondary battery having been subjected to step (a). Alternatively, the temperature of the lithium ion secondary battery may be kept in a range of 40 to 120° C. without keeping constant (naturally occurring voltage) the voltage of the charged lithium ion secondary battery having been subjected to step (a). Further, in step (d), after the voltage of the lithium ion secondary battery is once adjusted to a specific value, the temperature of the lithium ion secondary battery may be kept in a range of 40 to 120° C. An example of a more preferable temperature range for step (d) is 50 to 120° C., and an example of a further preferable temperature range for step (d) is 50 to 100° C.

Examples of the temperature keeping period in step (d) include 0.5 to 48 hours, 12 to 36 hours, and 18 to 30 hours. Step (d) may be performed on the secondary battery having been subjected to step (c).

Through the activation method for the lithium ion secondary battery of the present invention, the following charging/discharging control device of the present invention is understood.

A charging/discharging control device of the present invention includes a control unit for performing, on the lithium ion secondary battery of the present invention, the above-described activation process including step (a), step (b), and step (c), or step (a) and step (d) in the activation method for the lithium ion secondary battery of the present invention. The charging/discharging control device of the present invention may be installed in a production facility for the lithium ion secondary battery, or may be installed in a charging system for charging the lithium ion secondary battery before or after shipping of the lithium ion secondary battery. The charging/discharging control device of the present invention, or the production facility or the charging system preferably includes a temperature control unit which controls the temperature of the lithium ion secondary battery.

Next, the positive electrode and the negative electrode are described.

The positive electrode includes a current collector and a positive electrode active material layer bound to the surface of the current collector. The positive electrode active material layer contains a positive electrode active material, and, if necessary, a binding agent and/or a conductive additive.

The current collector refers to an electron conductor that is chemically inert for continuously sending a flow of current to the electrode during discharging or charging of the lithium ion secondary battery. The current collector of the positive electrode is not limited in particular as long as the current collector is a metal capable of withstanding a voltage suited for the active material that is used. Examples of the current collector include at least one selected from silver, copper, gold, aluminum, tungsten, cobalt, zinc, nickel, iron, platinum, tin, indium, titanium, ruthenium, tantalum, chromium, and molybdenum, and metal materials such as stainless steel.

When the potential of the positive electrode is set to not lower than 4V using lithium as reference, aluminum is preferably used as the current collector.

Specifically, as the positive electrode current collector, one formed from aluminum or an aluminum alloy is preferably used. Here, aluminum refers to pure aluminum, and an aluminum whose purity is not less than 99.0% is referred to as pure aluminum. An alloy obtained by adding various elements to pure aluminum is referred to as an aluminum alloy. Examples of the aluminum alloy include those that are Al—Cu based, Al—Mn based, Al—Fe based, Al—Si based, Al—Mg based, Al—Mg—Si based, and Al—Zn—Mg based.

In addition, specific examples of aluminum or the aluminum alloy include A1000 series alloys (pure aluminum based) such as JIS A1085, A1N30, etc., A3000 series alloys (Al—Mn based) such as JIS A3003, A3004, etc., and A8000 series alloys (Al—Fe based) such as JIS A8079, A8021, etc.

The current collector may be coated with a known protective layer. One obtained by treating the surface of the current collector with a known method may be used as the current collector.

The current collector preferably takes a form from which a surface is recognizable, such as a foil, a sheet, a film, and a mesh. Thus, as the current collector, for example, metal foils such as copper foil, nickel foil, aluminum foil, and stainless steel foil are suitably used. When the current collector is in the form of a foil, a sheet, or a film, the thickness thereof is preferably in a range of 1 μm to 100 μm.

As the positive electrode active material, a material capable of occluding and releasing lithium ions may be used. Examples of the positive electrode active material include layer compounds that are $Li_aNi_bCo_cMn_dD_eO_f$ (0.2≤a≤1.2; b+c+d+e=1; 0≤e<1; D is at least one element selected from Li, Fe, Cr, Cu, Zn, Ca, Mg, S, Si, Na, K, Al, Zr, Ti, P, Ga, Ge, V, Mo, Nb, W, or La; 1.7≤f≤2.1) and $Li_2MnO_3$. Additional examples of the positive electrode active material include metal oxides having a spinel structure such as $LiMn_2O_4$, a solid solution formed from a mixture of a metal oxide having a spinel structure and a layer compound, and polyanion based compounds represented by $LiMPO_4$, $LiMVO_4$, $Li_2MSiO_4$ (where "M" is selected from at least one of Co, Ni, Mn, or Fe), or the like. Further additional examples of the positive electrode active material include tavorite based compounds represented by $LiMPO_4F$ ("M" is a transition metal) such as $LiFePO_4F$ and borate based compounds represented by $LiMBO_3$ ("M" is a transition metal) such as $LiFeBO_3$. Any metal oxide used as the positive electrode active material may have a basic composition of the composition formulae described above, and those in which a metal element included in the basic composition is substituted with another metal element may also be used. In addition, as the positive electrode active material, one that does not contain a charge carrier (e.g., a lithium ion contributing to the charging and discharging) may also be used. For example, elemental substance sulfur (S), a compound that is a composite of sulfur and carbon, metal sulfides such as $TiS_2$, oxides such as $V_2O_5$ and $MnO_2$, polyaniline and anthraquinone and compounds containing such aromatics in the chemical structure, conjugate based materials such as conjugate diacetic acid based organic matters, and other known materials may be used. Furthermore, a compound having a stable radical such as nitroxide, nitronyl nitroxide, galvinoxyl, and phenoxyl may be used as the positive electrode active material. When a positive electrode active material not containing a charge carrier such as lithium is to be used, a charge carrier has to be added in advance to the positive electrode and/or the negative electrode using a known method. The charge carrier may be added in an ionic state, or may be added in a nonionic state such as a metal. For example, when the charge carrier is lithium, a lithium foil may be pasted to and integrated with the positive electrode and/or the negative electrode.

Specific examples of the positive electrode active material include $LiNi_{0.5}Co_{0.2}Mn_{0.3}O_2$, $LiNi_{1/3}Co_{1/3}Mn_{1/3}O_2$, $LiNi_{0.5}Mn_{0.5}O_2$, $LiNi_{0.75}Co_{0.1}Mn_{0.15}O_2$, $LiMnO_2$, $LiNiO_2$, and $LiCoO_2$ having a layered rock salt structure. Another specific example of the positive electrode active material is $Li_2MnO_3$—$LiCoO_2$.

Specific examples of the positive electrode active material include $Li_xA_yMn_{2-y}O_4$ having a spinel structure ("A" is at least one element selected from Ca, Mg, S, Si, Na, K, Al, P, Ga, or Ge, and/or at least one type of metal element selected from transition metal elements, 0<x≤2.2, 0≤y≤1). More specific examples include $LiMn_2O_4$, and $LiNi_{0.5}Mn_{1.5}O_4$.

Specific examples of the positive electrode active material include $LiFePO_4$, $Li_2FeSiO_4$, $LiCoPO_4$, $Li_2CoPO_4$, $Li_2MnPO_4$, $Li_2MnSiO_4$, and $Li_2CoPO_4F$.

From the viewpoint of having a high capacity, excellent durability, etc., a lithium composite metal oxide having a layered rock salt structure and represented by a general formula: $Li_aNi_bCo_cMn_dD_eO_f$ ($0.2 \le a \le 2$, $b+c+d+e=1$, $0 \le e < 1$, D is at least one element selected from W, Mo, Re, Pd, Ba, Cr, B, Sb, Sr, Pb, Ga, Al, Nb, Mg, Ta, Ti, La, Zr, Cu, Ca, Ir, Hf, Rh, Zr, Fe, Ge, Zn, Ru, Sc, Sn, In, Y, Bi, S, Si, Na, K, P, and V, $1.7 \le f \le 3$) is preferably used as the positive electrode active material.

In the above general formula, the values of "b", "c", and "d" are not particularly limited as long as the values satisfy the above condition, but "b", "c", and "d" preferably satisfy $0<b<1$, $0<c<1$, and $0<d<1$, and at least any one of "b", "c", and "d" is preferably in a range of $10/100<b<90/100$, $10/100<c<90/100$, or $5/100<d<70/100$, more preferably in a range of $20/100<b<80/100$, $12/100<c<70/100$, or $10/100<d<60/100$, and further preferably in a range of $30/100<b<70/100$, $15/100<c<50/100$, and $12/100<d<50/100$.

Regarding "a", "e", and "f", the values thereof may be any values as long as the values are in the ranges specified for the general formula, and a preferable example thereof is $0.5 \le a \le 1.5$, $0 \le e < 0.2$, and $1.8 \le f \le 2.5$, and a more preferable example thereof is $0.8 \le a \le 1.3$, $0 \le e < 0.1$, and $1.9 \le f \le 2.1$.

The mean particle diameter of the positive electrode active material is preferably in a range of 1 to 20 μm, more preferably in a range of 2 to 15 μm, and further preferably in a range of 3 to 10 μm. The mean particle diameter means a D50 measured by a general laser diffraction scattering type particle size distribution measuring device.

The positive electrode active material has a BET specific surface area preferably in a range of 0.1 to 5 m$^2$/g, more preferably in a range of 0.2 to 3 m$^2$/g, and further preferably in a range of 0.3 to 2 m$^2$/g.

In the positive electrode active material layer, the positive electrode active material is contained preferably in a range of 70 to 100 mass %, more preferably in a range of 80 to 99 mass %, further preferably in a range of 88 to 98 mass %, and particularly preferably in a range of 92 to 97 mass %.

In the following, the binding agent and the conductive additive of both the positive electrode and the negative electrode are described.

The binding agent serves to adhere the active material, the conductive additive, or the like, to the surface of the current collector.

As the binding agent, a known binding agent may be used such as a fluorine-containing resin such as polyvinylidene fluoride, polytetrafluoroethylene, or fluororubber, a thermoplastic resin such as polypropylene or polyethylene, an imide based resin such as polyimide or polyamide-imide, an alkoxysilyl group-containing resin, or a styrene-butadiene rubber.

In addition, a polymer having a hydrophilic group may be used as the binding agent. The lithium ion secondary battery of the present invention provided with a polymer having a hydrophilic group as the binding agent of the negative electrode more suitably maintains the capacity thereof in some cases. Examples of the hydrophilic group of the polymer having a hydrophilic group include carboxyl group, sulfo group, silanol group, amino group, hydroxyl group, and phosphoric acid based group such as phosphoric acid group. Among those described above, a polymer containing a carboxyl group in the molecule thereof, such as polyacrylic acid, carboxymethyl cellulose, and polymethacrylic acid, or a polymer containing a sulfo group such as poly(p-styrenesulfonic acid) is preferable.

A polymer containing a large number of carboxyl groups and/or sulfo groups, such as polyacrylic acid or a copolymer of acrylic acid and vinylsulfonic acid, is water soluble. The polymer containing the hydrophilic group is preferably a water soluble polymer, and is preferably a polymer containing multiple carboxyl groups and/or sulfo groups in a single molecule thereof in terms of the chemical structure.

A polymer containing a carboxyl group in the molecule thereof is produced through, for example, a method of polymerizing an acid monomer or a method of imparting a carboxyl group to a polymer. Examples of the acid monomer include acid monomers having one carboxyl group in respective molecules such as acrylic acid, methacrylic acid, vinylbenzoic acid, crotonic acid, pentenoic acid, angelic acid, and tiglic acid, and acid monomers having two or more carboxyl groups in respective molecules such as itaconic acid, mesaconic acid, citraconic acid, fumaric acid, maleic acid, 2-pentenedioic acid, methylenesuccinic acid, allylmalonic acid, isopropylidene succinic acid, 2,4-hexadienedioic acid, and acetylene dicarboxylic acid.

A copolymer obtained through polymerization of two or more types of acid monomers selected from the acid monomers described above may be used as the binding agent.

For example, as disclosed in JP2013065493 (A), a polymer that includes in the molecule thereof an acid anhydride group formed through condensation of carboxyl groups of a copolymer of acrylic acid and itaconic acid is also preferably used as the binding agent. Since the binding agent has a structure derived from a monomer with high acidity by having two or more carboxyl groups in a single molecule thereof, the binding agent is considered to easily trap the lithium ions and the like before a degradation reaction of the electrolytic solution occurs during charging. Furthermore, although the polymer has an increased acidity because the polymer has more carboxyl groups per monomer when compared to polyacrylic acid and polymethacrylic acid, the acidity is not increased too much because a certain amount of carboxyl groups have changed into acid anhydride groups. Therefore, the lithium ion secondary battery of the present invention having the negative electrode using the polymer as the binding agent has improved initial efficiency and improved input-output characteristics.

The blending ratio of the binding agent in the active material layer in mass ratio is preferably active material:binding agent=1:0.005 to 1:0.3. The reason is that if too little of the binding agent is contained, moldability of the electrode deteriorates, whereas if too much of the binding agent is contained, energy density of the electrode becomes low.

The conductive additive is added for increasing conductivity of the electrode. Thus, the conductive additive is preferably added optionally when conductivity of the electrode is insufficient, and does not have to be added when conductivity of the electrode is sufficiently good. As the conductive additive, a fine electron conductor that is chemically inert may be used, and examples thereof include carbonaceous fine particles such as carbon black, graphite, vapor grown carbon fiber, and various metal particles. Examples of carbon black include acetylene black, Ketchen black (registered trademark), furnace black, and channel black. With regard to the conductive additive described above, a single type or a combination of two or more types may be added to the active material layer. The blending ratio of the conductive additive in the active material in mass ratio is preferably active material:conductive additive=1:0.01 to 1:0.5. The reason is that when too little of the conductive additive is contained, efficient conducting paths are not formed, whereas when too much of the conductive additive is contained, moldability of the negative electrode active material layer deteriorates and energy density of the electrode becomes low.

Preferably, a conductive additive having a shape such as a fiber-like shape, a flake-like shape, and a plate-like shape (these shapes are sometimes collectively referred to as "non-spherical shape"), is used, or a conductive additive having a non-spherical shape is used in combination with another conductive additive. With a conductive additive having a non-spherical shape, a long conductive path is ensured compared to that with a conductive additive having a spherical shape. Therefore, in one mode of the lithium ion secondary battery of the present invention in which the thickness of the active material layer is specified to be thick, more suitable charging and discharging are made possible by using a conductive additive having a non-spherical shape.

The mean particle diameter of the conductive additive having a non-spherical shape is preferably in a range of 1 to 30 μm and more preferably in a range of 2 to 20 μm. The mean particle diameter means D50 measured by a general laser diffraction scattering type particle size distribution measuring device. In addition, the non-spherical shape means that, when the conductive additive is represented in three dimensions of an X axis, a Y axis, and a Z axis, the ratio of the maximum length to the minimum length of each of lengths a, b, and c in the respective axial directions is not less than 2.

The negative electrode includes a current collector, and a negative electrode active material layer bound to the surface of the current collector. The negative electrode active material layer contains a negative electrode active material, and, if necessary, a binding agent and/or a conductive additive.

As the current collector of the negative electrode, a suitable one of those described for the positive electrode may be used.

As the negative electrode active material, a material capable of occluding and releasing lithium ions is used. Thus, the material is not limited in particular as long as the material is an elemental substance, an alloy, or a compound capable of occluding and releasing lithium ions. For example, an elemental substance from among Li, group 14 elements such as carbon, silicon, germanium, and tin, group 13 elements such as aluminum and indium, group 12 elements such as zinc and cadmium, group 15 elements such as antimony and bismuth, alkaline earth metals such as magnesium and calcium, and group 11 elements such as silver and gold may be used as the negative electrode active material. When silicon or the like is used as the negative electrode active material, a high capacity active material is obtained since a single silicon atom reacts with multiple lithium atoms. However, a problem that a significant expansion and contraction of volume is caused in association with occlusion and release of lithium may occur. Thus, in order to reduce the possibility of occurrence of the problem, an alloy or a compound obtained by combining an elemental substance of silicon or the like with another element such as a transition metal is suitably used as the negative electrode active material. Specific examples of the alloy or the compound include tin based materials such as Ag—Sn alloys, Cu—Sn alloys, and Co—Sn alloys, carbon based materials such as various graphites, silicon based materials such as $SiO_x$ (0.3≤x≤1.6) that undergoes disproportionation into the elemental substance silicon and silicon dioxide, and a complex obtained by combining a carbon based material with elemental substance silicon or a silicon based material. In addition, as the negative electrode active material, an oxide such as $Nb_2O_5$, $TiO_2$, $Li_4Ti_5O_{12}$, $WO_2$, $MoO_2$, and $Fe_2O_3$, or a nitride represented by $Li_{3-x}M_xN$ (M=Co, Ni, Cu) may be used. With regard to the negative electrode active material, one or more types described above may be used.

Examples of preferable negative electrode active materials from the viewpoint of a possibility of an increase in capacity include graphites, silicon based materials, and tin based materials.

A more specific example of the negative electrode active material is a graphite whose G/D ratio is not lower than 3.5. The G/D ratio is the ratio of G-band and D-band peaks in a Raman spectrum. In the Raman spectrum of graphite, G-band is observed near 1590 cm$^{-1}$ and D-band is observed near 1350 cm$^{-1}$, as peaks, respectively. G-band is derived from a graphite structure and D-band is derived from defects. Thus, having a higher G/D ratio, which is the ratio of G-band and D-band, means the graphite has higher crystallinity with fewer defects. Hereinafter, a graphite whose G/D ratio is not lower than 3.5 is sometimes referred to as a high-crystallinity graphite, and a graphite whose G/D ratio is lower than 3.5 is sometimes referred to as a low-crystallinity graphite.

As such a high-crystallinity graphite, both natural graphites and artificial graphites may be used. When a classification method based on shape is used, flake-like graphites, spheroidal graphites, block-like graphite, earthy graphites, and the like may be used. In addition, coated graphites obtained by coating the surface of a graphite with a carbon material or the like may also be used.

Examples of specific negative electrode active materials include carbon materials whose crystallite size is not larger than 20 nm, and preferably not larger than 5 nm. A larger crystallite size means that the carbon material has atoms arranged periodically and precisely in accordance with a certain rule. On the other hand, a carbon material whose crystallite size is not larger than 20 nm is considered to have atoms being in a state of poor periodicity and poor preciseness in arrangement. For example, when the carbon material is a graphite, the crystallite size becomes not larger than 20 nm when the size of a graphite crystal is not larger than 20 nm or when atoms forming the graphite are arranged irregularly due to distortion, defects, and impurities, etc.

Representative carbon materials whose crystallite size is not larger than 20 nm include hardly graphitizable carbon, which is so-called hard carbon, and easily graphitizable carbon, which is so-called soft carbon.

In order to measure the crystallite size of the carbon material, an X-ray diffraction method using CuKα radiation as an X-ray source may be used. With the X-ray diffraction method, the crystallite size is calculated using the following Scherrer's equation on the basis of a half width of a diffraction peak detected at a diffraction angle of 2θ=20 degrees to 30 degrees and the diffraction angle.

$$L = 0.94\lambda/(\beta \cos \theta)$$

where
L: crystallite size
λ: incident X-ray wavelength (1.54 angstrom)
β: half width of peak (radian)
θ: diffraction angle.

Specific examples of the negative electrode active material include materials containing silicon. A more specific example is $SiO_x$ (0.3≤x≤1.6) disproportionated into two phases of Si phase and silicon oxide phase. The Si phase in $SiO_x$ is capable of occluding and releasing lithium ions, and changes in volume associated with charging and discharging of the secondary battery. The silicon oxide phase changes less in volume associated with charging and discharging when compared to the Si phase. Thus, $SiO_x$ as the negative electrode active material achieves higher capacity because of the Si phase, and when the silicon oxide phase is included, suppresses change in volume of the entirety of the negative electrode active material. When "x" becomes smaller than a lower limit value, cycle characteristics of the secondary battery deteriorate since the change in volume during charging and discharging becomes too large due to the ratio of Si becoming excessive. On the other hand, if "x" becomes larger than an upper limit value, energy density is decreased due to the Si ratio being too small. The range of "x" is more preferably $0.5 \leq x \leq 1.5$, and further preferably $0.7 \leq x \leq 1.2$.

In $SiO_x$ described above, an alloying reaction between lithium and silicon in the Si phase is considered to occur during charging and discharging of the lithium ion secondary battery. This alloying reaction is considered to contribute to charging and discharging of the lithium ion secondary battery. Also in the negative electrode active material including tin described later, charging and discharging are considered to occur by an alloying reaction between tin and lithium.

Specific examples of the negative electrode active material include materials containing tin. More specific examples include Sn elemental substance, tin alloys such as Cu—Sn and Co—Sn, amorphous tin oxides, and tin silicon oxides. Examples of the amorphous tin oxides include $SnB_{0.4}P_{0.6}O_{3.1}$, and examples of the tin silicon oxides include $SnSiO_3$.

The material containing silicon and the material containing tin described above are each preferably made into a composite with a carbon material to be used as the negative electrode active material. By using those materials as a composite, the structure particularly of silicon and/or tin is stabilized, and durability of the negative electrode is improved. Making a composite mentioned above may be performed by a known method. As the carbon material used in the composite, a graphite, a hard carbon, a soft carbon, etc. may be used. The graphite may be a natural graphite or an artificial graphite.

Specific examples of the negative electrode active material include lithium titanate having a spinel structure such as $Li_{4+x}Ti_{5+y}O_{12}$ ($-1 \leq x \leq 4$, $-1 \leq y \leq 1$) and lithium titanate having a ramsdellite structure such as $Li_2Ti_3O_7$.

Specific examples of the negative electrode active material include graphites having a value of long axis/short axis of 1 to 5, and preferably 1 to 3. Here, the long axis means the length of the longest portion of a graphite particle. The short axis means the longest length in directions perpendicular to the long axis. Spheroidal graphites and meso carbon micro beads correspond to the graphite. The spheroidal graphites mean carbon materials which are artificial graphite, natural graphite, easily graphitizable carbon, and hardly graphitizable carbon, for example, and which have spheroidal or substantially spheroidal shapes.

Spheroidal graphite is obtained by grinding graphite into flakes by means of an impact grinder having a relatively small crushing force and by compressing and spheroidizing the flakes. Examples of the impact grinder include a hammer mill and a pin mill. The above operation is preferably performed with the outer-circumference line speed of the hammer or the pin of the mill set at about 50 to 200 m/s. Supply and ejection of graphite with respect to such mills are preferably performed in association with a current of air or the like.

The graphite has a BET specific surface area preferably in a range of 0.5 to 15 $m^2$/g, and more preferably in a range of 2 to 12 $m^2$/g. When the BET specific surface area is too large, side reaction between the graphite and the electrolytic solution is accelerated in some cases. When the BET specific surface area is too small, reaction resistance of the graphite becomes large in some cases.

The mean particle diameter of the graphite is preferably in a range of 2 to 30 μm, and more preferably in a range of 5 to 20 μm. The mean particle diameter means D50 measured by a general laser diffraction scattering type particle size distribution measuring device.

In the negative electrode active material layer, the negative electrode active material is contained preferably in a range of 90 to 100 mass %, more preferably in a range of 95 to 99.5 mass %, further preferably in a range of 96 to 99 mass %, and particularly preferably in a range of 97 to 98.5 mass %.

In order to form the active material layer on the surface of the current collector, the active material may be applied on the surface of the current collector using a known conventional method such as roll coating method, die coating method, dip coating method, doctor blade method, spray coating method, and curtain coating method. Specifically, a composition in a slurry form containing the active material, a solvent, and, if necessary, the binding agent and the conductive additive, is prepared, applied to the surface of the current collector, and then dried to form an electrode. Examples of the solvent include N-methyl-2-pyrrolidone, methanol, methyl isobutyl ketone, and water. In addition, a dispersant may be added to the composition in a slurry form. The active material layer may be formed on one surface of the current collector, but is preferably formed on both surfaces of the current collector. In order to increase electrode density, the electrode is preferably compressed after being dried.

In particular, in one mode of the lithium ion secondary battery of the present invention including a layer compound that is $Li_aNi_bCo_cMn_dD_eO_f$ ($0.2 \leq a \leq 1.2$; $b+c+d+e+=1$; $0 \leq e < 1$; D is at least one element selected from Li, Fe, Cr, Cu, Zn, Ca, Mg, S, Si, Na, K, Al, Zr, Ti, P, Ga, Ge, V, Mo, Nb, W, or La; $1.7 \leq f \leq 2.1$) as a positive electrode active material and including a graphite as a negative electrode active material, in order to make the lithium ion secondary battery into a high capacity type, that is, achieve both a high capacity and high input-output characteristics, the lithium ion secondary battery of the present invention preferably satisfies any of requirements (A) to (H) below.

(A) The porosity of the positive electrode active material layer of the positive electrode is not greater than 50%.

(B) The density of the positive electrode active material layer of the positive electrode is not less than 2.5 g/$cm^3$.

(C) The amount of one positive electrode active material layer present on the current collector of the positive electrode is not less than 5 mg/$cm^2$.

(D) The thickness of one positive electrode active material layer present on the current collector of the positive electrode is not less than 50 μm.

(E) The porosity of the negative electrode active material layer of the negative electrode is not greater than 50%.

(F) The density of the negative electrode active material layer of the negative electrode is not less than 1.1 g/$cm^3$.

(G) The amount of one negative electrode active material layer present on the current collector of the negative electrode is not less than 7 mg/$cm^2$.

(H) The thickness of one negative electrode active material layer present on the current collector of the negative electrode is not less than 50 μm.

In order to make both the positive electrode and the negative electrode have high capacities, the positive electrode active material layer present on the current collector of the positive electrode only needs to satisfy any of the above (A) to (D), and the negative electrode active material layer present on the current collector of the negative electrode only needs to satisfy any of the above (E) to (H).

Regarding the positive electrode, the positive electrode active material layer only needs to satisfy any of the above (A) to (D), but preferably satisfies two of the above (A) to (D), more preferably satisfies three of the above (A) to (D), and further preferably satisfies all of the above (A) to (D).

The porosity specified in (A) is preferably not greater than 40% and more preferably not greater than 30%. The lower the porosity specified in (A) is, the more densely the components are packed in the positive electrode active material layer. If a lower limit of the porosity specified in (A) is to be shown, examples thereof include 10%, 15%, and 20%.

The porosity specified in (A) is calculated from the mass ratio and the true densities of the components contained in the positive electrode active material layer, and the mass and the volume of the positive electrode active material layer. The same applies to other porosities described in the present specification.

The density specified in (B) is preferably not less than 2.6 g/cm$^3$, more preferably not less than 2.7 g/cm$^3$, and further preferably not less than 2.8 g/cm$^3$. If an upper limit of the density specified in (B) is to be shown, examples thereof include 3.5 g/cm$^3$, 4.0 g/cm$^3$, and 4.5 g/cm$^3$. For example, the true density of $LiNi_{5/10}Co_{2/10}Mn_{3/10}O_2$ which is one type of positive electrode active material is 4.8 g/cm$^3$.

The wording "the amount of one positive electrode active material layer present on the current collector of the positive electrode" in (C) is a requirement regarding one positive electrode active material layer present so as to be in contact with the current collector of the positive electrode, and means the mass of the positive electrode active material layer present on an area of 1 square centimeter of one surface of the current collector of the positive electrode (hereinafter, sometimes referred to as "weight per area of the positive electrode"). The weight per area of the positive electrode is preferably not less than 10 mg/cm$^2$ and more preferably not less than 15 mg/cm$^2$. If an upper limit of the weight per area of the positive electrode is to be shown, examples thereof include 30 mg/cm$^2$, 40 mg/cm$^2$, and 50 mg/cm$^2$.

The wording "the thickness of one positive electrode active material layer present on the current collector of the positive electrode" in (D) is a requirement regarding one positive electrode active material layer present so as to be in contact with the current collector of the positive electrode, and means the thickness of the positive electrode active material layer present on one surface of the current collector of the positive electrode (hereinafter, referred to merely as "thickness of the positive electrode active material layer"). The thickness of the positive electrode active material layer is preferably not less than 60 μm, more preferably not less than 80 μm, and further preferably not less than 100 μm. If an upper limit of the thickness of the positive electrode active material layer is to be shown, examples thereof include 150 μm, 300 μm, and 500 μm.

Regarding the negative electrode, the negative electrode active material layer only needs to satisfy any of the above (E) to (H), but preferably satisfies two of the above (E) to (H), more preferably satisfies three of the above (E) to (H), and further preferably satisfies all of the above (E) to (H).

The porosity specified in (E) is preferably not greater than 45%. The lower the porosity specified in (E) is, the more densely the components are packed in the negative electrode active material layer. If a lower limit of the porosity specified in (E) is to be shown, examples thereof include 20%, 25%, and 30%.

The density specified in (F) is preferably not less than 1.2 g/cm$^3$ and more preferably not less than 1.3 g/cm$^3$. If an upper limit of the density specified in (F) is to be shown, examples thereof include 1.6 g/cm$^3$, 1.8 g/cm$^3$, and 2.0 g/cm$^3$. For example, the true density of a graphite which is one type of negative electrode active material is 2.25 g/cm$^3$.

The wording "the amount of one negative electrode active material layer present on the current collector of the negative electrode" in (G) is a requirement regarding one negative electrode active material layer present so as to be in contact with the current collector of the negative electrode, and means the mass of the negative electrode active material layer present on an area of 1 square centimeter of one surface of the current collector of the negative electrode (hereinafter, sometimes referred to as "weight per area of the negative electrode"). The weight per area of the negative electrode is preferably not less than 8 mg/cm$^2$ and more preferably not less than 10 mg/cm$^2$. If an upper limit of the weight per area of the negative electrode is to be shown, examples thereof include 15 mg/cm$^2$, 20 mg/cm$^2$, and 30 mg/cm$^2$.

The wording "the thickness of one negative electrode active material layer present on the current collector of the negative electrode" in (H) is a requirement regarding one negative electrode active material layer present so as to be in contact with the current collector of the negative electrode, and means the thickness of the negative electrode active material layer present on one surface of the current collector of the negative electrode (hereinafter, referred to merely as "thickness of the negative electrode active material layer"). The thickness of the negative electrode active material layer is preferably not less than 70 μm, more preferably not less than 80 μm, and further preferably not less than 100 μm. If an upper limit of the thickness of the negative electrode active material layer is to be shown, examples thereof include 150 μm, 300 μm, and 500 μm.

The lithium ion secondary battery of the present invention preferably satisfies two or more of the above (A) to (H) and more preferably satisfies all of the above (A) to (H).

In order to produce each electrode of the lithium ion secondary battery of the present invention, the applied amount of the composition in a slurry form and a compression pressure to the electrode may be set as appropriate such that the requirements (A) to (H) are satisfied.

The lithium ion secondary battery of the present invention includes a separator if necessary.

The separator is for separating the positive electrode and the negative electrode to allow passage of lithium ions while preventing short circuit due to a contact of both electrodes. As the separator, one that is known may be used. Examples of the separator include porous materials, nonwoven fabrics, and woven fabrics using one or more types of materials having electrical insulation property such as: synthetic resins such as polytetrafluoroethylene, polypropylene, polyethylene, polyimide, polyamide, polyaramide (aromatic polyamide), polyester, and polyacrylonitrile; polysaccharides such as cellulose and amylose; natural polymers such as fibroin, keratin, lignin, and suberin; and ceramics. In addition, the separator may have a multilayer structure.

The separator preferably has appropriate pores, and the porosity thereof is preferably 20 to 50% and more preferably 30 to 45%. In addition, the thickness of the separator is preferably 10 to 40 μm and more preferably 15 to 30 μm.

The lithium ion secondary battery of the present invention may include "another electrode layer" that is an electrode layer different from the positive electrode active material layer, the negative electrode active material layer, and the separator. Examples of the "other electrode layer" include a ceramics-containing layer containing ceramics and a binding agent. The ceramics-containing layer is preferably formed on the surface of the positive electrode active material layer or the negative electrode active material layer to form the positive electrode or the negative electrode. The ceramics-containing layer may cover a part of the surface of a formed active material layer, but preferably covers the entirety of the surface of a formed active material layer.

Examples of the ceramics include $Al_2O_3$, $SiO_2$, $TiO_2$, $ZrO_2$, MgO, SiC, AlN, BN, $CaCO_3$, $MgCO_3$, $BaCO_3$, talc, mica, kaolinite, $CaSO_4$, $MgSO_4$, $BaSO_4$, CaO, ZnO, and zeolite. The ceramics-containing layer contains one or more types of ceramics.

The form of the ceramics is preferably powder. Regarding the particle diameter of the ceramics powder, the mean particle diameter thereof is preferably 0.1 to 10 μm, more preferably 0.2 to 5 μm, and particularly preferably 0.3 to 3 μm. If the mean particle diameter is excessively small, formation of a space, which allows charge carriers to pass therethrough, in the ceramics-containing layer becomes difficult in some cases. If the mean particle diameter is excessively large, the thickness of the ceramics-containing layer increases, and thus resistance generated due to the increase in thickness may have an adverse effect on the output of the lithium ion secondary battery. The mean particle diameter means D50 measured by a laser diffraction scattering type particle size distribution measuring device.

Examples of the binding agent for the ceramics-containing layer include the binding agents described for the active material layer. In addition, other examples of the binding agent for the ceramics-containing layer include polyalkylene glycols such as polyethylene glycol and polypropylene glycol, polyvinyl alcohol, (meth)acrylic resins such as a styrene-acrylic acid copolymer, and derivatives thereof.

Examples of ranges of the mass ratio of the ceramics and the binding agent in the ceramics-containing layer include 80:20 to 99:1, 90:10 to 98:2, and 92:8 to 97:3. If the blending amount of the binding agent in the ceramics-containing layer is excessively small, the ceramics-containing layer may be broken down due to a decrease in the binding force of the ceramics-containing layer to the active material layer or a decrease in the binding force between the ceramics in the ceramics-containing layer. In addition, the flexibility of the entire ceramics-containing layer may be lost and the ceramics-containing layer may be broken by pressure applied to the electrode. Thus, an excessively small blending amount of the binding agent in the ceramics-containing layer is not preferable. If the blending amount of the binding agent in the ceramics-containing layer is excessively large, a decrease in the hardness of the ceramics-containing layer itself is a concern, and an increase in the distances of movement paths for charge carriers between the positive electrode and the negative electrode and a decrease in the number of movement paths due to closure of movement paths are also concerns. Thus, an excessively large blending amount of the binding agent in the ceramics-containing layer is not preferable.

The thickness of the ceramics-containing layer is not particularly limited, but is preferably 0.1 to 20 μm, more preferably 0.5 to 15 μm, and particularly preferably 1 to 12 μm.

In order to provide the ceramics-containing layer on the surface of the active material layer, for example, a drying step may be performed after a step of preparing a ceramics-containing layer forming composition by dispersing the ceramics and the binding agent in a solvent and a step of applying the ceramics-containing layer forming composition to the surface of the active material layer, are performed. Examples of the solvent used for preparing the ceramics-containing layer forming composition include N-methyl-2-pyrrolidone, methanol, ethanol, methyl isobutyl ketone, and water. In the application step, a known conventional method such as roll coating method, dip coating method, doctor blade method, spray coating method, and curtain coating method may be used. The drying step may be performed under a normal pressure condition, or may be performed under a reduced pressure condition using a vacuum dryer. The drying temperature may be set as appropriate in a range where the binding agent is not degraded, and is preferably not lower than the boiling point of the solvent. The drying time may be set as appropriate in accordance with the applied amount and the drying temperature.

A specific method for producing the lithium ion secondary battery of the present invention is described.

An electrode assembly is formed from the positive electrode, the negative electrode, and, if necessary, the separator interposed therebetween. The lithium ion secondary battery is preferably formed by respectively connecting, using current collecting leads or the like, the positive electrode current collector to a positive electrode external connection terminal and the negative electrode current collector to a negative electrode external connection terminal, and then adding the electrolytic solution of the present invention to the electrode assembly. In addition, the lithium ion secondary battery of the present invention preferably executes charging and discharging in a voltage range suitable for the types of active materials contained in the electrodes.

Generally, the state of a positive electrode, a separator, and a negative electrode in a lithium ion secondary battery includes a laminated type in which a plate-like positive electrode, a plate-like separator, and a plate-like negative electrode are laminated, and a wound type in which a positive electrode, a separator, and a negative electrode are wound. In a wound type lithium ion secondary battery, bending force is applied to the active material layers of the electrodes, and bending stress occurs in the active material layers. Here, the active material layers of the lithium ion secondary battery of the present invention that satisfies the above requirements (A) to (H) are not considered to ensure bending stress sufficient to withstand bending force generated in a wound type. Therefore, the lithium ion secondary battery of the present invention is preferably of a laminated type in which a plate-like positive electrode, a plate-like separator, and a plate-like negative electrode are laminated. Furthermore, in the lithium ion secondary battery of the present invention, multiple layers are preferably laminated by repeatedly laminating a positive electrode having an active material layer formed on both surfaces of a current collector, a separator, and a negative electrode having an active material layer formed on both surfaces of a current collector, in the order of positive electrode, separator, negative electrode, separator, positive electrode, separator, and negative electrode.

The form of the lithium ion secondary battery of the present invention is not limited in particular, but various forms such as a square type, a coin type, a laminated type, etc., are used.

The present inventors have found a suitable charging method for the lithium ion secondary battery of the present invention in accordance with characteristics required for the lithium ion secondary battery of the present invention (hereinafter, sometimes referred to as "charging method of the present invention"). The charging method of the present invention is recognizable as an activation method for the lithium ion secondary battery, and is also recognizable as a new method for producing the lithium ion secondary battery. The charging method of the present invention described below partially overlaps with the "activation method for the lithium ion secondary battery of the present invention".

One mode of the charging method of the present invention includes a 1-1st charging step of performing charging at a first rate $C_{1-1}$ that satisfies 0.5 C<$C_{1-1}$≤1.5 C, to a voltage at which at least the unsaturated cyclic carbonate is degraded. Degradation of the components other than the unsaturated cyclic carbonate contained in the electrolytic solution of the present invention is inferred to be suppressed to a certain degree by making the charging rate relatively high. The degradation of the components other than the unsaturated cyclic carbonate contained in the electrolytic solution of the present invention may cause a decrease in the capacity of the lithium ion secondary battery of the present invention. Therefore, the lithium ion secondary battery charged in this mode exhibits a suitable capacity. If the first rate $C_{1-1}$ exceeds 1.5 C, degradation of the unsaturated cyclic carbonate becomes insufficient in some cases. The first rate $C_{1-1}$ preferably satisfies 0.8 C≤$C_{1-1}$≤1.2 C.

Another mode of the charging method of the present invention includes a 1-2nd charging step of performing charging at a first rate $C_{1-2}$ that satisfies 0.01 C<$C_{1-2}$≤0.5 C, to a voltage at which at least the unsaturated cyclic carbonate is degraded. Degradation of the components other than the unsaturated cyclic carbonate contained in the electrolytic solution of the present invention is inferred to be suppressed to a certain degree by setting the charging rate in the above range, although the degree is inferior to that in the 1-1st charging step. In addition, by setting the charging rate in the above range, a longer time for degradation of the unsaturated cyclic carbonate and a longer time for forming a coating on the surface of the negative electrode active material accompanying the degradation of the unsaturated cyclic carbonate are ensured than in the 1-1st charging step. Thus, a high-quality coating is inferred to be formed in the lithium ion secondary battery charged in this mode. The lithium ion secondary battery charged in this mode exhibits an effect that the reaction resistance of the negative electrode charged to an intermediate level is reduced. The first rate $C_{1-2}$ preferably satisfies 0.025 C≤$C_{1-2}$≤0.25 C.

Still another mode of the charging method of the present invention includes a 1-3rd charging step of performing charging at a first rate $C_{1-3}$ that satisfies 0.001 C≤$C_{1-3}$≤0.01 C, to a voltage at which at least the unsaturated cyclic carbonate is degraded. By making the charging rate relatively low, a sufficiently long time for degradation of the unsaturated cyclic carbonate and a sufficiently long time for forming a coating on the surface of the negative electrode active material accompanying the degradation of the unsaturated cyclic carbonate are ensured. Thus, the unsaturated cyclic carbonate contained in the electrolytic solution of the present invention is sufficiently degraded, and the effect due to addition of the unsaturated cyclic carbonate is efficiently exhibited. The lithium ion secondary battery charged in this mode exhibits an effect that the reaction resistance of the negative electrode in a relatively low state of charge is reduced. If the first rate $C_{1-3}$ is less than 0.001 C, the charging time is longer than necessary, and thus such charging is not efficient and degradation of the components other than the unsaturated cyclic carbonate contained in the electrolytic solution of the present invention occurs in some cases. The first rate $C_{1-3}$ preferably satisfies 0.005 C≤$C_{1-3}$≤0.01 C.

The 1-1st charging step, the 1-2nd charging step, and the 1-3rd charging step (hereinafter, these charging steps are sometimes collectively referred to as "first charging step") each specifies a charging rate to a voltage at which at least the unsaturated cyclic carbonate is degraded. The first charging step is preferably performed as the first charging of the lithium ion secondary battery of the present invention. However, even when the first charging step is performed as the second or subsequent charging, a desired effect is considered to be exhibited as long as the unsaturated cyclic carbonate is contained in the electrolytic solution.

The first charging step may be continuously performed beyond the voltage at which the unsaturated cyclic carbonate is degraded, to a final voltage to which charging is to be performed. In addition, charging to the final voltage to which charging is to be performed may be performed in combination with another charging step after the first charging step is performed to the voltage at which the unsaturated cyclic carbonate is degraded or to a voltage exceeding the voltage at which the unsaturated cyclic carbonate is degraded.

Specific examples of a voltage at which the first charging step is ended include the voltage at which the unsaturated cyclic carbonate is degraded, or a voltage higher by 0.05 V or 0.1 V than the voltage at which the unsaturated cyclic carbonate is degraded. If the voltage at which the first charging step is ended is to be shown as a voltage range based on metal lithium, specific examples thereof include 0.7 to 0.9 V and 0.75 to 0.85 V.

The charging method of the present invention preferably includes a second charging step of performing charging at a second rate $C_2$ that satisfies 0.5 C≤$C_2$≤3 C, after the first charging step. Since the charging rate in the second charging step is relatively high, excessive degradation of the electrolytic solution of the present invention is suppressed. If the charging rate exceeds 3 C, variation in potential may occur at the electrode, and a voltage based on metal lithium may be 0 V or lower in local areas of the electrode. The second rate $C_2$ preferably satisfies 0.8 C≤$C_2$≤2 C. The second charging step is preferably performed to the final voltage to which charging is to be performed.

1 C means a current value required for fully charging or discharging the secondary battery in 1 hour with a constant current. 2 C means a current value required for fully charging or discharging the secondary battery in 0.5 hours with a constant current.

The charging method of the present invention may be executed at room temperature or may be executed at an increased temperature. In addition, after charging is performed to the final voltage to which charging is to be performed, a step of keeping the temperature of the lithium ion secondary battery at this voltage or the temperature of the lithium ion secondary battery that has been discharged to a certain degree, under a certain condition (hereinafter, referred to as temperature-keeping step) may be added. The temperature in the temperature-keeping step is preferably in a range of 40 to 120° C. and more preferably in a range of 50 to 100° C. The voltage of the lithium ion secondary battery in the temperature-keeping step may be kept constant or may be naturally occurring voltage. Examples of the period of the temperature-keeping step include 0.5 to 48 hours, 12 to 36 hours, and 18 to 30 hours.

Without departing from the gist of the present invention, a current pause time or a voltage keeping time may be provided in each charging step or between charging steps.

The lithium ion secondary battery of the present invention may be mounted on a vehicle. The vehicle may be a vehicle that uses, as all or one portion of the source of power, electrical energy obtained from the lithium ion secondary battery, and examples thereof include electric vehicles and hybrid vehicles. When the lithium ion secondary battery is to be mounted on the vehicle, a plurality of the lithium ion secondary batteries may be connected in series to form an assembled battery. Other than the vehicles, examples of instruments on which the lithium ion secondary battery may be mounted include various home appliances, office instruments, and industrial instruments driven by a battery such as personal computers and portable communication devices. In addition, the lithium ion secondary battery of the present invention may be used as power storage devices and power smoothing devices for wind power generation, photovoltaic power generation, hydroelectric power generation, and other power systems, power supply sources for auxiliary machineries and/or power of ships, etc., power supply sources for auxiliary machineries and/or power of aircraft and spacecraft, etc., auxiliary power supply for vehicles that do not use electricity as a source of power, power supply for movable household robots, power supply for system backup, power supply for uninterruptible power supply devices, and power storage devices for temporarily storing power required for charging at charge stations for electric vehicles.

A capacitor of the present invention including the electrolytic solution of the present invention may be formed by replacing, with active carbon or the like that is used as a polarized electrode material, a part or all of the negative electrode active material or the positive electrode active material, or a part or all of the negative electrode active material and the positive electrode active material, in the lithium ion secondary battery of the present invention described above. Examples of the capacitor of the present invention include electrical double layer capacitors and hybrid capacitors such as lithium ion capacitors. As the description of the capacitor of the present invention, the description of the lithium ion secondary battery of the present invention above in which "lithium ion secondary battery" is replaced by "capacitor" as appropriate is used.

Although embodiments of the electrolytic solution of the present invention have been described above, the present invention is not limited to the embodiments. Without departing from the gist of the present invention, the present invention can be implemented in various modes with modifications and improvements, etc., that can be made by a person skilled in the art.

EXAMPLES

In the following, the present invention is described specifically by presenting Examples, Comparative Examples, etc. The present invention is not limited to these Examples.

Example 1-1

Vinylene carbonate serving as the unsaturated cyclic carbonate and $(FSO_2)_2NLi$ were dissolved in a mixed solvent obtained by mixing dimethyl carbonate and ethyl methyl carbonate each serving as the linear carbonate at a mole ratio of 9:1, whereby an electrolytic solution of Example 1-1 containing $(FSO_2)_2NLi$ at a concentration of 2.4 mol/L and vinylene carbonate by 0.13 mass % was produced. In the electrolytic solution of Example 1-1, the linear carbonate is contained at a mole ratio of 4 relative to $(FSO_2)_2NLi$.

Example 1-2

An electrolytic solution of Example 1-2 was produced using a method similar to that in Example 1-1 except for increasing the added amount of vinylene carbonate such that vinylene carbonate is contained by 0.63 mass %.

Example 1-3

An electrolytic solution of Example 1-3 was produced using a method similar to that in Example 1-1 except for increasing the added amount of vinylene carbonate such that vinylene carbonate is contained by 1.0 mass %.

Example 1-4

An electrolytic solution of Example 1-4 was produced using a method similar to that in Example 1-1 except for increasing the added amount of vinylene carbonate such that vinylene carbonate is contained by 1.3 mass %.

Example 1-5

An electrolytic solution of Example 1-5 was produced using a method similar to that in Example 1-1 except for increasing the added amount of vinylene carbonate such that vinylene carbonate is contained by 2.5 mass %.

Example 1-6

An electrolytic solution of Example 1-6 was produced using a method similar to that in Example 1-1 except for increasing the added amount of vinylene carbonate such that vinylene carbonate is contained by 6.3 mass %.

Example 1-7

An electrolytic solution of Example 1-7 was produced using a method similar to that in Example 1-1 except for decreasing the added amount of vinylene carbonate such that vinylene carbonate is contained by 0.04 mass %.

Example 1-8

An electrolytic solution of Example 1-8 was produced using a method similar to that in Example 1-1 except for increasing the added amount of vinylene carbonate such that vinylene carbonate is contained by 0.25 mass %.

Example 2-1

An electrolytic solution of Example 2-1 was produced using a method similar to that in Example 1-3 except for adding biphenyl such that biphenyl is contained by 0.5 mass %. Biphenyl is one type of known additives.

Example 2-2

An electrolytic solution of Example 2-2 was produced using a method similar to that in Example 1-3 except for adding biphenyl such that biphenyl is contained by 1.0 mass %.

Comparative Example 1-1

An electrolytic solution of Comparative Example 1-1 was produced using a method similar to that in Example 1-1 except for not adding vinylene carbonate.

Comparative Example 1-2

An electrolytic solution of Comparative Example 1-2 was produced using a method similar to that in Example 1-2 except for decreasing the added amount of $(FSO_2)_2NLi$ such that the concentration of $(FSO_2)_2NLi$ is 1.0 mol/L.

Comparative Example 1-3

An electrolytic solution of Comparative Example 1-3 was produced using a method similar to that in Example 1-2 except for increasing the added amount of $(FSO_2)_2NLi$ such that the concentration of $(FSO_2)_2NLi$ is 3.9 mol/L.

Comparative Example 2-1

$LiPF_6$ was dissolved in a mixed solvent obtained by mixing dimethyl carbonate and ethyl methyl carbonate serving as the linear carbonate and ethylene carbonate serving as the cyclic carbonate at a volume ratio of 4:3:3, whereby an electrolytic solution of Comparative Example 2-1 containing $LiPF_6$ at a concentration of 1.0 mol/L was produced. The electrolytic solution of Comparative Example 2-1 is a conventional general electrolytic solution, and the mole ratio of the organic solvent relative to $LiPF_6$ is approximately 10.

Comparative Example 2-2

Vinylene carbonate serving as the unsaturated cyclic carbonate and $LiPF_6$ were dissolved in a mixed solvent obtained by mixing dimethyl carbonate and ethyl methyl carbonate serving as the linear carbonate and ethylene carbonate serving as the cyclic carbonate at a volume ratio of 4:3:3, whereby an electrolytic solution of Comparative Example 2-2 containing $LiPF_6$ at a concentration of 1.0 mol/L and vinylene carbonate by 0.5 mass % was produced.

Comparative Example 2-3

An electrolytic solution of Comparative Example 2-3 was produced using a method similar to that in Comparative Example 2-2 except for increasing the added amount of $LiPF_6$ such that the concentration of $LiPF_6$ is 1.8 mol/L.

Table 2 shows the list of the electrolytic solutions.

TABLE 2

| | Metal salt | Organic solvent | Metal salt concentration (mol/L) | Mass % of unsaturated cyclic carbonate |
|---|---|---|---|---|
| Example 1-1 | LiFSA | DMC and EMC mole ratio 9:1 | 2.4 | 0.13 |
| Example 1-2 | LiFSA | DMC and EMC mole ratio 9:1 | 2.4 | 0.63 |
| Example 1-3 | LiFSA | DMC and EMC mole ratio 9:1 | 2.4 | 1.0 |
| Example 1-4 | LiFSA | DMC and EMC mole ratio 9:1 | 2.4 | 1.3 |
| Example 1-5 | LiFSA | DMC and EMC mole ratio 9:1 | 2.4 | 2.5 |
| Example 1-6 | LiFSA | DMC and EMC mole ratio 9:1 | 2.4 | 6.3 |
| Example 1-7 | LiFSA | DMC and EMC mole ratio 9:1 | 2.4 | 0.04 |
| Example 1-8 | LiFSA | DMC and EMC mole ratio 9:1 | 2.4 | 0.25 |
| Example 2-1[*] | LiFSA | DMC and EMC mole ratio 9:1 | 2.4 | 1.0 |
| Example 2-2[*] | LiFSA | DMC and EMC mole ratio 9:1 | 2.4 | 1.0 |
| Comparative Example 1-1 | LiFSA | DMC and EMC mole ratio 9:1 | 2.4 | 0 |
| Comparative Example 1-2 | LiFSA | DMC and EMC mole ratio 9:1 | 1.0 | 0.63 |
| Comparative Example 1-3 | LiFSA | DMC and EMC mole ratio 9:1 | 3.9 | 0.63 |
| Comparative Example 2-1 | $LiPF_6$ | DMC, EMC, and EC volume ratio 4:3:3 | 1.0 | 0 |
| Comparative Example 2-2 | $LiPF_6$ | DMC, EMC, and EC volume ratio 4:3:3 | 1.0 | 0.5 |
| Comparative Example 2-3 | $LiPF_6$ | DMC, EMC, and EC volume ratio 4:3:3 | 1.8 | 0.5 |

[*] In the electrolytic solution of Example 2-1, biphenyl is contained by 0.5 mass %.
[*] In the electrolytic solution of Example 2-2, biphenyl is contained by 1.0 mass %.

The meanings of abbreviations in Table 2 and tables below are as follows.
LiFSA: $(FSO_2)_2NLi$
DMC: dimethyl carbonate
EMC: ethyl methyl carbonate
EC: ethylene carbonate

Example I

A lithium ion secondary battery of Example I was produced in the following manner using the electrolytic solution of Example 1-1.

90 parts by mass of $Li_{1.1}Ni_{5/10}Co_{3.5/10}Mn_{1.5/10}O_2$ serving as the positive electrode active material, 8 parts by mass of acetylene black serving as the conductive additive, and 2 parts by mass of polyvinylidene fluoride serving as the binding agent were mixed. This mixture was dispersed in a proper amount of N-methyl-2-pyrrolidone to create a slurry. As the positive electrode current collector, an aluminum foil corresponding to JIS A1000 series and having a thickness of 15 μm was prepared. The slurry was applied in a film form on the surface of the aluminum foil by using a doctor blade. The aluminum foil on which the slurry was applied was dried for 20 minutes at 80° C. to remove N-methyl-2-pyrrolidone. Then, the aluminum foil was pressed to obtain a joined object. The obtained joined object was heated and dried in a vacuum dryer for 6 hours at 120° C. to obtain an aluminum foil having a positive electrode active material layer formed thereon. This was used as the positive electrode. The positive electrode active material layer was formed on the positive electrode current collector at 6 mg/cm$^2$ per unit area of the applied surface. The density of the positive electrode active material layer was 2.5 g/cm$^3$.

98 parts by mass of spheroidal graphite serving as the negative electrode active material, and 1 part by mass of styrene-butadiene-rubber and 1 part by mass of carboxymethyl cellulose, which both served as the binding agent, were mixed. This mixture was dispersed in a proper amount of ion-exchanged water to create a slurry. As the negative electrode current collector, a copper foil having a thickness of 10 µm was prepared. The slurry was applied in a film form on the surface of the copper foil by using a doctor blade. The copper foil on which the slurry was applied was dried to remove water. Then, the copper foil was pressed to obtain a joined object. The obtained joined object was heated and dried in a vacuum dryer for 6 hours at 100° C. to obtain a copper foil having a negative electrode active material layer formed thereon. This was used as the negative electrode. The negative electrode active material layer was formed on the negative electrode current collector at 4 mg/cm$^2$ per unit area of the applied surface. The density of the negative electrode active material layer was 1.1 g/cm$^3$.

As the separator, a polypropylene porous film having a thickness of 20 µm was prepared. An electrode assembly was formed by sandwiching the separator between the positive electrode and the negative electrode. The electrode assembly was covered with a set of two sheets of a laminate film. The laminate film was formed into a bag-like shape by having three sides thereof sealed, and the electrolytic solution of Example 1-1 was poured into the laminate film. Four sides were sealed airtight by sealing the remaining one side to obtain a lithium ion secondary battery in which the electrode assembly and the electrolytic solution were sealed. The amount of the unsaturated cyclic carbonate relative to the surface area of the negative electrode was calculated as 5.0 mg/m$^2$ from the result of measurement of the specific surface area of the negative electrode active material layer of the negative electrode by the BET method.

The following activation process was performed on the obtained lithium ion secondary battery.

Step (a-1)

With respect to the lithium ion secondary battery, charging was performed up to a first voltage of 3.0 V at a first rate of 0.05 C, and then charging was performed up to a second voltage of 4.10 V at a second rate of 1.0 C. Then, the second voltage of 4.10 V was kept for 1.0 hour at 25° C.

Step (b)

With respect to the lithium ion secondary battery having been subjected to step (a-1), discharging was performed down to 3 V at a third rate of 2 C, and then 3 V was kept for 1 hour at 25° C.

Step (c)

With respect to the lithium ion secondary battery having been subjected to step (b), charging and discharging was performed at a fourth rate of 5 C at 60° C., between a third voltage of 3.3 V and the second voltage of 4.1 V. The lithium ion secondary battery for which the above charging and discharging had been repeated 29 times was used as the lithium ion secondary battery of Example I.

Example II

A lithium ion secondary battery of Example II was produced using a method similar to that in Example I except for using the electrolytic solution of Example 1-2. The amount of the unsaturated cyclic carbonate relative to the surface area of the negative electrode was calculated as 24.1 mg/m$^2$ from the result of measurement of the specific surface area of the negative electrode active material layer of the negative electrode by the BET method.

Example III

A lithium ion secondary battery of Example III was produced using a method similar to that in Example I except for using the electrolytic solution of Example 1-3. The amount of the unsaturated cyclic carbonate relative to the surface area of the negative electrode was calculated as 38.2 mg/m$^2$ from the result of measurement of the specific surface area of the negative electrode active material layer of the negative electrode by the BET method.

Example IV

A lithium ion secondary battery of Example IV was produced using a method similar to that in Example I except for using the electrolytic solution of Example 1-4. The amount of the unsaturated cyclic carbonate relative to the surface area of the negative electrode was calculated as 49.6 mg/m$^2$ from the result of measurement of the specific surface area of the negative electrode active material layer of the negative electrode by the BET method.

Example V

A lithium ion secondary battery of Example V was produced using a method similar to that in Example I except for using the electrolytic solution of Example 1-5. The amount of the unsaturated cyclic carbonate relative to the surface area of the negative electrode was calculated as 95.4 mg/m$^2$ from the result of measurement of the specific surface area of the negative electrode active material layer of the negative electrode by the BET method.

Example VI

A lithium ion secondary battery of Example VI was produced using a method similar to that in Example I except for using the electrolytic solution of Example 1-6. The amount of the unsaturated cyclic carbonate relative to the surface area of the negative electrode was calculated as 240.5 mg/m$^2$ from the result of measurement of the specific surface area of the negative electrode active material layer of the negative electrode by the BET method.

Example VII

A lithium ion secondary battery of Example VII was produced using a method similar to that in Example I except for using the electrolytic solution of Example 2-1. The amount of the unsaturated cyclic carbonate relative to the surface area of the negative electrode was calculated as 38.2 mg/m$^2$ from the result of measurement of the specific surface area of the negative electrode active material layer of the negative electrode by the BET method.

Example VIII

A lithium ion secondary battery of Example VIII was produced using a method similar to that in Example I except for using the electrolytic solution of Example 2-2. The amount of the unsaturated cyclic carbonate relative to the surface area of the negative electrode was calculated as 38.2 mg/m$^2$ from the result of measurement of the specific surface area of the negative electrode active material layer of the negative electrode by the BET method.

Comparative Example I

A lithium ion secondary battery of Comparative Example I was produced using a method similar to that in Example I except for using the electrolytic solution of Comparative Example 1-1.

Comparative Example II

A lithium ion secondary battery of Comparative Example II was produced using a method similar to that in Example I except for using the electrolytic solution of Comparative Example 1-2.

Comparative Example III

A lithium ion secondary battery of Comparative Example III was produced using a method similar to that in Example I except for using the electrolytic solution of Comparative Example 1-3.

Comparative Example IV

A lithium ion secondary battery of Comparative Example IV was produced using a method similar to that in Example I except for using the electrolytic solution of Comparative Example 2-1.

Comparative Example V

A lithium ion secondary battery of Comparative Example V was produced using a method similar to that in Example I except for using the electrolytic solution of Comparative Example 2-2.

Comparative Example VI

A lithium ion secondary battery of Comparative Example VI was produced using a method similar to that in Example I except for using the electrolytic solution of Comparative Example 2-3.

Evaluation Example 1

Capacity Retention Rate

With respect to the respective lithium ion secondary batteries of the Examples and the Comparative Examples, the following test was performed to evaluate the capacity retention rate.

For each of the lithium ion secondary batteries, a 4.1 V-3.0 V charging and discharging cycle of, with a constant current at 1 C rate at a temperature of 60° C., charging up to 4.1 V and then discharging down to 3.0 V was performed by 100 cycles. The capacity retention rate (%) of each lithium ion secondary battery after 100 cycles was obtained by the following formula. The results are shown in Table 3.

Capacity retention rate (%)=(B/A)×100

A: discharge capacity at first charging and discharging cycle
B: discharge capacity at 100-th cycle

TABLE 3

| Battery | Electrolytic solution | Metal salt | Metal salt concentration (mol/L) | Mass % of unsaturated cyclic carbonate | Capacity retention rate (%) |
|---|---|---|---|---|---|
| Example I | Example 1-1 | LiFSA | 2.4 | 0.13 | 95 |
| Example II | Example 1-2 | LiFSA | 2.4 | 0.63 | 95 |
| Example III | Example 1-3 | LiFSA | 2.4 | 1.0 | 95 |
| Example IV | Example 1-4 | LiFSA | 2.4 | 1.3 | 96 |
| Example V | Example 1-5 | LiFSA | 2.4 | 2.5 | 96 |
| Example VI | Example 1-6 | LiFSA | 2.4 | 6.3 | 96 |
| Example VII | Example 2-1 | LiFSA | 2.4 | 1.0 | 96 |
| Example VIII | Example 2-2 | LiFSA | 2.4 | 1.0 | 96 |
| Comparative Example I | Comparative Example 1-1 | LiFSA | 2.4 | 0 | 93 |
| Comparative Example II | Comparative Example 1-2 | LiFSA | 1.0 | 0.63 | 93 |
| Comparative Example III | Comparative Example 1-3 | LiFSA | 3.9 | 0.63 | 90 |
| Comparative Example IV | Comparative Example 2-1 | LiPF$_6$ | 1.0 | 0 | 92 |
| Comparative Example V | Comparative Example 2-2 | LiPF$_6$ | 1.0 | 0.5 | 92 |
| Comparative Example VI | Comparative Example 2-3 | LiPF$_6$ | 1.8 | 0.5 | 91 |

From Table 3, the capacity retention rate of each of the lithium ion secondary batteries of the Examples is understood to be better than that of each of the lithium ion secondary batteries of the Comparative Examples. From the results of Examples I to VI and Comparative Example I, the capacity retention rate is understood to improve because of the existence of the unsaturated cyclic carbonate. From the results of Example II and Comparative Examples II and III, the effect due to addition of the unsaturated cyclic carbonate is considered to be insufficient when the concentration of $(FSO_2)_2NLi$ is excessively low or excessively high. In addition, as shown in Comparative Examples IV to VI, the effect due to addition of the unsaturated cyclic carbonate is considered to be insufficient when the metal salt is LiPF$_6$. Therefore, improvement of the capacity retention rate is considered to be achieved due to three factors, that is, the specific lithium salt, the concentration thereof, and the existence of the unsaturated cyclic carbonate in the electrolytic solution of the present invention.

The concentration range of $(FSO_2)_2NLi$ in the electrolytic solution of the present invention is 1.1 to 3.8 mol/L. The electrolytic solution having a $(FSO_2)_2NLi$ concentration equal to the lower limit of this concentration range is considered to be at least more suitable than that of Comparative Example II, and the electrolytic solution having a $(FSO_2)_2NLi$ concentration equal to the upper limit of this concentration range is considered to be at least more suitable than that of Comparative Example III.

Example IX

A lithium ion secondary battery of Example IX was produced using a method similar to that in Example I except for using the electrolytic solution of Example 1-7. The amount of the unsaturated cyclic carbonate relative to the surface area of the negative electrode was calculated as 1.5 mg/m² from the result of measurement of the specific surface area of the negative electrode active material layer of the negative electrode by the BET method.

Example X

A lithium ion secondary battery of Example X was produced using a method similar to that in Example I except for using the electrolytic solution of Example 1-8. The amount of the unsaturated cyclic carbonate relative to the surface area of the negative electrode was calculated as 9.5 mg/m² from the result of measurement of the specific surface area of the negative electrode active material layer of the negative electrode by the BET method.

Evaluation Example 2

Direct Current Resistance

With respect to the lithium ion secondary batteries of Examples I to VIII and Comparative Example I, the following test was performed to evaluate the direct current resistance.

For each of the lithium ion secondary batteries, the voltage was adjusted to 3.65 V with a constant current at 0.5 C rate at a temperature of −10° C., and then, constant current charging was performed at 3 C rate for 10 seconds. From the current value and the amount of change in voltage before and after this charging, the direct current resistance during charging was calculated according to Ohm's law.

Similarly, for each of the lithium ion secondary batteries, the voltage was adjusted to 3.65 V with a constant current at 0.5 C rate at a temperature of −10° C., and then, constant current discharging was performed at 3 C rate for 2 seconds. From the current value and the amount of change in voltage before and after this discharging, the direct current resistance during discharging was calculated according to Ohm's law. The results of the above are shown in Table 4.

In addition, on another day different from the day of the above evaluation, the same test was performed with respect to the lithium ion secondary batteries of Examples IX and X and Comparative Example I. The results of the lithium ion secondary batteries of Examples IX and X are also shown in Table 4. The results of the lithium ion secondary batteries of Examples IX and X in Table 4 are values corrected on the basis of the measurement results of Comparative Example I on both evaluation days.

TABLE 4

| | Metal salt concentration (mol/L) | Mass % of unsaturated cyclic carbonate | Direct current resistance during charging (Ω) | Direct current resistance during discharging (Ω) |
|---|---|---|---|---|
| Example I | 2.4 | 0.13 | 6.8 | 5.7 |
| Example II | 2.4 | 0.63 | 5.5 | 4.4 |
| Example III | 2.4 | 1.0 | 6.3 | 5.2 |
| Example IV | 2.4 | 1.3 | 7.1 | 5.9 |
| Example V | 2.4 | 2.5 | 9.5 | 8.8 |
| Example VI | 2.4 | 6.3 | 16.9 | 14.9 |
| Example VII | 2.4 | 1.0 | 6.7 | 5.5 |
| Example VIII | 2.4 | 1.0 | 6.9 | 5.7 |
| Example IX | 2.4 | 0.04 | 7.3 | 6.0 |
| Example X | 2.4 | 0.25 | 5.7 | 4.5 |
| Comparative Example I | 2.4 | 0 | 7.5 | 6.3 |

From the results in Table 4, in the electrolytic solution in which the unsaturated cyclic carbonate was moderately added, the direct current resistance is understood to decrease, but in the electrolytic solution in which the unsaturated cyclic carbonate was excessively added, the direct current resistance is understood to increase. From the viewpoint of direct current resistance, among the electrolytic solutions of the present invention, the electrolytic solution in which the unsaturated cyclic carbonate is contained by greater than 0 and less than 2.5 mass % is considered to be preferable. In addition, from the results of the direct current resistance in Evaluation Example 2, the amount (mg/m²) of the unsaturated cyclic carbonate relative to the surface area of the negative electrode is considered to be preferably greater than 0 and not greater than 60, and more preferably 5 to 30.

Evaluation Example 3

Analysis of Coating

The coatings on the surfaces of the negative electrode active materials of the lithium ion secondary batteries of Examples I, II, and IV to VI and Comparative Example I were analyzed by the following method.

Each lithium ion secondary battery was discharged down to 3V. Then, each secondary battery was disassembled, and the negative electrode was taken out. Each negative electrode was washed by performing operation of immersing the negative electrode in dimethyl carbonate for 10 minutes three times, then dried, and used as the analysis target negative electrode. All steps from disassembling each lithium ion secondary battery to transporting each analysis target negative electrode to an analyzer were performed in an Ar gas atmosphere. The coatings on the negative electrode surfaces of the analysis targets were analyzed under the following conditions by using X-ray photoelectron spectroscopy.

Apparatus: ULVAC-PHI, Inc., PHI5000 VersaProbe II

X-ray source: monochromatic Al Kα radiation, voltage 15 kV, current 10 mA

Table 5 shows percentages of target elements Li, C, N, O, F, and S obtained through the above analysis with respect to each lithium ion secondary battery.

TABLE 5

|  | Mass % of unsaturated cyclic carbonate | Li (%) | C (%) | N (%) | O (%) | F (%) | S (%) | N + F + S (%) |
|---|---|---|---|---|---|---|---|---|
| Example I | 0.13 | 18.9 | 41.2 | 2.3 | 32.1 | 2.9 | 2.6 | 7.8 |
| Example II | 0.63 | 19.4 | 41.6 | 1.6 | 32.5 | 3.0 | 1.9 | 6.5 |
| Example IV | 1.3 | 15.3 | 48.1 | 1.6 | 30.5 | 2.3 | 2.2 | 6.1 |
| Example V | 2.5 | 14.6 | 49.2 | 1.4 | 31.2 | 1.9 | 1.7 | 5.0 |
| Example VI | 6.3 | 12.4 | 50.5 | 1.2 | 33.2 | 1.5 | 1.2 | 3.9 |
| Comparative Example I | 0 | 18.7 | 40.1 | 3.1 | 30.7 | 4.2 | 3.2 | 10.5 |

From Table 5, the carbon content of the coating is understood to relatively increase with an increase in mass % of the unsaturated cyclic carbonate. On the other hand, the sum of the contents of N, F, and S derived only from $(FSO_2)_2NLi$ is understood to relatively decrease with an increase in mass of the unsaturated cyclic carbonate.

FIGS. 1 to 6 show analysis charts regarding Li, C, N, O, F, and S measured for the lithium ion secondary batteries of Example II, Example VI, and Comparative Example I.

Figure 2:
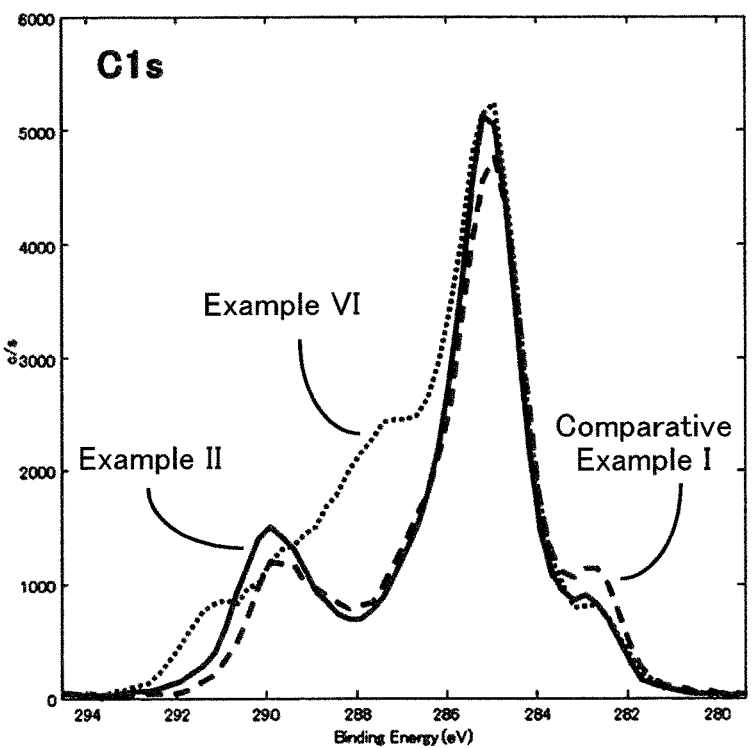
FIG. 2 is an X-ray photoelectron spectroscopy analysis chart regarding C in the lithium ion secondary batteries of Example II, Example VI, and Comparative Example I.
Figure 3:
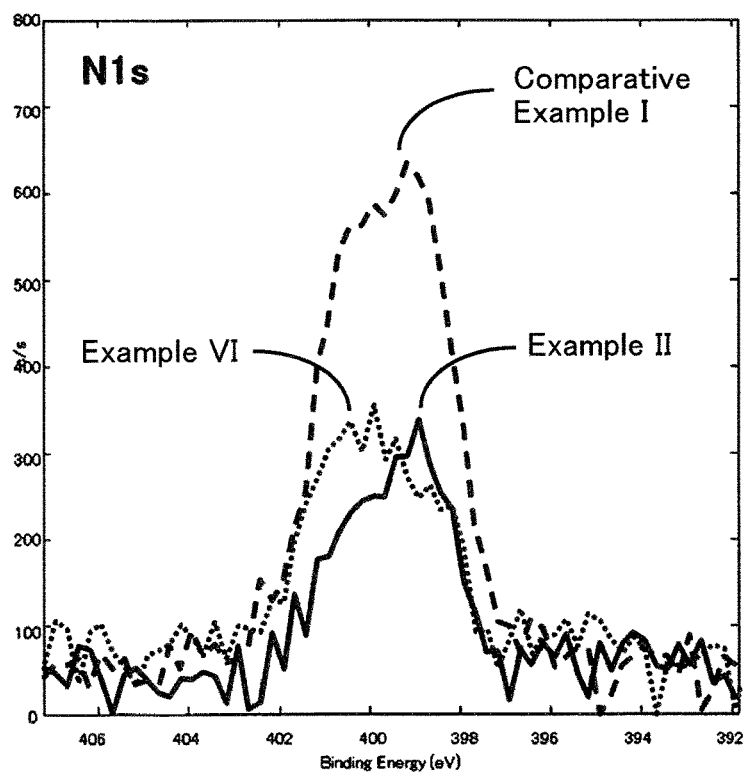
FIG. 3 is an X-ray photoelectron spectroscopy analysis chart regarding N in the lithium ion secondary batteries of Example II, Example VI, and Comparative Example I.
Figure 4:
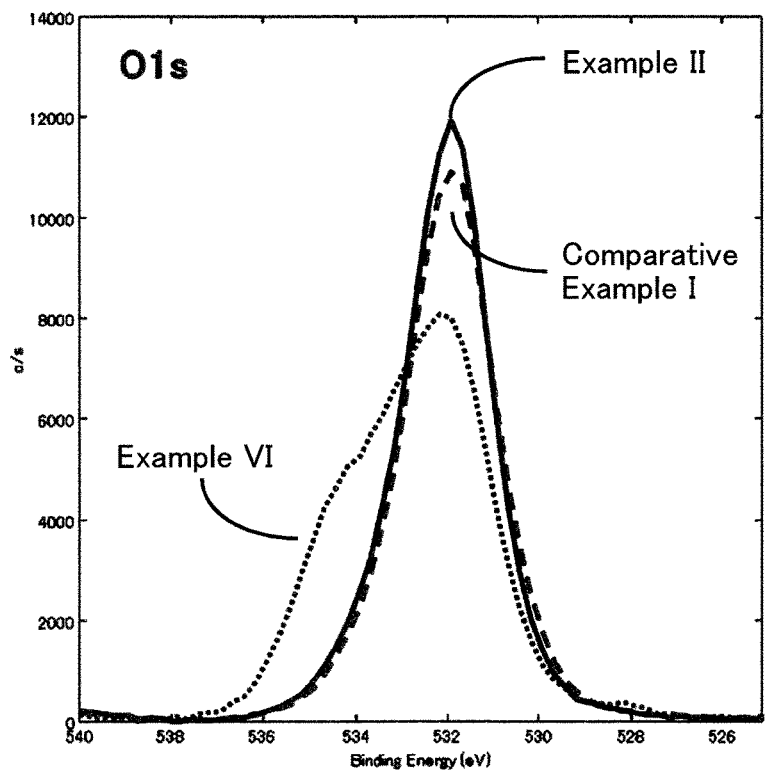
FIG. 4 is an X-ray photoelectron spectroscopy analysis chart regarding O in the lithium ion secondary batteries of Example II, Example VI, and Comparative Example I.
Figure 5:
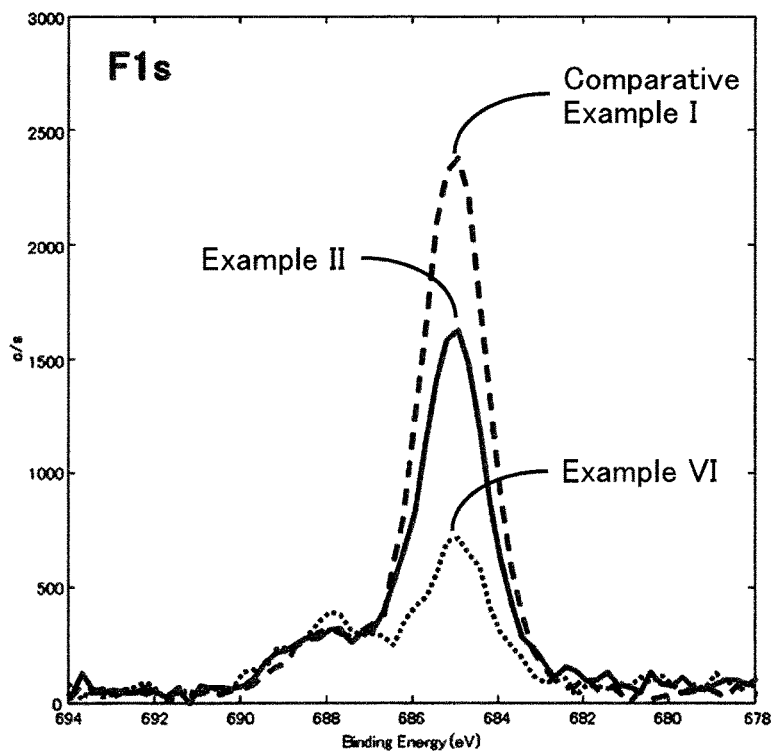
FIG. 5 is an X-ray photoelectron spectroscopy analysis chart regarding F in the lithium ion secondary batteries of Example II, Example VI, and Comparative Example I.
Figure 6:
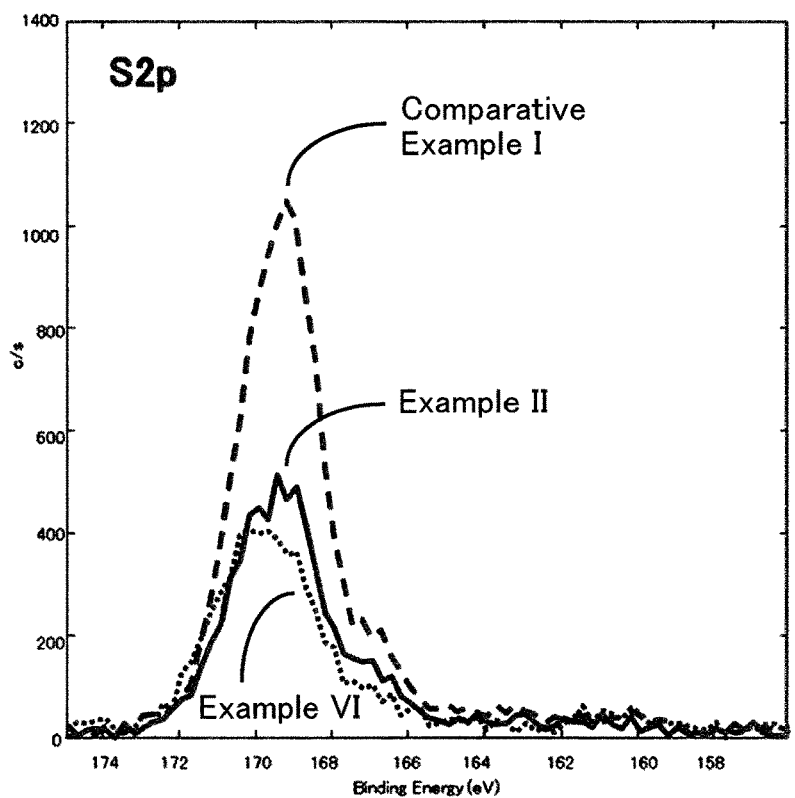
FIG. 6 is an X-ray photoelectron spectroscopy analysis chart regarding S in the lithium ion secondary batteries of Example II, Example VI, and Comparative Example I.

In the analysis chart regarding carbon in FIG. 2, the peak observed at 289.7 eV is considered to be attributed to the chemical structure of $CO_3$. Here, the $CO_3$ structure is considered to be capable of coordinating with lithium ions. Accordingly, when a lot of the $CO_3$ structure exist in the coating, the $CO_3$ structure suitably assists lithium ions in moving within the coating, and thus the resistance during charging and discharging is considered to be suitably reduced. The reason for the suitable resistance value of the lithium ion secondary battery of Example II shown in Evaluation Example 2 is considered as described above.

In the analysis chart of Example VI in FIG. 2, a peak considered to be derived from the unsaturated cyclic carbonate was observed at 287.4 eV. 287.4 eV is a value obtained by subtracting 2.3 eV from 289.7 eV. When the results shown in Evaluation Example 2 are taken into consideration, the resistance of the battery is considered to increase when the peak is higher. Among the electrolytic solutions of the present invention, in the electrolytic solution in which the unsaturated cyclic carbonate excessively exists, some kind of a structure derived from the unsaturated cyclic carbonate is inferred to have excessively been formed in a coating on the negative electrode surface and have adversely affected the resistance. Furthermore, among the electrolytic solutions of the present invention, in the electrolytic solution in which the unsaturated cyclic carbonate excessively exists, the unsaturated cyclic carbonate is also considered to be oxidatively degraded on the positive electrode, thereby forming a high-resistance coating on the positive electrode surface. The reason for the high resistance value of the lithium ion secondary battery of Example VI shown in Evaluation Example 2 is considered as described above.

When the relationship between the peak at 289.7 eV and the peak at 287.4 eV is considered, the resistance is considered to be lower when the value of (intensity of peak at 289.7 eV)/(intensity of peak at 287.4 eV) is higher. Table 6 shows the values of (intensity of peak at 289.7 eV)/(intensity of peak at 287.4 eV) calculated from the analysis results of the respective lithium ion secondary batteries.

TABLE 6

|  | Mass % of unsaturated cyclic carbonate | (Intensity of peak at 289.7 eV)/ (intensity of peak at 287.4 eV) |
|---|---|---|
| Example I | 0.13 | 1.33 |
| Example II | 0.63 | 1.69 |
| Example IV | 1.3 | 0.88 |
| Example V | 2.5 | 0.69 |
| Example VI | 6.3 | 0.55 |
| Comparative Example I | 0 | 1.21 |

Figure 7:
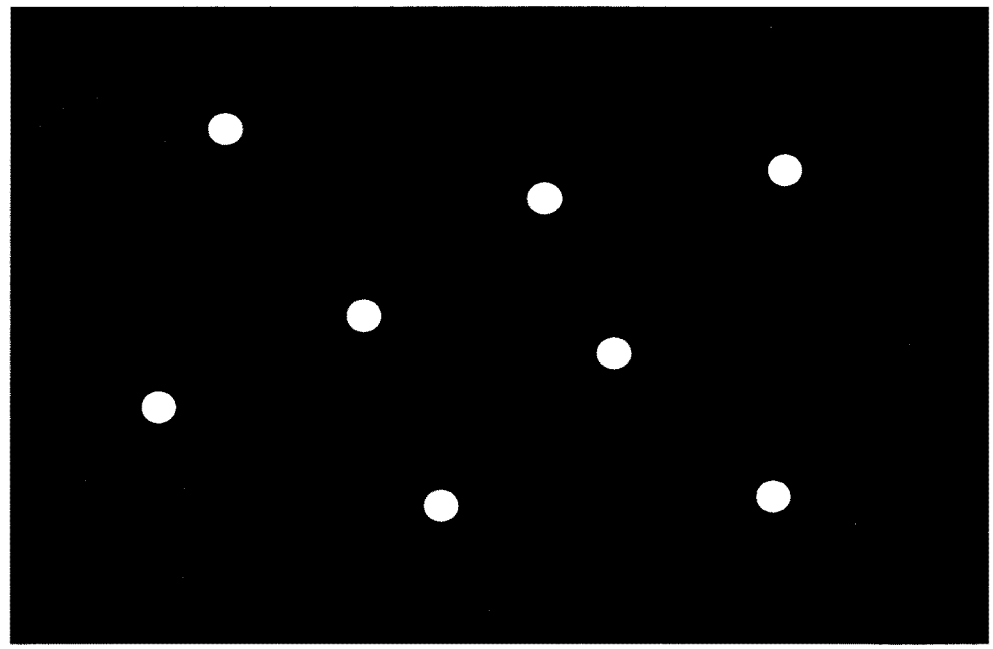
FIG. 7 is a schematic diagram of an SEM image of a coating of the present invention.

When each of the coatings on the surfaces of the negative electrode active materials was observed with a scanning electron microscope (hereinafter, abbreviated as SEM), white materials were found to be present in the form of dots in an SEM image of each coating, which is mainly in black. FIG. 7 shows a schematic diagram of the SEM image of the coating. In each SEM image, the number of white materials having a long diameter of 30 nm or greater was counted. The results are shown in Table 7.

TABLE 7

|  | Mass % of unsaturated cyclic carbonate | Number of white materials per 1 $\mu m^2$ |
|---|---|---|
| Example I | 0.13 | 11.8 |
| Example II | 0.63 | 1.4 |
| Example IV | 1.3 | Uncalculated |
| Example V | 2.5 | Uncalculated |
| Example VI | 6.3 | 0.6 |
| Comparative Example I | 0 | 88.4 |

From Table 7, the number of white materials is understood to decrease with an increase in mass % of the unsaturated cyclic carbonate. Moreover, as a result of Auger electron spectroscopy analysis, the white materials were found to have a higher F content than the portion of the coating other than the materials. The white materials are considered to be mainly derived from $(FSO_2)_2NLi$.

Furthermore, when the electrolytic solution of the present invention was evaluated by cyclic voltammetry with a graphite-containing electrode as a working electrode, a response current inferred to be derived from degradation of the unsaturated cyclic carbonate was initially observed at a potential at the reducing side.

From the above results, in the electrolytic solution of the present invention, the unsaturated cyclic carbonate is considered to be degraded on the negative electrode, thereby forming a coating, and $(FSO_2)_2NLi$ is considered to be then degraded on the negative electrode, thereby forming a coating. In the electrolytic solution of the present invention, the reason why the number of white materials decreased with an increase in mass % of the unsaturated cyclic carbonate is considered to be due to degradation of $(FSO_2)_2NLi$ being suppressed. On the other hand, in the electrolytic solution of Comparative Example 1-1 which was used in Comparative Example I, since no unsaturated cyclic carbonate exists, the number of white materials is considered to increase as a result of much of $(FSO_2)_2NLi$ being degraded.

Example A

Vinylene carbonate serving as the unsaturated cyclic carbonate and $(FSO_2)_2NLi$ were dissolved in a mixed solvent obtained by mixing dimethyl carbonate and ethyl methyl carbonate each serving as the linear carbonate at a mole ratio of 9:1, whereby an electrolytic solution of Example A containing $(FSO_2)_2NLi$ at a concentration of 2.4 mol/L and vinylene carbonate by 1 mass % was produced. In the electrolytic solution of Example A, the linear carbonate is contained at a mole ratio of 4 relative to $(FSO_2)_2NLi$.

Example B

An electrolytic solution of Example B was produced using a method similar to that in Example A except for increasing the added amount of vinylene carbonate such that vinylene carbonate is contained by 1.5 mass %.

Example C

An electrolytic solution of Example C was produced using a method similar to that in Example A except for increasing the added amount of vinylene carbonate such that vinylene carbonate is contained by 2 mass %.

Example D

An electrolytic solution of Example D was produced using a method similar to that in Example A except for increasing the added amount of vinylene carbonate such that vinylene carbonate is contained by 2.5 mass %.

Example E

An electrolytic solution of Example E was produced using a method similar to that in Example A except for increasing the added amount of vinylene carbonate such that vinylene carbonate is contained by 3 mass %.

Example F

An electrolytic solution of Example F was produced using a method similar to that in Example A except for adding cyclohexylbenzene and biphenyl such that cyclohexylbenzene is contained by 1.4 mass % and biphenyl is contained by 1.6 mass %. Cyclohexylbenzene and biphenyl are each one type of known additives.

Example G

An electrolytic solution of Example G was produced using a method similar to that in Example F except for increasing the added amount of vinylene carbonate such that vinylene carbonate is contained by 2.2 mass %.

Example H

An electrolytic solution of Example H was produced using a method similar to that in Example F except for increasing the added amount of vinylene carbonate such that vinylene carbonate is contained by 3.4 mass %.

Example I

An electrolytic solution of Example I was produced using a method similar to that in Example F except for increasing the added amount of vinylene carbonate such that vinylene carbonate is contained by 4.6 mass %.

Comparative Example A

An electrolytic solution of Comparative Example A was produced using a method similar to that in Example A except for not adding vinylene carbonate.

Comparative Example B

An electrolytic solution of Comparative Example B was produced using a method similar to that in Example F except for not adding vinylene carbonate.

Example A-1

A lithium ion secondary battery of Example A-1 using the electrolytic solution of Example A was produced in the following manner.

94 parts by mass of $LiNi_{50/100}Co_{35/100}Mn_{15/100}O_2$ serving as the positive electrode active material, 2 parts by mass of acetylene black serving as the conductive additive, 1 part by mass of a flake-like graphite serving as the conductive additive, 3 parts by mass of polyvinylidene fluoride serving as the binding agent, and a slight amount of a dispersant were mixed. This mixture was dispersed in a proper amount of N-methyl-2-pyrrolidone to create a slurry. As the positive electrode current collector, an aluminum foil corresponding to JIS A1000 series and having a thickness of 15 μm was prepared. The slurry was applied in a film form on a surface of the aluminum foil by using a doctor blade. The aluminum foil on which the slurry was applied was dried for 20 minutes at 80° C. to remove N-methyl-2-pyrrolidone. The same operation was also performed on the surface of the aluminum foil at the opposite side. Then, the aluminum foil was pressed to obtain a joined object. The obtained joined object was heated and dried in a vacuum dryer for 6 hours at 120° C. to obtain an aluminum foil having a positive electrode active material layer formed on both surfaces of the current collector. This was used as a positive electrode plate.

The density of the positive electrode active material layer was 3.0 g/cm$^3$. The weight per area of the positive electrode was 19.18 mg/cm$^2$.

98 parts by mass of a graphite serving as the negative electrode active material, and 1 part by mass of styrene-butadiene-rubber and 1 part by mass of carboxymethyl cellulose, which both served as the binding agent, were mixed. This mixture was dispersed in a proper amount of ion exchanged water to create a slurry. As the negative electrode current collector, a copper foil having a thickness of 10 μm was prepared. The slurry was applied in a film form on the surface of the copper foil by using a doctor blade, and the copper foil on which the slurry was applied was dried to remove water. The same operation was also performed on the surface of the copper foil at the opposite side. Then, the copper foil was pressed to obtain a joined object. The obtained joined object was heated and dried in a vacuum dryer for 6 hours at 100° C. to obtain a copper foil having a negative electrode active material layer formed on both surfaces of the current collector. This was used as a negative electrode plate.

The density of the negative electrode active material layer was 1.28 g/cm$^3$. The weight per area of the negative electrode was 10.05 mg/cm$^2$. When the specific surface area of the negative electrode active material layer of the negative electrode was measured by the BET method, the specific surface area was 2.932 m$^2$/g.

As the separator, a porous film made from polypropylene and having a thickness of 24 μm and a porosity of 40% was prepared.

The positive electrode plate, the separator, and the negative electrode plate were repeatedly laminated in the order of positive electrode plate, separator, negative electrode plate, separator, positive electrode plate, separator, and negative electrode plate, to obtain a laminated body having several tens of layers. The laminated body and the electrolytic solution of Example A were put into a square type battery case, and the battery case was sealed to produce a lithium ion secondary battery of Example A-1.

For the lithium ion secondary battery of Example A-1, the surface area of the negative electrode is calculated as (2.932 m$^2$/g)×(168.86 g)=495.10 m$^2$. In the lithium ion secondary battery of Example A-1, the total amount of the electrolytic solution was 153 mL. The amount of the unsaturated cyclic carbonate relative to the surface area of the negative electrode is calculated as 4.0 mg/m$^2$.

Example A-2

A lithium ion secondary battery of Example A-2 was produced using a method similar to that in Example A-1 except for using a negative electrode having a negative electrode active material layer with a density of 1.4 g/cm$^3$. When the specific surface area of the negative electrode active material layer of the negative electrode was measured by the BET method, the specific surface area was 3.146 m$^2$/g.

For the lithium ion secondary battery of Example A-2, the surface area of the negative electrode is calculated as (3.146 m$^2$/g)×(174.87 g)=550.14 m$^2$. In the lithium ion secondary battery of Example A-2, the total amount of the electrolytic solution was 158 mL. The amount of the unsaturated cyclic carbonate relative to the surface area of the negative electrode is calculated as 3.7 mg/m$^2$.

Example A-3

A lithium ion secondary battery of Example A-3 was produced using a method similar to that in Example A-1 except for using a negative electrode having a negative electrode active material layer with a density of 1.55 g/cm$^3$. When the specific surface area of the negative electrode active material layer of the negative electrode was measured by the BET method, the specific surface area was 3.64 m$^2$/g.

For the lithium ion secondary battery of Example A-3, the surface area of the negative electrode is calculated as (3.64 m$^2$/g)×(135.74 g)=494.09 m$^2$. In the lithium ion secondary battery of Example A-3, the total amount of the electrolytic solution was 100 mL. The amount of the unsaturated cyclic carbonate relative to the surface area of the negative electrode is calculated as 2.6 mg/m$^2$.

Example B-1

A lithium ion secondary battery of Example B-1 was produced using a method similar to that in Example A-1 except for using the electrolytic solution of Example B. For the lithium ion secondary battery of Example B-1, the amount of the unsaturated cyclic carbonate relative to the surface area of the negative electrode is calculated as 6.0 mg/m$^2$.

Example B-2

A lithium ion secondary battery of Example B-2 was produced using a method similar to that in Example A-2 except for using the electrolytic solution of Example B. For the lithium ion secondary battery of Example B-2, the amount of the unsaturated cyclic carbonate relative to the surface area of the negative electrode is calculated as 5.6 mg/m$^2$.

Example C-1

A lithium ion secondary battery of Example C-1 was produced using a method similar to that in Example A-1 except for using the electrolytic solution of Example C. For the lithium ion secondary battery of Example C-1, the amount of the unsaturated cyclic carbonate relative to the surface area of the negative electrode is calculated as 8.0 mg/m$^2$.

Example C-2

A lithium ion secondary battery of Example C-2 was produced using a method similar to that in Example A-2 except for using the electrolytic solution of Example C. For the lithium ion secondary battery of Example C-2, the amount of the unsaturated cyclic carbonate relative to the surface area of the negative electrode is calculated as 7.4 mg/m$^2$.

Example D-1

A lithium ion secondary battery of Example D-1 was produced using a method similar to that in Example A-1 except for using the electrolytic solution of Example D. For the lithium ion secondary battery of Example D-1, the amount of the unsaturated cyclic carbonate relative to the surface area of the negative electrode is calculated as 10 mg/m$^2$.

Example D-2

A lithium ion secondary battery of Example D-2 was produced using a method similar to that in Example A-2 except for using the electrolytic solution of Example D. For the lithium ion secondary battery of Example D-2, the amount of the unsaturated cyclic carbonate relative to the surface area of the negative electrode is calculated as 9.3 mg/m$^2$.

Example E-1

A lithium ion secondary battery of Example E-1 was produced using a method similar to that in Example A-1 except for using the electrolytic solution of Example E. For the lithium ion secondary battery of Example E-1, the amount of the unsaturated cyclic carbonate relative to the surface area of the negative electrode is calculated as 12 mg/m$^2$.

Example E-2

A lithium ion secondary battery of Example E-2 was produced using a method similar to that in Example A-2 except for using the electrolytic solution of Example E. For the lithium ion secondary battery of Example E-2, the amount of the unsaturated cyclic carbonate relative to the surface area of the negative electrode is calculated as 11.1 mg/m$^2$.

Example E-3

A lithium ion secondary battery of Example E-3 was produced using a method similar to that in Example A-3 except for using the electrolytic solution of Example E. For the lithium ion secondary battery of Example E-3, the amount of the unsaturated cyclic carbonate relative to the surface area of the negative electrode is calculated as 7.8 mg/m$^2$.

Comparative Example A-1

A lithium ion secondary battery of Comparative Example A-1 was produced using a method similar to that in Example A-1 except for using the electrolytic solution of Comparative Example A.

Comparative Example A-2

A lithium ion secondary battery of Comparative Example A-2 was produced using a method similar to that in Example A-2 except for using the electrolytic solution of Comparative Example A.

Comparative Example A-3

A lithium ion secondary battery of Comparative Example A-3 was produced using a method similar to that in Example A-3 except for using the electrolytic solution of Comparative Example A.

Evaluation Example 4

Figure 8:
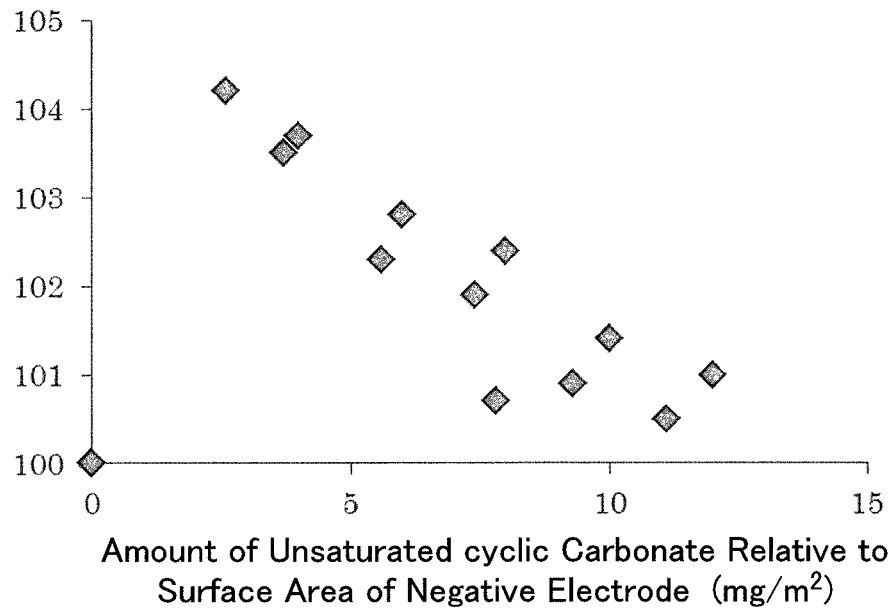
FIG. 8 is a graph showing the relationship between discharge capacity of lithium ion secondary battery and amount of unsaturated cyclic carbonate relative to surface area of negative electrode in Evaluation Example 4.

The discharge capacity was measured when each lithium ion secondary battery charged up to 4.2 V was discharged at a constant discharge rate of 0.2 C down to 3.0 V. Table 8 and FIG. 8 show the results. In Table 8, VC mass % means mass % of the unsaturated cyclic carbonate in the electrolytic solution. In Table 8, VC/G$_{area}$ means the amount of the unsaturated cyclic carbonate relative to the surface area of the negative electrode. For Example A-1, Example B-1, Example C-1, Example D-1, and Example E-1, the discharge capacity (%) in Table 8 is a proportion defined with the value of the discharge capacity of Comparative Example A-1 being set as 100%. For Example A-2, Example B-2, Example C-2, Example D-2, and Example E-2, the discharge capacity (%) in Table 8 is a proportion defined with the value of the discharge capacity of Comparative Example A-2 being set as 100%. For Example A-3 and Example E-1, the discharge capacity (%) in Table 8 is a proportion defined with the value of the discharge capacity of Comparative Example A-3 being set as 100%.

TABLE 8

| Battery | Electrolytic solution | VC mass % | VC/G$_{area}$ | Discharge capacity (%) |
|---|---|---|---|---|
| Example A-1 | Example A | 1 mass % | 4.0 mg/m$^2$ | 103.7 |
| Example A-2 | Example A | 1 mass % | 3.7 mg/m$^2$ | 103.5 |
| Example A-3 | Example A | 1 mass % | 2.6 mg/m$^2$ | 104.2 |
| Example B-1 | Example B | 1.5 mass % | 6.0 mg/m$^2$ | 102.8 |
| Example B-2 | Example B | 1.5 mass % | 5.6 mg/m$^2$ | 102.3 |
| Example C-1 | Example C | 2 mass % | 8.0 mg/m$^2$ | 102.4 |
| Example C-2 | Example C | 2 mass % | 7.4 mg/m$^2$ | 101.9 |
| Example D-1 | Example D | 2.5 mass % | 10 mg/m$^2$ | 101.4 |
| Example D-2 | Example D | 2.5 mass % | 9.3 mg/m$^2$ | 100.9 |
| Example E-1 | Example E | 3 mass % | 12 mg/m$^2$ | 101.0 |
| Example E-2 | Example E | 3 mass % | 11.1 mg/m$^2$ | 100.5 |
| Example E-3 | Example E | 3 mass % | 7.8 mg/m$^2$ | 100.7 |
| Comparative Example A-1 | Comparative Example A | 0 | 0 | 100 |
| Comparative Example A-2 | Comparative Example A | 0 | 0 | 100 |
| Comparative Example A-3 | Comparative Example A | 0 | 0 | 100 |

From the tendency in Table 8 and the graph in FIG. 8, the discharge capacity of the lithium ion secondary battery is understood to be made suitable when the amount of the unsaturated cyclic carbonate relative to the surface area of the negative electrode is in a range of greater than 0 and not greater than 12 mg/m$^2$, particularly, in a range of 2.5 to 12 mg/m$^2$. The advantageous effects exhibited by the lithium ion secondary battery of the present invention are supported.

Example F-1

A lithium ion secondary battery of Example F-1 using the electrolytic solution of Example F was produced in the following manner.

94 parts by mass of LiNi$_{50/100}$Co$_{35/100}$Mn$_{15/100}$O$_2$ serving as the positive electrode active material, 3 parts by mass of acetylene black serving as the conductive additive, 3 parts by mass of polyvinylidene fluoride serving as the binding agent, and a slight amount of a dispersant were mixed. This mixture was dispersed in a proper amount of N-methyl-2-pyrrolidone to create a slurry. As the positive electrode current collector, an aluminum foil corresponding to a JIS A8000 series alloy and having a thickness of 12 μm was prepared. The slurry was applied in a film form on a surface of the aluminum foil by using a doctor blade. The aluminum foil on which the slurry was applied was dried for 20 minutes at 80° C. to remove N-methyl-2-pyrrolidone. The same operation was also performed on the surface of the aluminum foil at the opposite side. Then, the aluminum foil was pressed to obtain a joined object. The obtained joined object was heated and dried in a vacuum dryer for 6 hours at 120° C. to obtain an aluminum foil having a positive electrode active material layer formed on both surfaces of the current collector. This was used as a positive electrode plate.

The density of the positive electrode active material layer was 3.1 g/cm$^3$. The weight per area of the positive electrode was 17.99 mg/cm$^2$.

98 parts by mass of a graphite serving as the negative electrode active material, and 1 part by mass of styrene-butadiene-rubber and 1 part by mass of carboxymethyl cellulose, which both served as the binding agent, were mixed. This mixture was dispersed in a proper amount of ion exchanged water to create a slurry. As the negative electrode current collector, a copper foil having a thickness of 10 μm was prepared. The slurry was applied in a film form on the surface of the copper foil by using a doctor blade, and the copper foil on which the slurry was applied was dried to remove water. The same operation was also performed on the surface of the copper foil at the opposite side. Then, the copper foil was pressed to obtain a joined object. The obtained joined object was heated and dried in a vacuum dryer for 6 hours at 100° C. to obtain a copper foil having a negative electrode active material layer formed on both surfaces of the current collector. This was used as a negative electrode plate.

The density of the negative electrode active material layer was 1.55 g/cm$^3$. The weight per area of the negative electrode was 9.53 mg/cm$^2$. When the specific surface area of the negative electrode active material layer of the negative electrode was measured by the BET method, the specific surface area was 3.64 m$^2$/g.

94 parts by mass of $Al_2O_3$ serving as the ceramics, 6 parts by mass of polyvinylidene fluoride serving as the binding agent, an adequate amount of N-methyl-2-pyrrolidone were mixed to produce a ceramics-containing layer forming composition in a slurry form. The ceramics-containing layer forming composition was applied in a film form on the surface of the negative electrode active material layer in the negative electrode plate. The negative electrode plate, on which the ceramics-containing layer forming composition was applied, was dried to remove N-methyl-2-pyrrolidone, thereby forming a ceramics-containing layer. The same operation was also performed on the surface of the negative electrode plate at the opposite side. Then, the negative electrode plate having the ceramics-containing layer formed on both surfaces thereof was pressed to obtain a joined object. The obtained joined object was heated and dried to produce a negative electrode plate having a negative electrode active material layer and a ceramics-containing layer formed on both surfaces of the negative electrode current collector. The thickness of the ceramics-containing layer was 5 μm.

As the separator, a porous film made from polyethylene and having a thickness of 20 μm and a porosity of 47% was prepared.

The negative electrode plate, the separator, and the positive electrode plate were repeatedly laminated in the order of negative electrode plate, separator, positive electrode plate, separator, negative electrode plate, separator, positive electrode plate, separator, and negative electrode plate, to obtain a laminated body. The laminated body and the electrolytic solution of Example F were put into a bag made from a laminate film, and the bag was sealed to produce a lithium ion secondary battery of Example F-1.

For the lithium ion secondary battery of Example F-1, the surface area of the negative electrode is calculated as (3.64 m$^2$/g)×(2.66 g)=9.69 m$^2$. In the lithium ion secondary battery of Example F-1, the total amount of the electrolytic solution was 1.25 mL. The amount of the unsaturated cyclic carbonate relative to the surface area of the negative electrode is calculated as 1.65 mg/m$^2$.

Example G-1

A lithium ion secondary battery of Example G-1 was produced using a method similar to that in Example F-1 except for using the electrolytic solution of Example G as the electrolytic solution. The amount of the unsaturated cyclic carbonate relative to the surface area of the negative electrode is calculated as 3.63 mg/m$^2$.

Example H-1

A lithium ion secondary battery of Example H-1 was produced using a method similar to that in Example F-1 except for using the electrolytic solution of Example H as the electrolytic solution. The amount of the unsaturated cyclic carbonate relative to the surface area of the negative electrode is calculated as 5.61 mg/m$^2$.

Example I-1

A lithium ion secondary battery of Example I-1 was produced using a method similar to that in Example F-1 except for using the electrolytic solution of Example I as the electrolytic solution. The amount of the unsaturated cyclic carbonate relative to the surface area of the negative electrode is calculated as 7.59 mg/m$^2$.

Comparative Example B-1

A lithium ion secondary battery of Comparative Example B-1 was produced using a method similar to that in Example F-1 except for using the electrolytic solution of Comparative Example B as the electrolytic solution.

Evaluation Example 5

Figure 9:
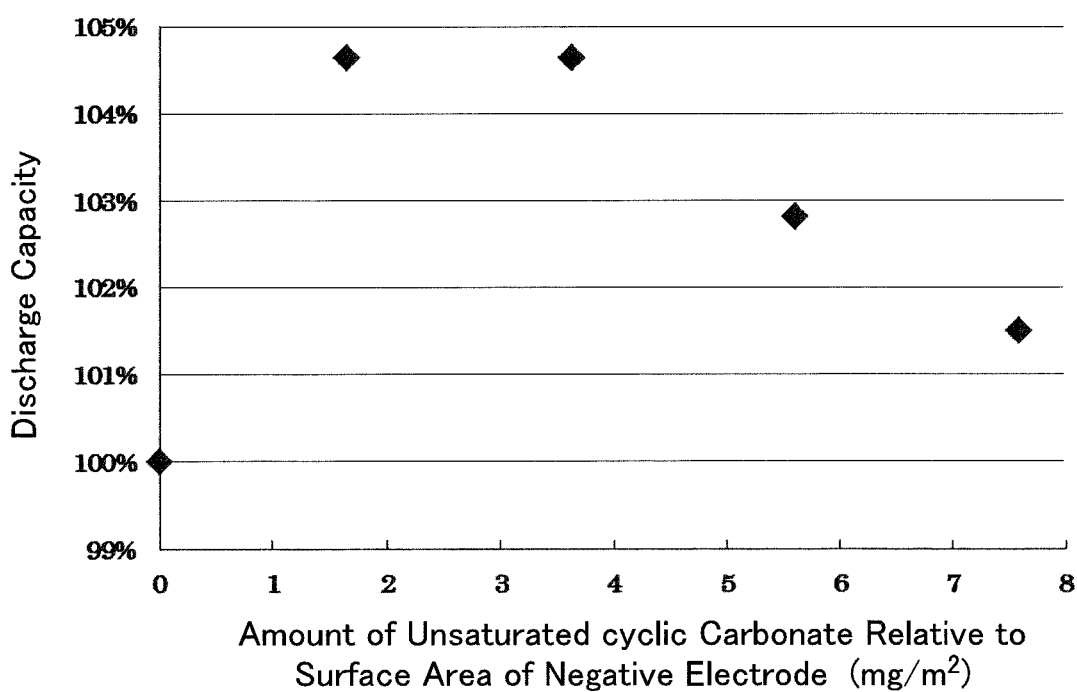
FIG. 9 is a graph showing the relationship between discharge capacity of lithium ion secondary battery and amount of unsaturated cyclic carbonate relative to surface area of negative electrode in Evaluation Example 5.

The discharge capacity was measured when each lithium ion secondary battery charged up to 3.98 V was discharged at a constant discharge rate of 1 C down to 3.0 V. Table 9 and FIG. 9 show the results. In Table 9, VC mass % means mass % of the unsaturated cyclic carbonate in the electrolytic solution. In Table 9, VC/G$_{area}$ means the amount of the unsaturated cyclic carbonate relative to the surface area of the negative electrode. The discharge capacity (%) in Table 9 is a proportion defined with the value of the discharge capacity of Comparative Example B-1 being set as 100%.

TABLE 9

| Battery | Electrolytic solution | VC mass % | VC/G$_{area}$ | Discharge capacity (%) |
|---|---|---|---|---|
| Example F-1 | Example F | 1 mass % | 1.65 mg/m$^2$ | 104.6 |
| Example G-1 | Example G | 2.2 mass % | 3.63 mg/m$^2$ | 104.6 |
| Example H-1 | Example H | 3.4 mass % | 5.61 mg/m$^2$ | 102.8 |
| Example I-1 | Example I | 4.6 mass % | 7.59 mg/m$^2$ | 101.5 |
| Comparative Example B-1 | Comparative Example B | 0 | 0 | 100 |

From the tendency in Table 9 and the graph in FIG. 9, the discharge capacity of the lithium ion secondary battery is understood to be made suitable when the amount of the unsaturated cyclic carbonate relative to the surface area of the negative electrode is in a range of greater than 0 and not greater than 12 mg/m$^2$, particularly, in a range of 1 to 8 mg/m$^2$. The advantageous effects exhibited by the lithium ion secondary battery of the present invention are supported.

Evaluation Example 6

The discharge time was measured when each lithium ion secondary battery adjusted to 3.6 V was discharged down to 3.0 V at a constant output at 25° C. This measurement was performed under a plurality of conditions in which the output was changed. From the obtained results, a constant output at which the discharge time from 3.6 V to 3.0 V was 10 seconds was calculated for the lithium ion secondary battery. Table 10 shows a proportion of the output of each lithium ion secondary battery defined with the output of Comparative Example B being set as 100%.

TABLE 10

| Battery | Electrolytic solution | VC mass % | VC/G$_{area}$ | Output (%) |
|---|---|---|---|---|
| Example F-1 | Example F | 1 mass % | 1.65 mg/m$^2$ | 109.1 |
| Example G-1 | Example G | 2.2 mass % | 3.63 mg/m$^2$ | 111.9 |
| Example H-1 | Example H | 3.4 mass % | 5.61 mg/m$^2$ | 110.0 |
| Example I-1 | Example I | 4.6 mass % | 7.59 mg/m$^2$ | 104.7 |
| Comparative Example B-1 | Comparative Example B | 0 | 0 | 100 |

Figure 10:
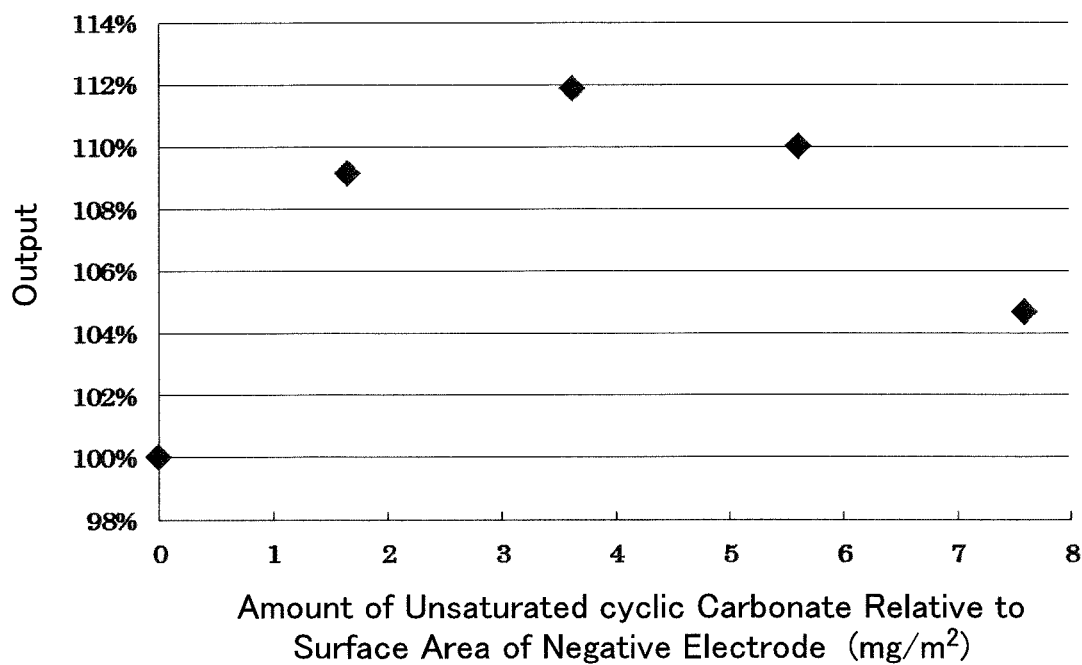
FIG. 10 is a graph showing the relationship between output of lithium ion secondary battery and amount of unsaturated cyclic carbonate relative to surface area of negative electrode in Evaluation Example 6.

From the tendency in Table 10 and the graph in FIG. 10, the output of the lithium ion secondary battery is understood to be made suitable when the amount of the unsaturated cyclic carbonate relative to the surface area of the negative electrode is in a range of greater than 0 and not greater than 12 mg/m$^2$, particularly, in a range of 1 to 8 mg/m$^2$. The advantageous effects exhibited by the lithium ion secondary battery of the present invention are supported.

Application Example 1

With respect to the lithium ion secondary battery of Example A-1, charging was performed under the following conditions.
1-1st charging step: The lithium ion secondary battery of Example A-1 was charged at 1 C to a voltage of 0.8 V based on metal lithium. The vinylene carbonate is degraded at this voltage.
Second charging step: The lithium ion secondary battery subjected to the 1-1st charging step was charged at 1 C until the voltage between the electrodes reached 4.2 V.
Temperature-keeping step: The lithium ion secondary battery was adjusted to a voltage corresponding to an SOC (state of charge) of 85% defined with a lithium ion secondary battery at 4.2 V being set to have an SOC of 100% and with a lithium ion secondary battery at 3.0 V being set to have an SOC of 0%. This battery was stored in a temperature controlled bath at 60° C. for 20 hours. During the storage, the voltage was naturally occurring voltage.
The lithium ion secondary battery subjected to the temperature-keeping step was used as a lithium ion secondary battery of Application Example 1.

Application Example 2

A lithium ion secondary battery of Application Example 2 was obtained using a method similar to that in Application Example 1 except for using the following 1-2nd charging step instead of the 1-1st charging step.
1-2nd charging step: The lithium ion secondary battery of Example A-1 was charged at 0.05 C to a voltage of 0.8 V based on metal lithium.

Application Example 3

A lithium ion secondary battery of Application Example 3 was obtained using a method similar to that in Application Example 1 except for using the following 1-3rd charging step instead of the 1-1st charging step.

1-3rd charging step: The lithium ion secondary battery of Example A-1 was charged at 0.01 C to a voltage of 0.8 V based on metal lithium.

Evaluation Example 7-1

The lithium ion secondary batteries of Application Examples 1 to 3 were adjusted to a voltage corresponding to an SOC of 85%, and then discharged at 1 C to a voltage corresponding to an SOC of 15%. The discharge capacities at this time were measured. The results are shown in Table 11. The discharge capacity shown in Table 11 was a value defined with the discharge capacity of the lithium ion secondary battery of Application Example 1 being set as 100.

Evaluation Example 7-2

A lithium reference electrode was inserted into each of the lithium ion secondary batteries of Application Examples 1 to 3, constant current charging and discharging was performed at room temperature, and an alternating current impedance was measured. The reaction resistance of the negative electrodes was analyzed at voltages corresponding to an SOC of 55% and an SOC of 25% on the basis of the sizes of arcs observed on obtained complex impedance planar plots. The results are shown in Table 11.

TABLE 11

| | Charging rate in first charging step | Discharge capacity | Reaction resistance in SOC 55% | Reaction resistance in SOC 25% |
|---|---|---|---|---|
| Application Example 1 | 1 C | 100 | 0.20 mΩ | 0.25 mΩ |
| Application Example 2 | 0.05 C | 99.4 | 0.12 mΩ | 0.25 mΩ |
| Application Example 3 | 0.01 C | 98.5 | 0.21 mΩ | 0.17 mΩ |

Regarding the discharge capacity, the discharge capacity of the lithium ion secondary battery is considered to increase as the charging rate in the first charging step increases. Since the charge time is shortened as the charging rate in the first charging step increases, excessive degradation of the electrolytic solution, which may be a cause for the irreversible capacity of the lithium ion secondary battery, is suppressed. This phenomenon is considered to be reflected in the results of Evaluation Example 7-1.
Regarding the reaction resistance, both the charging rate in the first charging step and the state of charge of the battery are considered to influence the reaction resistance. In the lithium ion secondary battery of Application Example 2, a coating suitable for reactions for occluding and releasing lithium in a charge region with an SOC of approximately 55% is considered to be formed on the surface of the negative electrode active material. In the lithium ion secondary battery of Application Example 3, a coating suitable for reactions for occluding and releasing lithium in a low charge region with an SOC of approximately 25% is considered to be formed on the surface of the negative electrode active material.

Evaluation Example 7-3

With respect to the lithium ion secondary batteries of Application Examples 1 to 3, an output (W) was measured at −20° C. from an SOC of 25% to an SOC of 0% for 3 minutes. As a result, the output of the lithium ion secondary battery of Application Example 3 was found to be better than those of the other lithium ion secondary batteries.

From the results of Evaluation Examples 7-1 to 7-3, a suitable first charging step is selected in view of specific use of the lithium ion secondary battery of the present invention. In the case of desiring the highest capacity, the 1-1st charging step is preferably used as the first charging step. In the case of decreasing the battery resistance in a charge region with an SOC of approximately 55%, the 1-2nd charging step is preferably used as the first charging step. In addition, in the case of decreasing the battery resistance in a low discharge region with an SOC of approximately 25% to obtain an excellent output, the 1-3rd charging step is preferably used as the first charging step.

The following describes Production Examples and Reference Evaluation Examples of electrolytic solutions not containing the unsaturated cyclic carbonate.

Production Example 1-1

$(FSO_2)_2NLi$ was dissolved in dimethyl carbonate, whereby an electrolytic solution of Production Example 1-1 containing $(FSO_2)_2NLi$ at a concentration of 4.5 mol/L was produced. In the electrolytic solution of Production Example 1-1, the organic solvent is contained at a mole ratio of 1.6 relative to the lithium salt.

Production Example 1-2

$(FSO_2)_2NLi$ was dissolved in dimethyl carbonate, whereby an electrolytic solution of Production Example 1-2 containing $(FSO_2)_2NLi$ at a concentration of 3.9 mol/L was produced. In the electrolytic solution of Production Example 1-2, the organic solvent is contained at a mole ratio of 2 relative to the metal salt.

Production Example 1-3

$(FSO_2)_2NLi$ was dissolved in dimethyl carbonate, whereby an electrolytic solution of Production Example 1-3 containing $(FSO_2)_2NLi$ at a concentration of 3.0 mol/L was produced. In the electrolytic solution of Production Example 1-3, the organic solvent is contained at a mole ratio of 3 relative to the lithium salt.

Production Example 1-4

$(FSO_2)_2NLi$ was dissolved in dimethyl carbonate, whereby an electrolytic solution of Production Example 1-4 containing $(FSO_2)_2NLi$ at a concentration of 2.7 mol/L was produced. In the electrolytic solution of Production Example 1-4, the organic solvent is contained at a mole ratio of 3.5 relative to the lithium salt.

Production Example 1-5

$(FSO_2)_2NLi$ was dissolved in dimethyl carbonate, whereby an electrolytic solution of Production Example 1-5 containing $(FSO_2)_2NLi$ at a concentration of 2.4 mol/L was produced. In the electrolytic solution of Production Example 1-5, the organic solvent is contained at a mole ratio of 4 relative to the lithium salt.

Production Example 1-6

$(FSO_2)_2NLi$ was dissolved in dimethyl carbonate, whereby an electrolytic solution of Production Example 1-6 containing $(FSO_2)_2NLi$ at a concentration of 2.0 mol/L was produced. In the electrolytic solution of Production Example 1-6, the organic solvent is contained at a mole ratio of 5 relative to the lithium salt.

Production Example 1-7

$(FSO_2)_2NLi$ was dissolved in dimethyl carbonate, whereby an electrolytic solution of Production Example 1-7 containing $(FSO_2)_2NLi$ at a concentration of 1.0 mol/L was produced. In the electrolytic solution of Production Example 1-7, the organic solvent is contained at a mole ratio of 11 relative to the metal salt.

Production Example 2-1

$(FSO_2)_2NLi$ was dissolved in a mixed solvent obtained by mixing dimethyl carbonate and diethyl carbonate at a mole ratio of 9:1, whereby an electrolytic solution of Production Example 2-1 containing $(FSO_2)_2NLi$ at a concentration of 2.9 mol/L was produced. In the electrolytic solution of Production Example 2-1, the organic solvent is contained at a mole ratio of 3 relative to the lithium salt.

Production Example 2-2

$(FSO_2)_2NLi$ was dissolved in a mixed solvent obtained by mixing dimethyl carbonate and diethyl carbonate at a mole ratio of 7:1, whereby an electrolytic solution of Production Example 2-2 containing $(FSO_2)_2NLi$ at a concentration of 2.9 mol/L was produced. In the electrolytic solution of Production Example 2-2, the organic solvent is contained at a mole ratio of 3 relative to the lithium salt.

Production Example 2-3

$(FSO_2)_2NLi$ was dissolved in a mixed solvent obtained by mixing dimethyl carbonate and diethyl carbonate at a mole ratio of 9:1, whereby an electrolytic solution of Production Example 2-3 containing $(FSO_2)_2NLi$ at a concentration of 2.4 mol/L was produced. In the electrolytic solution of Production Example 2-3, the organic solvent is contained at a mole ratio of 4 relative to the lithium salt.

Production Example 3

$(FSO_2)_2NLi$ was dissolved in a mixed solvent obtained by mixing dimethyl carbonate and propylene carbonate at a mole ratio of 7:1, whereby an electrolytic solution of Production Example 3 containing $(FSO_2)_2NLi$ at a concentration of 3.0 mol/L was produced. In the electrolytic solution of Production Example 3, the organic solvent is contained at a mole ratio of 3 relative to the lithium salt.

Production Example 4

$(FSO_2)_2NLi$ was dissolved in a mixed solvent obtained by mixing dimethyl carbonate and ethylene carbonate at a mole ratio of 7:1, whereby an electrolytic solution of Production Example 4 containing $(FSO_2)_2NLi$ at a concentration of 3.0 mol/L was produced. In the electrolytic solution of Production Example 4, the organic solvent is contained at a mole ratio of 3.1 relative to the lithium salt.

Production Example 5

$(FSO_2)_2NLi$ was dissolved in ethyl methyl carbonate, whereby an electrolytic solution of Production Example 5 containing $(FSO_2)_2NLi$ at a concentration of 2.2 mol/L was produced. In the electrolytic solution of Production Example 5, the organic solvent is contained at a mole ratio of 3.5 relative to the lithium salt.

Production Example 6

$(FSO_2)_2NLi$ was dissolved in diethyl carbonate, whereby an electrolytic solution of Production Example 6 containing $(FSO_2)_2NLi$ at a concentration of 2.0 mol/L was produced. In the electrolytic solution of Production Example 6, the organic solvent is contained at a mole ratio of 3.5 relative to the lithium salt.

Production Example 7-1

$(FSO_2)_2NLi$ was dissolved in a mixed solvent obtained by mixing dimethyl carbonate and ethyl methyl carbonate at a mole ratio of 9:1, whereby an electrolytic solution of Production Example 7-1 containing $(FSO_2)_2NLi$ at a concentration of 2.9 mol/L was produced. In the electrolytic solution of Production Example 7-1, the organic solvent is contained at a mole ratio of 3 relative to the lithium salt.

Production Example 7-2

$(FSO_2)_2NLi$ was dissolved in a mixed solvent obtained by mixing dimethyl carbonate and ethyl methyl carbonate at a mole ratio of 9:1, whereby an electrolytic solution of Production Example 7-2 containing $(FSO_2)_2NLi$ at a concentration of 2.6 mol/L was produced. In the electrolytic solution of Production Example 7-2, the organic solvent is contained at a mole ratio of 3.6 relative to the lithium salt.

Production Example 7-3

$(FSO_2)_2NLi$ was dissolved in a mixed solvent obtained by mixing dimethyl carbonate and ethyl methyl carbonate at a mole ratio of 9:1, whereby an electrolytic solution of Production Example 7-3 containing $(FSO_2)_2NLi$ at a concentration of 2.4 mol/L was produced. In the electrolytic solution of Production Example 7-3, the organic solvent is contained at a mole ratio of 4 relative to the lithium salt.

Table 12 shows the list of the electrolytic solutions of the Production Examples.

TABLE 12

| | Lithium salt | Organic solvent | Number of moles of organic solvent/ number of moles of lithium salt | Metal salt concentration (mol/L) |
|---|---|---|---|---|
| Production Example 1-1 | LiFSA | DMC | 1.6 | 4.5 |
| Production Example 1-2 | LiFSA | DMC | 2 | 3.9 |
| Production Example 1-3 | LiFSA | DMC | 3 | 3.0 |
| Production Example 1-4 | LiFSA | DMC | 3.5 | 2.7 |
| Production Example 1-5 | LiFSA | DMC | 4 | 2.4 |
| Production Example 1-6 | LiFSA | DMC | 5 | 2.0 |
| Production Example 1-7 | LiFSA | DMC | 10 | 1.0 |
| Production Example 2-1 | LiFSA | DMC and DEC mole ratio 9:1 | 3 | 2.9 |
| Production Example 2-2 | LiFSA | DMC and DEC mole ratio 7:1 | 3 | 2.9 |
| Production Example 2-3 | LiFSA | DMC and DEC mole ratio 9:1 | 4 | 2.4 |
| Production Example 3 | LiFSA | DMC and PC mole ratio 7:1 | 3 | 3.0 |
| Production Example 4 | LiFSA | DMC and EC mole ratio 7:1 | 3.1 | 3.0 |
| Production Example 5 | LiFSA | EMC | 3.5 | 2.2 |
| Production Example 6 | LiFSA | DEC | 3.5 | 2.0 |
| Production Example 7-1 | LiFSA | DMC and EMC mole ratio 9:1 | 3 | 2.9 |
| Production Example 7-2 | LiFSA | DMC and EMC mole ratio 9:1 | 3.6 | 2.6 |
| Production Example 7-3 | LiFSA | DMC and EMC mole ratio 9:1 | 4 | 2.4 |

The meanings of abbreviations in Table 12 and tables below are as follows.
LiFSA: $(FSO_2)_2NLi$
DMC: dimethyl carbonate
EMC: ethyl methyl carbonate
DEC: diethyl carbonate
PC: propylene carbonate
EC: ethylene carbonate Reference Evaluation Example 1

Ionic Conductivity

Ionic conductivities of the electrolytic solutions of Production Examples were measured under the following conditions. The results are shown in Table 13. Each blank in the table means that measurement was not performed.

Ionic Conductivity Measuring Conditions

Under an Ar atmosphere, an electrolytic solution was sealed in a glass cell that had a platinum electrode and whose cell constant was known, and impedance thereof was measured at 30° C., 1 kHz. Ionic conductivity was calculated on the basis of the measurement result of the impedance. As a measurement instrument, Solartron 147055BEC (Solartron Analytical) was used.

TABLE 13

| | Lithium salt | Organic solvent | Number of moles of organic solvent/ number of moles of lithium salt | Ionic conductivity (mS/cm) |
|---|---|---|---|---|
| Production Example 1-1 | LiFSA | DMC | 1.6 | 2.6 |
| Production Example 1-2 | LiFSA | DMC | 2 | 3.2 |
| Production Example 1-3 | LiFSA | DMC | 3 | 5.9 |

TABLE 13-continued

| | Lithium salt | Organic solvent | Number of moles of organic solvent/ number of moles of lithium salt | Ionic conductivity (mS/cm) |
|---|---|---|---|---|
| Production Example 1-4 | LiFSA | DMC | 3.5 | |
| Production Example 1-5 | LiFSA | DMC | 4 | |
| Production Example 1-6 | LiFSA | DMC | 5 | 8.7 |
| Production Example 1-7 | LiFSA | DMC | 11 | 6.8 |
| Production Example 2-1 | LiFSA | DMC and DEC mole ratio 9:1 | 3 | |
| Production Example 2-2 | LiFSA | DMC and DEC mole ratio 7:1 | 3 | |
| Production Example 2-3 | LiFSA | DMC and DEC mole ratio 9:1 | 4 | |
| Production Example 3 | LiFSA | DMC and PC mole ratio 7:1 | 3 | 4.7 |
| Production Example 4 | LiFSA | DMC and EC mole ratio 7:1 | 3.1 | 4.8 |
| Production Example 5 | LiFSA | EMC | 3.5 | |
| Production Example 6 | LiFSA | DEC | 3.5 | |
| Production Example 7-1 | LiFSA | DMC and EMC mole ratio 9:1 | 3 | |
| Production Example 7-2 | LiFSA | DMC and EMC mole ratio 9:1 | 3.6 | |
| Production Example 7-3 | LiFSA | DMC and EMC mole ratio 9:1 | 4 | |

The electrolytic solutions of all Production Examples exhibited suitable ionic conductivity. Thus, the electrolytic solution of the present invention is understood to suitably function as an electrolytic solution for various power storage devices. In addition, from the results of the electrolytic solutions of Production Example 1-3, Production Example 3, and Production Example 4, the ionic conductivity is understood to decrease when the cyclic carbonate is used as a part of the organic solvent.

Here, with respect to the electrolytic solutions of Production Example 1-1, Production Example 1-2, Production Example 1-3, Production Example 1-6, and Production Example 1-7, in all of which the linear carbonate is DMC, the relationship between the ionic conductivity and the mole ratio of linear carbonate/lithium salt is shown in a graph. The graph is shown in FIG. 11.

Figure 11:
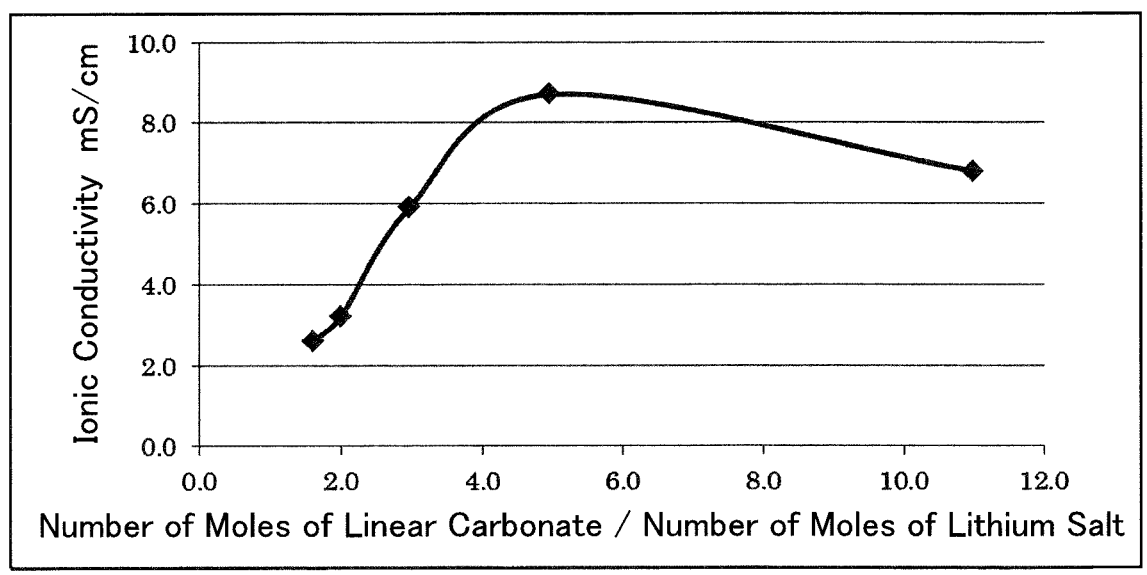
FIG. 11 is a graph of the relationship between ionic conductivity and mole ratio of a linear carbonate relative to a lithium salt obtained in Reference Evaluation Example 1.

FIG. 11 suggests that the local maximum of the ionic conductivity is present at a mole ratio of linear carbonate/lithium salt within a range of 3 to 6.

Reference Evaluation Example 2

Density

The densities at 20° C. of the electrolytic solutions of Production Examples were measured. The results are shown in Table 14. Each blank in the table means that measurement was not performed.

TABLE 14

| | Lithium salt | Organic solvent | Number of moles of organic solvent/ number of moles of lithium salt | Density (g/cm³) |
|---|---|---|---|---|
| Production Example 1-1 | LiFSA | DMC | 1.6 | 1.48 |
| Production Example 1-2 | LiFSA | DMC | 2 | 1.44 |
| Production Example 1-3 | LiFSA | DMC | 3 | 1.38 |
| Production Example 1-4 | LiFSA | DMC | 3.5 | 1.35 |
| Production Example 1-5 | LiFSA | DMC | 4 | 1.31 |
| Production Example 1-6 | LiFSA | DMC | 5 | 1.27 |
| Production Example 1-7 | LiFSA | DMC | 11 | 1.16 |
| Production Example 2-1 | LiFSA | DMC and DEC mole ratio 9:1 | 3 | 1.33 |
| Production Example 2-2 | LiFSA | DMC and DEC mole ratio 7:1 | 3 | |
| Production Example 2-3 | LiFSA | DMC and DEC mole ratio 9:1 | 4 | |
| Production Example 3 | LiFSA | DMC and PC mole ratio 7:1 | 3 | 1.38 |
| Production Example 4 | LiFSA | DMC and EC mole ratio 7:1 | 3.1 | 1.39 |
| Production Example 5 | LiFSA | EMC | 3.5 | |
| Production Example 6 | LiFSA | DEC | 3.5 | 1.20 |
| Production Example 7-1 | LiFSA | DMC and EMC mole ratio 9:1 | 3 | 1.34 |
| Production Example 7-2 | LiFSA | DMC and EMC mole ratio 9:1 | 3.6 | 1.32 |
| Production Example 7-3 | LiFSA | DMC and EMC mole ratio 9:1 | 4 | |

Reference Evaluation Example 3

Viscosity

The viscosities of the electrolytic solutions of Production Examples were measured under the following conditions. The results are shown in Table 15. Each blank in the table means that measurement was not performed.

Viscosity Measuring Conditions

In an Ar atmosphere, an electrolytic solution was sealed in a test cell, and viscosity was measured under a condition of 30° C. by using a falling ball viscometer (Lovis 2000 M manufactured by Anton Paar GmbH).

TABLE 15

| | Lithium salt | Organic solvent | Number of moles of organic solvent/ number of moles of lithium salt | Viscosity (mPa · s) |
|---|---|---|---|---|
| Production Example 1-1 | LiFSA | DMC | 1.6 | 105.5 |
| Production Example 1-2 | LiFSA | DMC | 2 | 50.9 |
| Production Example 1-3 | LiFSA | DMC | 3 | 17.6 |
| Production Example 1-4 | LiFSA | DMC | 3.5 | |
| Production Example 1-5 | LiFSA | DMC | 4 | |
| Production Example 1-6 | LiFSA | DMC | 5 | 5.4 |

TABLE 15-continued

| | Lithium salt | Organic solvent | Number of moles of organic solvent/ number of moles of lithium salt | Viscosity (mPa · s) |
|---|---|---|---|---|
| Production Example 1-7 | LiFSA | DMC | 11 | 1.7 |
| Production Example 2-1 | LiFSA | DMC and DEC mole ratio 9:1 | 3 | |
| Production Example 2-2 | LiFSA | DMC and DEC mole ratio 7:1 | 3 | |
| Production Example 2-3 | LiFSA | DMC and DEC mole ratio 9:1 | 4 | |
| Production Example 3 | LiFSA | DMC and PC mole ratio 7:1 | 3 | 17.8 |
| Production Example 4 | LiFSA | DMC and EC mole ratio 7:1 | 3.1 | 18.0 |
| Production Example 5 | LiFSA | EMC | 3.5 | |
| Production Example 6 | LiFSA | DEC | 3.5 | |
| Production Example 7-1 | LiFSA | DMC and EMC mole ratio 9:1 | 3 | |
| Production Example 7-2 | LiFSA | DMC and EMC mole ratio 9:1 | 3.6 | |
| Production Example 7-3 | LiFSA | DMC and EMC mole ratio 9:1 | 4 | |

When the viscosity of an electrolytic solution is excessively low, if a power storage device including such an electrolytic solution is broken, leakage of a large amount of the electrolytic solution is a concern. On the other hand, when the viscosity of an electrolytic solution is excessively high, a decrease in ion conductive property of the electrolytic solution is a concern, and a decrease in productivity becomes a concern due to inferior impregnating ability of the electrolytic solution into the electrode, the separator, etc., during manufacture of the power storage device. In the electrolytic solutions in which the mole ratio of linear carbonate/lithium salt is approximately 3 to 6, the viscosity is understood to be neither excessively low nor excessively high.

In addition, from the results of the electrolytic solutions of Production Example 1-3, Production Example 3, and Production Example 4, the viscosity is understood to increase when the cyclic carbonate is used as a part of the organic solvent.

Reference Evaluation Example 4

Low Temperature Storage Test

Each of the electrolytic solutions of Production Example 1-2, Production Example 1-3, Production Example 1-5, Production Example 1-6, and Production Example 1-7 was placed in a container, and the container was filled with inert gas and sealed. These containers were stored in a freezer at −20° C. for 2 days. Each electrolytic solution having been stored was observed. The results are shown in Table 16.

TABLE 16

| | Lithium salt | Organic solvent | Linear carbonate/ lithium salt | State of electrolytic solution after storage |
|---|---|---|---|---|
| Production Example 1-2 | LiFSA | DMC | 2 | No change |
| Production Example 1-3 | LiFSA | DMC | 3 | No change |
| Production Example 1-5 | LiFSA | DMC | 4 | No change |
| Production Example 1-6 | LiFSA | DMC | 5 | Solidified |
| Production Example 1-7 | LiFSA | DMC | 11 | Solidified |

The electrolytic solutions are understood to be easily solidified at a low temperature when the value of the mole ratio of linear carbonate/lithium salt increases, that is, becomes closer to conventional values. The electrolytic solution of Production Example 1-6 was solidified as a result of having been stored at −20° C. for 2 days, but is considered to be less likely to be solidified when compared to the electrolytic solution of Production Example 1-7, which is an electrolytic solution having a conventional concentration.

Reference Evaluation Example 5

DSC Measurement

The electrolytic solution of Production Example 1-3 was placed in a stainless steel pan, and the pan was sealed. Using an empty sealed pan as a control, differential scanning calorimetry analysis was performed in a nitrogen atmosphere using the following temperature program. As a differential scanning calorimeter, Rigaku DSC8230 was used.

Temperature program: Increase the temperature from room temperature to 70° C. at 5° C./min, and keep the temperature for 10 minutes→decrease the temperature to −120° C. at 5° C./min, and keep the temperature for 10 minutes→increase the temperature to 70° C. at 3° C./min.

Figure 12:
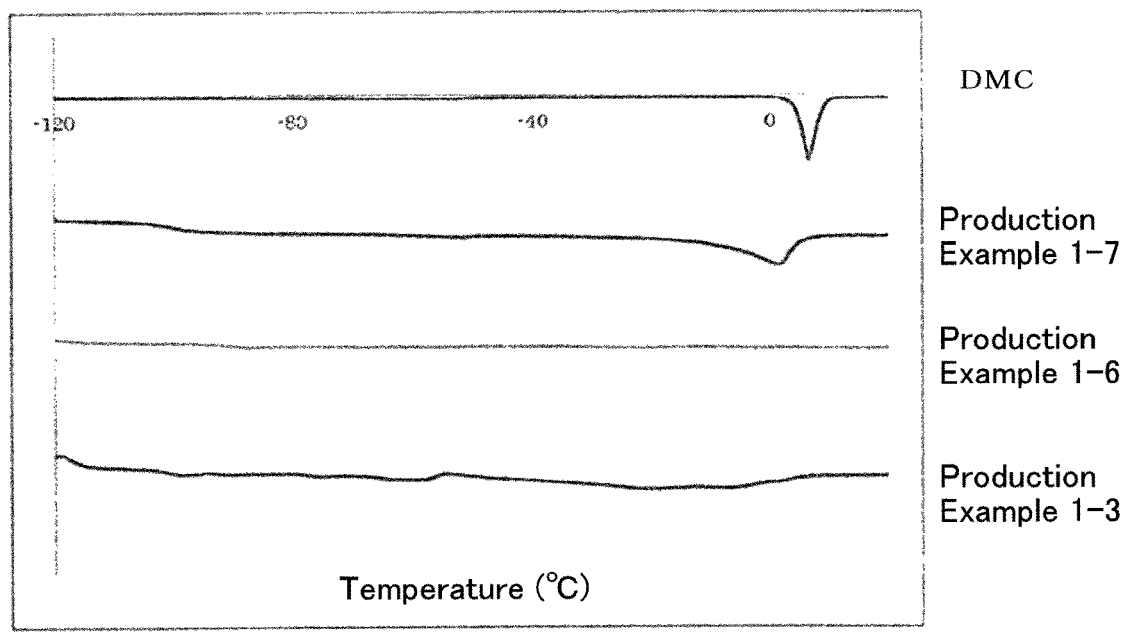
FIG. 12 shows overlaid DSC curves obtained in Reference Evaluation Example 5.

The DSC curve obtained when the temperature was increased from −120° C. to 70° C. at 3° C./min was observed. Also, with respect to the electrolytic solution of Production Example 1-6, the electrolytic solution of Production Example 1-7, and DMC, differential scanning calorimetry analysis was performed in a similar manner. FIG. 12 shows the overlaid respective DSC curves.

In each of the DSC curves of DMC and the electrolytic solution of Production Example 1-7 in FIG. 12, a melting peak was observed near 0 to 10° C. On the other hand, in each of the DSC curves of Production Example 1-3 and Production Example 1-6, no clear melting peak was observed. This result suggests that the electrolytic solutions in which the mole ratio of linear carbonate/lithium salt is approximately 3 to 6 are less likely to be solidified or crystallized in a low temperature environment. Thus, suitable ones of the electrolytic solutions of the present invention are speculated to suppress to some extent a decrease in ionic conductivity in a low temperature environment. With respect to the electrolytic solutions of the present invention, when usage in a low temperature environment is important, not only DMC having a melting point near 4° C. but also EMC having a melting point near −55° C. and DEC having a melting point near −43° C. are preferably used in combination as the linear carbonate.

Reference Evaluation Example 6

DSC Measurement <2>

The electrolytic solution of Production Example 2-3 was placed in a pan formed from aluminum, and the pan was sealed. Using an empty sealed pan as a control, differential scanning calorimetry analysis was performed in a nitrogen atmosphere using the following temperature program. As a differential scanning calorimeter, DSC Q2000 (manufactured by TA Instruments) was used.

Temperature program: Decrease the temperature from room temperature to −75° C. at 5° C./min, and keep the temperature for 10 minutes→increase the temperature to 70° C. at 5° C./min.

The DSC curve obtained when the temperature was increased from −75° C. to 70° C. at 5° C./min was observed.

Figure 13:
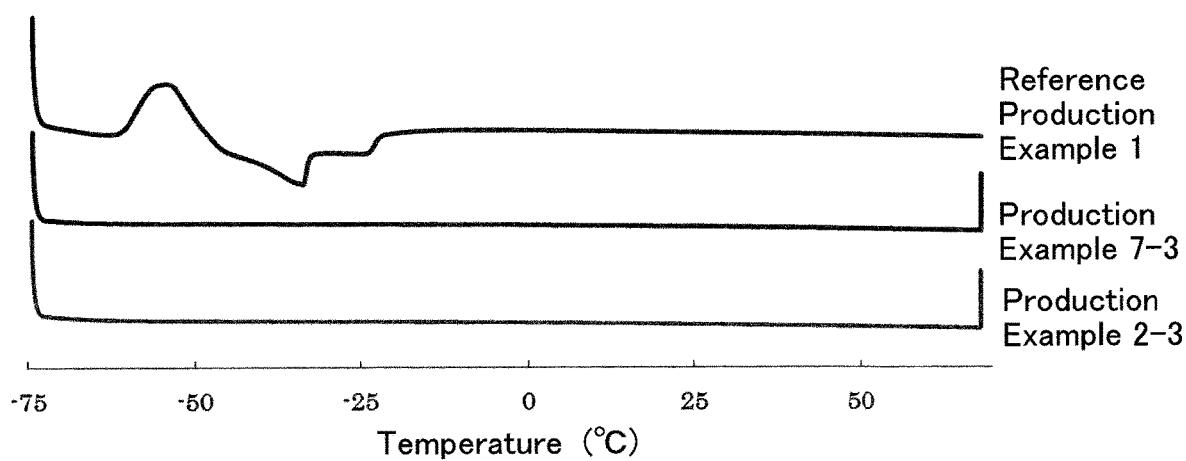
FIG. 13 shows overlaid DSC curves obtained in Reference Evaluation Example 6.

Also with respect to the electrolytic solution of Production Example 7-3 and an electrolytic solution of Reference Production Example 1 described below, differential scanning calorimetry analysis was performed in a similar manner. FIG. 13 shows the overlaid respective DSC curves.

Reference Production Example 1

$LiPF_6$ serving as the electrolyte was dissolved in a mixed solvent obtained by mixing ethylene carbonate serving as the cyclic carbonate and ethyl methyl carbonate and dimethyl carbonate serving as the linear carbonate at a volume ratio of 3:3:4, whereby an electrolytic solution of Reference Production Example 1 containing $LiPF_6$ at a concentration of 1.0 mol/L was produced. In the electrolytic solution of Reference Production Example 1, the organic solvent is contained at a mole ratio of approximately 10 relative to the electrolyte.

With reference to FIG. 13, in the DSC curve of the electrolytic solution of Reference Production Example 1, an endothermic peak estimated to be derived from the melting point was observed near −50 to −20° C. On the other hand, no endothermic peak was observed in the DSC curves of Production Example 2-3 and Production Example 7-3. The electrolytic solution of the present invention using the linear carbonate in combination is also suggested to be less likely to be solidified or crystallized in a low temperature environment. Therefore, secondary batteries using the electrolytic solution of the present invention are speculated to suitably operate even under a significantly low temperature condition.

The invention claimed is:

1. An electrolytic solution containing: an electrolyte including a lithium salt represented by general formula (1) below; an organic solvent including a linear carbonate represented by general formula (2) below; and an unsaturated cyclic carbonate, the linear carbonate being contained by not less than 70 mass % relative to an entire organic solvent contained in the electrolytic solution, wherein
the linear carbonate is contained at a mole ratio of 3 to 6 relative to the lithium salt, and/or
the lithium salt is contained at a concentration of 1.1 to 3.8 mol/L, $(R^1X^1)(R^2SO_2)NLi$  general formula (1)

($R^1$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN, $R^2$ is selected from halogens, $X^1$ is selected from $SO_2$, C=O, C=S, $R^aP$=O, $R^bP$=S, S=O, or Si=O, $R^a$ and $R^b$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN, $R^a$ and $R^b$ each optionally bind with $R^1$ to form a ring), $R^{20}OCOOR^{21}$  general formula (2)

($R^{20}$ and $R^{21}$ are each independently selected from $C_nH_aF_bCl_cBr_dI_e$ that is a linear alkyl, or $C_mH_fF_gCl_hBr_iI_j$ that includes a cyclic alkyl in the chemical structure thereof, "n" is an integer not smaller than 1, "m" is an integer not smaller than 3, and "a", "b", "c", "d", "e", "f", "g", "h", "i", and "j" are each independently an integer not smaller than 0, and satisfy 2n+1=a+b+c+d+e and 2m−1=f+g+h+i+j).

2. The electrolytic solution according to claim 1, wherein $(FSO_2)_2NLi$ is contained at a concentration of 1.1 to 3.8 mol/L.

3. The electrolytic solution according to claim 1, wherein the unsaturated cyclic carbonate is contained by greater than 0 and not greater than 6.5 mass % relative to an entire electrolytic solution.

4. The electrolytic solution according to claim 1, wherein the unsaturated cyclic carbonate is contained by greater than 0 and less than 2.5 mass % relative to an entire electrolytic solution.

5. The electrolytic solution according to claim 1, wherein the unsaturated cyclic carbonate is represented by general formula (A) below, general formula (A)

[Chem. 1]

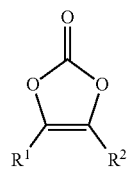

($R^1$ and $R^2$ are each independently hydrogen, an alkyl group, a halogen-substituted alkyl group, or a halogen).

6. The electrolytic solution according to claim 1, wherein the unsaturated cyclic carbonate is vinylene carbonate.

7. The electrolytic solution according to claim 1, wherein $(FSO_2)_2NLi$ is contained at a concentration of 1.5 to 3.0 mol/L.

8. The electrolytic solution according to claim 1, wherein the linear carbonate is contained by not less than 80 mass % relative to the entire organic solvent contained in the electrolytic solution.

9. The electrolytic solution according to claim 1, wherein a voltage at which the electrolytic solution is degraded in the presence of a graphite is not less than 0.6 V based on metal lithium.

10. A lithium ion secondary battery comprising: the electrolytic solution according to claim 1; a negative electrode; a positive electrode; and a coating
containing S, O, and C on a surface of the negative electrode and/or the positive electrode.

11. A lithium ion secondary battery comprising:
the electrolytic solution according to claim 1;
a negative electrode;
a positive electrode; and
a coating containing S, O, and C on a surface of the negative electrode and/or the positive electrode, wherein
a value of (mass (mg) of unsaturated cyclic carbonate/surface area ($m^2$) of negative electrode) is greater than 0 and not greater than 60.

12. The lithium ion secondary battery according to claim 10, wherein
the value of (mass (mg) of unsaturated cyclic carbonate/surface area ($m^2$) of negative electrode) is 2.5 to 60.

13. A lithium ion secondary battery comprising:
the electrolytic solution according to claim 1;
a negative electrode;
a positive electrode; and
a coating containing S, O, and C on a surface of the negative electrode and/or the positive electrode, wherein
in the coating, a number of materials having a long diameter of 30 nm or greater is less than 80 counts/$\mu m^2$.

14. The lithium ion secondary battery according to claim 10, wherein
an element percentage of C is 40.2 to 49.1 atm % when the surface of the negative electrode is measured by X-ray photoelectron spectroscopy.

15. The lithium ion secondary battery according to claim 10, wherein
a total element percentage of N, F, and S is 5.1 to 10.4 atm % when the surface of the negative electrode is measured by X-ray photoelectron spectroscopy.

16. The lithium ion secondary battery according to claim 10, wherein
the negative electrode includes a graphite as a negative electrode active material.

17. A lithium ion secondary battery comprising:
the electrolytic solution according to claim 1;
a positive electrode; and
a negative electrode, wherein
an amount of the unsaturated cyclic carbonate relative to a surface area of the negative electrode is in a range of greater than 0 and not greater than 12 mg/$m^2$.

18. The lithium ion secondary battery according to claim 17, wherein
a chemical structure of the lithium salt is represented by general formula (1-1) below, $(R^3X^2)(R^4SO_2)NLi$    general formula (1-1)

($R^3$ is $C_nH_aF_bCl_cBr_dI_e(CN)_f(SCN)_g(OCN)_h$,

"n", "a", "b", "c", "d", "e", "f", "g", and "h" are each independently an integer not smaller than 0, and satisfy $2n+1=a+b+c+d+e+f+g+h$, $R^4$ is selected from halogens, $R^3$ and $R^4$ optionally bind with each other to form a ring, and in that case, satisfy $2n=a+b+c+d+e+f+g+h$, $X^2$ is selected from $SO_2$, C=O, C=S, $R^cP$=O, $R^dP$=S, S=O, or Si=O, $R^c$ and $R^d$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN, $R^c$ and $R^d$ each optionally bind with $R^3$ or $R^4$ to form a ring).

19. The lithium ion secondary battery according to claim 17, wherein
the chemical structure of the lithium salt is represented by general formula (1-2) below, $(R^5SO_2)(R^6SO_2)NLi$    general formula (1-2)

($R^5$ is $C_nH_aF_bCl_cBr_dI_e$,

"n", "a", "b", "c", "d", and "e" are each independently an integer not smaller than 0, and satisfy $2n+1=a+b+c+d+e$, $R^6$ is selected from halogens, $R^5$ and $R^6$ optionally bind with each other to form a ring, and, in that case, satisfy $2n=a+b+c+d+e$).

20. The lithium ion secondary battery according to claim 17, wherein
the lithium salt is $(FSO_2)_2NLi$, $FSO_2(CF_3SO_2)NLi$, $FSO_2(CH_3SO_2)NLi$, $FSO_2(C_2F_5SO_2)NLi$, or $FSO_2(C_2H_5SO_2)NLi$.

21. The lithium ion secondary battery according to claim 17, wherein
the electrolytic solution contains the linear carbonate at a mole ratio of 4 to 5.5 relative to the lithium salt.

22. The lithium ion secondary battery according to claim 17, wherein
the linear carbonate is one type, two types, or three types selected from dimethyl carbonate, ethyl methyl carbonate, and diethyl carbonate.

23. The lithium ion secondary battery according to claim 17, wherein
the lithium ion secondary battery satisfies any of (A) to (H) below:
(A) a porosity of a positive electrode active material layer of the positive electrode is not greater than 50%;
(B) a density of the positive electrode active material layer of the positive electrode is not less than 2.5 g/$cm^3$;

(C) an amount of one positive electrode active material layer present on a current collector of the positive electrode is not less than 5 mg/cm$^2$;
(D) a thickness of one positive electrode active material layer present on the current collector of the positive electrode is not less than 50 μm;
(E) a porosity of a negative electrode active material layer of the negative electrode is not greater than 50%;
(F) a density of the negative electrode active material layer of the negative electrode is not less than 1.1 g/cm$^3$;
(G) an amount of one negative electrode active material layer present on a current collector of the negative electrode is not less than 7 mg/cm$^2$; and
(H) a thickness of one negative electrode active material layer present on the current collector of the negative electrode is not less than 50 μm.

24. The lithium ion secondary battery according to claim 23, the (A) to (H) are respectively (A-1) to (H-1) below:
(A-1) the porosity of the positive electrode active material layer of the positive electrode is not greater than 30%;
(B-1) the density of the positive electrode active material layer of the positive electrode is not less than 2.7 g/cm$^3$;
(C-1) an amount of the positive electrode active material layer present on the current collector of the positive electrode is not less than 10 mg/cm$^2$;
(D-1) a thickness of one positive electrode active material layer present on the current collector of the positive electrode is not less than 60 μm;
(E-1) the porosity of the negative electrode active material layer of the negative electrode is not greater than 45%;
(F-1) the density of the negative electrode active material layer of the negative electrode is not less than 1.2 g/cm$^3$;
(G-1) an amount of the negative electrode active material layer present on the current collector of the negative electrode is not less than 8 mg/cm$^2$; and
(H-1) a thickness of one negative electrode active material layer present on the current collector of the negative electrode is not less than 70 μm.

25. The lithium ion secondary battery according to claim 17, wherein
the lithium ion secondary battery is of a laminated type in which a plate-like positive electrode, a plate-like separator and a plate-like negative electrode are laminated.

26. A method for producing the lithium ion secondary battery according to claim 10,
the method comprising forming a coating containing S, O, and C on a surface of a negative electrode and/or a positive electrode by performing an activation process including step (a), step (b), and step (c) below, or step (a) and step (d) below, on a lithium ion secondary battery including an electrolytic solution, the negative electrode, and the positive electrode, the electrolytic solution containing an electrolyte including a lithium salt represented by general formula (1) below, an organic solvent including a linear carbonate represented by general formula (2) below, and an unsaturated cyclic carbonate,
the linear carbonate being contained at a mole ratio of 3 to 6 relative to the lithium salt, and/or
the lithium salt being contained at a concentration of 1.1 to 3.8 mol/L, $(R^1X^1)(R^2SO_2)NLi$      general formula (1)

($R^1$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN, $R^2$ is selected from halogens, $X^1$ is selected from $SO_2$, C=O, C=S, $R^aP$=O, $R^bP$=S, S=O, or Si=O, $R^a$ and $R^b$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN, $R^a$ and $R^b$ each optionally bind with $R^1$ or $R^2$ to form a ring), $R^{20}OCOOR^{21}$      general formula (2)

($R^{20}$ and $R^{21}$ are each independently selected from $C_nH_aF_bCl_cBr_dI_e$ that is a linear alkyl, or $C_mH_fF_gCl_h$-$Br_iI_j$ that includes a cyclic alkyl in the chemical structure thereof "n" is an integer not smaller than 1, "m" is an integer not smaller than 3, and "a", "b", "c", "d", "e", "f", "g", "h", "i", and "j" are each independently an integer not smaller than 0, and satisfy 2n+1=a+b+c+d+e and 2m−1=f+g+h+i+j), (a) step of performing charging to a second voltage $V_2$ in step (a-1) or step (a-2) below,
(a-1) step of performing charging at a first rate $C_1$ to a first voltage $V_1$ and then performing charging at a second rate $C_2$ to the second voltage $V_2$ ($V_1<V_2$, $C_1<C_2$),
(a-2) step of performing charging at a constant charging rate $C_{a-2}$ of 0.05 C or higher to the second voltage $V_2$,
(b) step of discharging the lithium ion secondary battery having been subjected to step (a), at a third rate $C_3$ to a third voltage $V_3$ or lower,
(c) step of performing charging and discharging at a fourth rate $C_4$ between the third voltage $V_3$ and the second voltage $V_2$, and
(d) step of keeping the temperature of the lithium ion secondary battery in a range of 40 to 120° C.

27. The method for producing the lithium ion secondary battery according to claim 26, wherein
the charging rate $C_{a-2}$ in the step (a-2) is not less than 1 C.

28. The method for producing the lithium ion secondary battery according to claim 26, wherein the charging rate $C_{a-2}$ in the step (a-2) satisfies $1\ C \leq C_{a-2} \leq 13\ C$.

29. The method for producing the lithium ion secondary battery according to claim 26, wherein
a temperature in the step (c) is in a range of 40 to 120° C.

30. The method for producing the lithium ion secondary battery according to claim 26, wherein
the step (c) is repeated 5 to 50 times.

31. A charging method for the lithium ion secondary battery according to claim 17, the charging method comprising
a 1-1st charging step of performing charging at a first rate $C_{1-1}$ that satisfies $0.5\ C < C_{1-1} \leq 1.5\ C$, to a voltage at which at least the unsaturated cyclic carbonate is degraded.

32. A charging method for the lithium ion secondary battery according to claim 17, the charging method comprising
a 1-2nd charging step of performing charging at a first rate $C_{1-2}$ that satisfies $0.01\ C < C_{1-2} \leq 0.5\ C$, to a voltage at which at least the unsaturated cyclic carbonate is degraded.

33. A charging method for the lithium ion secondary battery according to claim 17, the charging method comprising
a 1-3rd charging step of performing charging at a first rate $C_{1-3}$ that satisfies $0.001\ C \leq C_{1-3} < 0.01\ C$, to a voltage at which at least the unsaturated cyclic carbonate is degraded.

34. The charging method according to claim 31, further comprising a second charging step of performing charging at a second rate $C_2$ that satisfies $0.5\ C \leq C_2 \leq 3\ C$, after the 1-1st charging step, the 1-2nd charging step, or the 1-3rd charging step.

* * * * *